United States Patent
Okamura

(10) Patent No.: US 8,303,412 B2
(45) Date of Patent: Nov. 6, 2012

(54) GAME APPARATUS AND GAME PROGRAM

(75) Inventor: Yuichiro Okamura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 588 days.

(21) Appl. No.: 12/491,622

(22) Filed: Jun. 25, 2009

(65) Prior Publication Data

US 2010/0248833 A1    Sep. 30, 2010

(30) Foreign Application Priority Data

Mar. 31, 2009   (JP) ................................. 2009-087214
Mar. 31, 2009   (JP) ................................. 2009-087215

(51) Int. Cl.
- A63F 13/00 (2006.01)
- A63F 13/10 (2006.01)
- A63F 9/24 (2006.01)
- G06F 17/00 (2006.01)
- A63F 13/06 (2006.01)

(52) U.S. Cl. .................... 463/37; 463/3; 463/7; 463/34; 463/36; 273/108.1; 273/317.1; 273/340; 345/419; 345/473; 345/474; 345/619; 715/757; 715/764

(58) Field of Classification Search .................. 463/1–5, 463/7–9, 30–34, 36–43, 49–57; 273/108.1, 273/127 R, 148 R, 148 B, 309, 317.1, 340, 273/348, 361–367; 345/1.1–3.4, 156, 157, 345/160, 419, 473–475, 618–619, 629, 660–671; 715/706, 738, 757–759, 762–764, 766, 781–783, 715/788, 794–795, 798, 801–802, 807

See application file for complete search history.

(56) References Cited

U.S. PATENT DOCUMENTS

| | | | |
|---|---|---|---|
| 6,270,413 B1 * | 8/2001 | Aikawa et al. | 463/31 |
| 6,375,572 B1 * | 4/2002 | Masuyama et al. | 463/43 |
| 6,822,624 B2 * | 11/2004 | Naimer et al. | 345/9 |
| 6,921,332 B2 * | 7/2005 | Fukunaga et al. | 463/8 |
| 6,924,787 B2 * | 8/2005 | Kramer et al. | 345/156 |
| 7,070,500 B1 * | 7/2006 | Nomi et al. | 463/7 |
| 7,094,147 B2 * | 8/2006 | Nakata et al. | 463/9 |
| 7,142,191 B2 * | 11/2006 | Idesawa et al. | 345/156 |
| 7,690,994 B2 * | 4/2010 | Dohta | 463/37 |
| 7,839,382 B2 * | 11/2010 | Ueshima et al. | 345/156 |
| 7,850,526 B2 * | 12/2010 | Zalewski et al. | 463/36 |
| 7,854,655 B2 * | 12/2010 | Mao et al. | 463/30 |
| 2006/0189386 A1 * | 8/2006 | Rosenberg | 463/37 |
| 2007/0060228 A1 * | 3/2007 | Akasaka et al. | 463/1 |

(Continued)

FOREIGN PATENT DOCUMENTS

JP     2008-67876     3/2008

*Primary Examiner* — Arthur O. Hall

(74) *Attorney, Agent, or Firm* — Nixon & Vanderhye P.C.

(57) ABSTRACT

The game apparatus obtains angular velocity data and acceleration data from an input device equipped with at least an angular velocity sensor and an acceleration sensor, and determines whether or not a ball has been thrown in accordance with the angular velocity data. When it is determined that ball-throwing is fulfilled, the game apparatus calculates the intensity of swinging the input device and a curve amount. The game apparatus applies a force and a curve to a ball in accordance with the calculated intensity of swinging and the curve amount, and performs a process of causing the ball to move and curve in a predetermined direction.

23 Claims, 24 Drawing Sheets

U.S. PATENT DOCUMENTS

| | | |
|---|---|---|
| 2007/0265088 A1* | 11/2007 | Nakada et al. .................. 463/37 |
| 2007/0270222 A1* | 11/2007 | Yamanaka et al. .............. 463/37 |
| 2007/0270223 A1* | 11/2007 | Nonaka et al. .................. 463/37 |
| 2008/0015031 A1* | 1/2008 | Koizumi et al. ................. 463/43 |
| 2008/0024435 A1* | 1/2008 | Dohta ........................... 345/156 |
| 2008/0076566 A1* | 3/2008 | Miyamoto ....................... 463/37 |
| 2008/0119269 A1* | 5/2008 | Nonaka et al. .................. 463/32 |
| 2008/0132334 A1* | 6/2008 | Nonaka et al. .................. 463/37 |
| 2008/0204407 A1* | 8/2008 | Ueno ............................ 345/156 |
| 2008/0248872 A1* | 10/2008 | Endo .............................. 463/36 |
| 2008/0309615 A1* | 12/2008 | Sato ............................. 345/156 |
| 2009/0029754 A1* | 1/2009 | Slocum et al. .................... 463/5 |
| 2009/0040231 A1* | 2/2009 | Sano et al. ..................... 345/474 |
| 2009/0069096 A1* | 3/2009 | Nishimoto ...................... 463/43 |
| 2009/0070093 A1* | 3/2009 | Nakanishi et al. .............. 703/22 |
| 2009/0247250 A1* | 10/2009 | Kato et al. ........................ 463/2 |
| 2010/0113153 A1* | 5/2010 | Yen et al. ........................ 463/37 |

* cited by examiner

THROWING DIRECTION

THROWING DIRECTION

THROWING DIRECTION

THROWING DIRECTION

THROWING DIRECTION

THROWING DIRECTION

PATH OF ARM p

THROWING DIRECTION

GAME APPARATUS AND GAME PROGRAM

CROSS REFERENCE TO RELATED APPLICATION

The disclosure of Japanese Patent Application No. 2009-087214, filed Mar. 31, 2009, Japanese Patent Application No. 2009-087215, filed Mar. 31, 2009, is incorporated herein by reference.

BACKGROUND

1. Technical Field

The technology presented herein relates to a game apparatus and a game program, and more particularly to a game apparatus and a game program which enable an intuitive operation on the game apparatus on which a game is performed by moving an input device.

2. Description of the Background Art

Conventionally, there has been a game apparatus on which an input is performed when a player operates an input device which is equipped with an acceleration sensor. For example, in Japanese Laid-Open Patent Publication No. 2008-67876, a game apparatus is disclosed in which a game process is executed in accordance with acceleration detected when a player swings an input device. The game apparatus disclosed in Japanese Laid-Open Patent Publication No. 2008-67876 detects acceleration caused when the player performs a ball-throwing motion, and reproduces a ball-throwing motion of a game character in accordance with the detected acceleration. Specifically, when the player performs a series of motions from back-swing to forward-swing, and releasing a ball, as if the player actually throws a bowling ball, the game character reproduces the ball-throwing motion until releasing of the bowling ball in accordance with the series of motions of the player. Next, when the player releases a button of an input device at a timing when the player releases a bowling ball in an actual ball-throwing motion, the game character releases a ball. The game apparatus, then, calculates the path and the speed of the ball in accordance with the acceleration detected until the ball is released, and causes the ball to move in accordance with the calculation result.

However, in the game apparatus disclosed in Japanese Laid-Open Patent Publication No. 2008-67876, the button of the input device needs to be operated at the time of ball-throwing, and thus the ball-throwing motion on the game apparatus does not necessarily coincide with the actual ball-throwing motion. Therefore, the player cannot satisfactory play a game with an intuitive operation.

SUMMARY

Therefore, a feature of the example embodiments presented herein are to provide a game apparatus and a game program which are capable of realizing a game based on an intuitive operation on a game apparatus in which a game is performed by moving an input device.

In embodiments, the following configurations are applied to attain the feature mentioned above. Here, the reference numerals, the supplementary description and the like in the parentheses indicate correspondence with the embodiment described below in order to aid in understanding the present embodiment and are not intended to limit, in any way, the scope of the present embodiment. Here, the reference numerals, the supplementary description and the like in the parentheses indicate correspondence with the embodiment described below in order to aid in understanding the present embodiment and are not intended to limit, in any way, the scope of the present embodiment.

One embodiment is a game apparatus which obtains operation data including angular velocity data and acceleration data from an input device (8) equipped with an angular velocity sensor (55, 56) and an acceleration sensor (37) and which performs a game process based on the operation data. The game apparatus includes determination means (a CPU 10 executing step S62, hereinafter describing step numbers only), movement control means (S64), and display control means (S5). The determination means determines whether or not the angular velocity data satisfies a predetermined condition (S71, S74, S75). The movement control means controls a movement of a predetermined object (ball) in a game space in accordance with the acceleration data obtained in a predetermined period of time which is defined based on a point of time at which the angular velocity data satisfies the predetermined condition. The display control means displays, on a screen, the predetermined object, whose movement is controlled by the movement control means.

According to the above embodiment, the movement of the object is controlled based on the acceleration detected during the predetermined period of time which is defined based on the point of time at which the angular velocity data satisfies the predetermined condition. Accordingly, it is possible to cause an object in a game space to move in accordance with a player's motion during operating the input device.

Further, the movement control means may control a moving speed of the object in accordance with the acceleration data.

According to the above aspect, the moving speed of the object can be controlled in accordance with the acceleration data detected by the acceleration sensor. Accordingly, the magnitude of a force applied by the player to the input device can be reflected in the moving speed of the object in the game space.

Further, the movement control means may control the moving speed of the object by applying a force to the object in accordance with the magnitude of an acceleration indicated by the acceleration data.

According to the above aspect, the force applied to the object can be controlled in accordance with the acceleration data detected by the acceleration sensor. Accordingly, the magnitude of the force applied by the player to the input device can be reflected in a force to be applied to the object in the game space.

Further, the game apparatus may further include position determination means (S41). The position determination means determines a position of the object, in accordance with the angular velocity data, during a period of time until the determination means determines that the angular velocity data satisfies the predetermined condition. In this case, the movement control means causes the object to start moving from a position determined by the position determination means toward a predetermined direction when the determination means determines that the angular velocity data satisfies the predetermined condition.

According to the above aspect, the position of the object can be moved, in accordance with the angular velocity data, during a period of time until the determination means determines that the angular velocity data satisfies the predetermined condition. Accordingly, a motion of the input device during a period until the above predetermined condition is satisfied can be reflected in the game process.

Further, the game apparatus may further include angular velocity storage means (main memory, S3). The angular velocity storage means sequentially stores the angular velocity data. The determination means determines that the angular velocity data satisfies the predetermined condition in accordance with the angular velocity data stored in the angular velocity storage means when the magnitude of an angular velocity indicated by the angular velocity data represents a local maximum value, and is greater than a predetermined threshold.

According to the above aspect, in accordance with the angular velocity data detected in the past, whether or not the predetermined condition is satisfied can be determined. In other words, by checking the history of the angular velocity data, the temporal change in the angular velocity data can be obtained. In addition, when the magnitude of the angular velocity data indicates its local maximum value, and the local maximum value is greater than the predetermined threshold, it is possible to determine that the angular velocity data satisfies the above described predetermined condition.

Further, the movement control means may further control a moving direction of the object in accordance with the acceleration data (S70).

According to the above aspect, in accordance with the acceleration data detected by the acceleration sensor, the moving direction of the object can be controlled. Accordingly, in accordance with the acceleration applied to the input device, the moving direction of the object can be changed.

Further, the game apparatus may include acceleration storage means (main memory, S3). The acceleration storage means sequentially stores acceleration data. In this case, a time at which the determination means has determined that the angular velocity data satisfies the predetermined condition is defined as a determination time, and a predetermined length of period before the determination time is defined as the predetermined period of time. The movement control means controls the moving speed of the object in accordance with acceleration data stored in the acceleration storage means during the predetermined period of time.

According to the above aspect, in accordance with the acceleration detected during the predetermined period of time before the determination time by the determination means, the moving speed of the object can be determined. For example, the moving speed of the object can be determined in accordance with the magnitude of the acceleration detected during a predetermined period of time before the determination time made by the determination means.

Further, the movement control means may control the moving speed of the object in accordance with a maximum value of acceleration in the acceleration data during the predetermined period of time.

According to the above aspect, the maximum acceleration during a predetermined period of time before the determination made by the determination means can be reflected in the moving speed of the object. Accordingly, the moving speed of the object can be controlled in accordance with a force applied by the player to the input device.

Further, the movement control means may further control the moving speed of the object (S66) in accordance with an orientation of the input device at the determination time, the orientation being calculated based on the angular velocity data.

According to the above aspect, it is possible to control the moving speed of the object while the orientation of the input device at the time of the determination time is taken into consideration.

Further, the movement control means may further change the moving speed of the object (S82) in accordance with the acceleration data obtained at and after the determination time.

According to the above aspect, the moving speed of the object can be changed supplementally even after the determination made by the determination means, in accordance with the acceleration obtained after the determination.

Further, when the magnitude of an acceleration indicated by the acceleration data obtained at and after the determination time is greater than the maximum value of acceleration during the predetermined period of time, the movement control means may further change the moving speed of the object in accordance with the magnitude of the acceleration indicated by the acceleration data obtained at and after the determination time.

According to the above aspect, even after the determination by the determination means, when the acceleration obtained after the determination is greater than the acceleration obtained before the determination, it is possible to change the moving speed of the object in accordance with the acceleration obtained after the determination. Accordingly, a force applied by the player to the input device can be reflected in the moving speed of the object with enhanced accuracy.

Further, the movement control means may cause the object in the game space to be ejected in a predetermined direction when the angular velocity data satisfies the predetermined condition, and determine a moving speed of the object immediately after the ejection in accordance with acceleration data obtained at or before the ejection of the object, and correct the moving speed of the object immediately after the ejection in accordance with acceleration data additionally obtained over a predetermined period of time immediately after the ejection of the object.

According to the above aspect, the movement control means causes the object to be ejected in accordance with the acceleration data at a point of time when the angular velocity data satisfies the predetermined condition, and corrects the moving speed of the object after the ejection in accordance with the acceleration data additionally obtained after the ejection. Accordingly, it is possible to cause the object In the game space to move at a speed corresponding to the intensity of swinging of the input device performed by the player.

One embodiment is a game apparatus which obtains operation data including angular velocity data and acceleration data from an input device (8) equipped with an angular velocity sensor (55, 56) and an acceleration sensor (37), and which performs a game process based on the operation data. The game apparatus includes determination means (CPU 10 executing step S62, hereinafter describing step numbers only), movement control means (S84), and display control means (S5). The determination means determines whether or not the angular velocity data satisfies a predetermined condition (S71, S74, S75). The movement control means changes a moving direction of a predetermined object (ball) in a game space in accordance with the acceleration data obtained in a predetermined period of time which is defined based on a point of time at which the angular velocity data satisfies the predetermined condition. The display control means displays, on a screen, the predetermined object whose movement is controlled by the movement control means.

According to the above aspect, the moving direction of the object is changed in accordance with the acceleration detected during the predetermined period of time defined based on a point of time at which the angular velocity data satisfies the predetermined condition. Accordingly, it is possible to change the moving direction (path) of the object in the game space in accordance with the player's motion during operating the input device.

Further, the determination means may cause the object to start moving when the angular velocity data satisfies the predetermined condition (S66).

According to the above aspect, it is possible to cause the object to start moving in the game space in accordance with the player's motion during operating the input device.

Further, movement control means may change the moving direction of the object in accordance with the magnitude and the direction of an acceleration in a first direction included in the acceleration data (S100).

According to the above aspect, in accordance with the magnitude and direction of the acceleration in the first direction, in the acceleration data detected by the acceleration sensor, the moving direction of the object can be changed. Accordingly, the direction and the magnitude of a force applied to the input device by the player can be reflected in the change in the moving direction of the object moving in the game space.

Further, the movement control means may change the moving direction of the object in accordance with an angular velocity around a first axis included in the angular velocity data and the acceleration in the first direction (S100).

According to the above aspect, in accordance with the angular velocity around the first axis in the angular velocity data detected by the angular velocity sensor, and the acceleration in the first direction, the moving direction of the object can be changed. Accordingly, in accordance with the player's motion of swinging the input device, the moving direction of the object can be changed. Therefore, the player's swinging motion of the input device can be reflected in the game with enhanced accuracy.

Further, the movement control means may change the moving direction of the object (S100) in accordance with an acceleration indicated by the acceleration data and an angular velocity indicated by the angular velocity data, both data being obtained during a predetermined length of period before and after a determination time. The determination time means a point of time at which the determination means has determined that the angular velocity data satisfies the predetermined condition.

According to the above aspect, in accordance with the acceleration and the angular velocity before and after the point of time when the predetermined condition has been satisfied, the moving direction of the object can be changed. Therefore, the speed of the swinging motion during a period in which the player is swinging the input device, and the acceleration of the input device during the period can be reflected in a game process.

Further, the movement control means may increase/decrease an amount of change (curve amount) in the moving direction of the object in accordance with the magnitude of the acceleration (S100).

According to the above aspect, for example, the more the player swings the input device strongly, the more the amount of change in the moving direction of the object is increased.

Further, the movement control means may determine a direction to which a moving direction of the object is to be changed (curve direction) in accordance with the angular velocity data obtained during the predetermined length of period before and after the determination time (S102).

According to the above aspect, based on the angular velocity data, it is possible to determine the direction to which the moving direction of the object is to be changed. Accordingly, in accordance with the player's motion of twisting the input device, the direction in which the object is to curve can be determined.

Further, the game apparatus may further include orientation calculation means (S15). The orientation calculation means calculates an orientation of the input device in accordance with the angular velocity data. The movement control means may determine a direction to which a moving direction of the object is to be changed in accordance with the orientation at a predetermined point of time after the determination time, the orientation being calculated by the orientation calculation means (S103).

According to the above aspect, the orientation of the input device can be calculated based on the angular velocity data. In addition, based on the calculated orientation, it is possible to determine a direction to which the moving direction of the object is to be changed.

Further, the game apparatus may further include position determination means (S41). The position determination means determines a position of the object in accordance with the angular velocity data during a period of time until the determination means determines that the angular velocity data satisfies the predetermined condition. In this case, the movement control means causes the object to start moving from a position determined by the position determination means toward a predetermined direction, and changes the moving direction of the object after the object starts moving, when the determination means determines that the angular velocity data satisfies the predetermined condition.

According to the above aspect, the position of the object can be moved in accordance with the angular velocity data during the period of time until the determination means determines that the angular velocity data satisfies the predetermined condition. Further, from the position having been moved, movement of the object can be started. Accordingly, the operation of the input device performed during the period of time until the predetermined condition is satisfied can be reflected in the game process, and thus the position at which the object starts moving can be changed before the start of the movement.

Further, the game apparatus may further include angular velocity storage means (main memory, S3). The angular velocity storage means sequentially stores the angular velocity data. The determination means determines that the angular velocity data satisfies the predetermined condition in accordance with the angular velocity data stored in the angular velocity storage means when the magnitude of an angular velocity indicated by the angular velocity data represents a local maximum value, and is greater than a predetermined threshold.

According to the above aspect, in accordance with an angular velocity detected in the past, whether or not the predetermined condition is satisfied is determined. That is, by referring to the history of the angular velocities, the temporal change in the angular velocities can be obtained. In addition, when the magnitude of an angular velocity is a local maximum value, and when the local maximum value is greater than the predetermined threshold, it is possible to determine that the angular velocity data satisfies the predetermined condition.

Further, the game apparatus may further include orientation calculation means (S15) and orientation determination means (S114, S115). The orientation calculation means calculates an orientation of the input device in accordance with the angular velocity data. The orientation determination means determines whether or not the orientation of the input device calculated by the orientation calculation means is a predetermined orientation. After the determination means determines that the angular velocity data satisfies the predetermined condition, and when the orientation determination means determines the orientation of the input device is the predetermined orientation, the movement control means decreases an amount of change (curve amount) in the moving direction of the object (S118).

According to the above aspect, the orientation of the input device is calculated based on the angular velocity data, and whether or not the calculated orientation of the input device corresponds to the predetermined orientation is determined. When the orientation of the input device, after the predetermined condition is satisfied, corresponds to the predetermined orientation, the above change amount can be decreased.

Further, when the magnitude of an angular velocity indicated by the angular velocity data is lower than a predetermined threshold, or when the magnitude of an acceleration indicated by the acceleration data is in a predetermined range, the movement control means may decrease the amount of change in the moving direction of the object.

According to the above aspect, only when the motion of swinging the input device ends and the orientation of the input device is predetermined orientation after the predetermined condition is satisfied, the change amount in the moving direction of the object can be decreased.

Further, in one embodiment may be implemented in a form of a game program which causes a computer of a game apparatus to function as the above described means.

According to the one embodiment, when the angular velocity data of the input device satisfies a predetermined condition, the movement of the object can be controlled in accordance with the acceleration of the input device. Accordingly, it is possible to cause an object to move in a game space in accordance with the player's motion during operating the input device, and consequently, an intuitive motion of the player moving the input device can be reflected in the game process as an operation with respect to the object.

Further, according to one embodiment, when the angular velocity data of the input device satisfies the predetermined condition, the moving direction of the object can be changed in accordance with the acceleration of the input device. Accordingly, in accordance with the player's motion during operating the input device, a direction in which an object in the game space moves can be changed, and consequently, an intuitive motion of the player moving the input device can be reflected in the game process as an operation with respect to the object.

These and other features, aspects and advantages of the present embodiment will become more apparent from the following detailed description of the present embodiment when taken in conjunction with the accompanying drawings.

DESCRIPTION OF THE PREFERRED EMBODIMENTS

Entire Configuration of Game System

Figure 1:
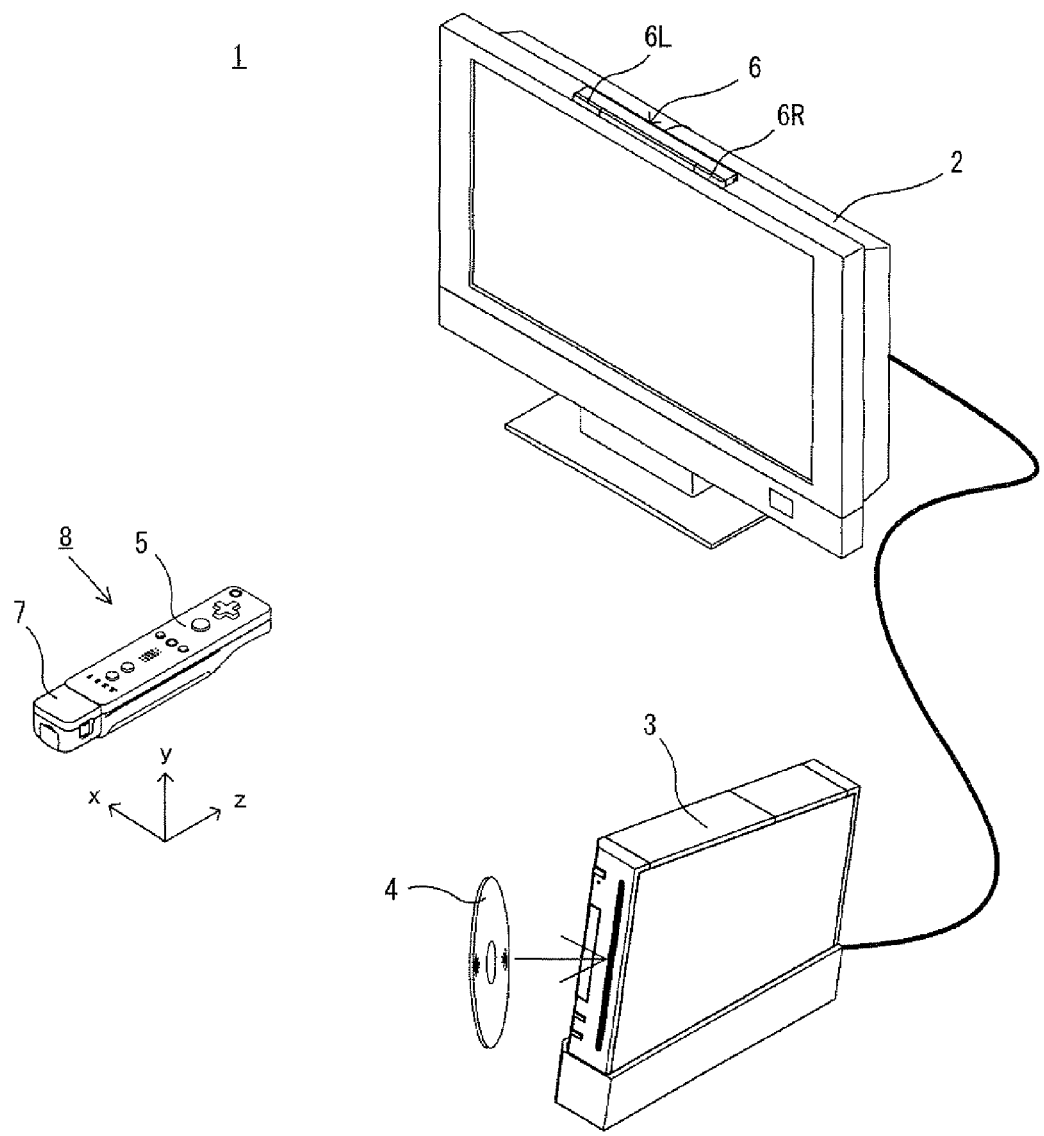
FIG. 1 is an external view of a game system.

With reference to FIG. 1, a game system 1 including a game apparatus according to an embodiment will be described. FIG. 1 is an external view of the game system 1. In the following description, a stationary game apparatus is taken as an example for describing a game apparatus and a game program of the present embodiment. As shown in FIG. 1, the game system 1 includes a television receiver (hereinafter, simply referred to as a "television") 2, a game apparatus 3, an optical disc 4, an input device 8, and a marker section 6. In this system, the game apparatus 3 performs game process based on a game operation using the input device 8.

In the game apparatus 3, the optical disc 4 typifying an information storage medium used for the game apparatus 3 in an exchangeable manner is detachably inserted. A game program executed by the game apparatus 3 is stored in the optical disc 4. The game apparatus 3 has, on the front surface thereof, an insertion opening for the optical disc 4. The game apparatus 3 reads and executes the game program stored in the optical disc 4 which is inserted through the insertion opening, so as to perform the game process.

The game apparatus 3 is connected to the television 2, which is an exemplary display device, through a connecting cord. A game image obtained as a result of the game process performed by the game apparatus 3 is displayed on the television 2. Further, the marker section 6 is provided on the periphery (in FIG. 1, on a portion above a screen) of a screen of the television 2. The marker section 6 includes two markers 6R and 6L on both ends thereof. Specifically, the marker 6R (as well as the marker 6L) includes one or more infrared LED, and emits an infrared light forward from the television 2. The marker section 6 is connected to the game apparatus 3, and the game apparatus 3 is able to control each infrared LED of the marker section 6 so as to light each infrared LED up.

The input device 8 provides the game apparatus 3 with operation data representing a content of an operation performed on the input-device 8 itself. In the present embodiment, the input device 8 includes a controller 5 and a gyro sensor unit 7. As described in detail below, the input device 8 is structured such that the gyro sensor unit 7 is detachably connected to the controller 5. Radio communication is made between the controller 5 and the game apparatus 3. In the present embodiment, the radio communication between the controller 5 and the game apparatus 3 is made by using, for example, the Bluetooth (Registered Trademark) technology. In another embodiment, connection between the controller 5 and the game apparatus 3 may be a wired connection.

[Internal Structure of Game Apparatus 3]

Figure 2:
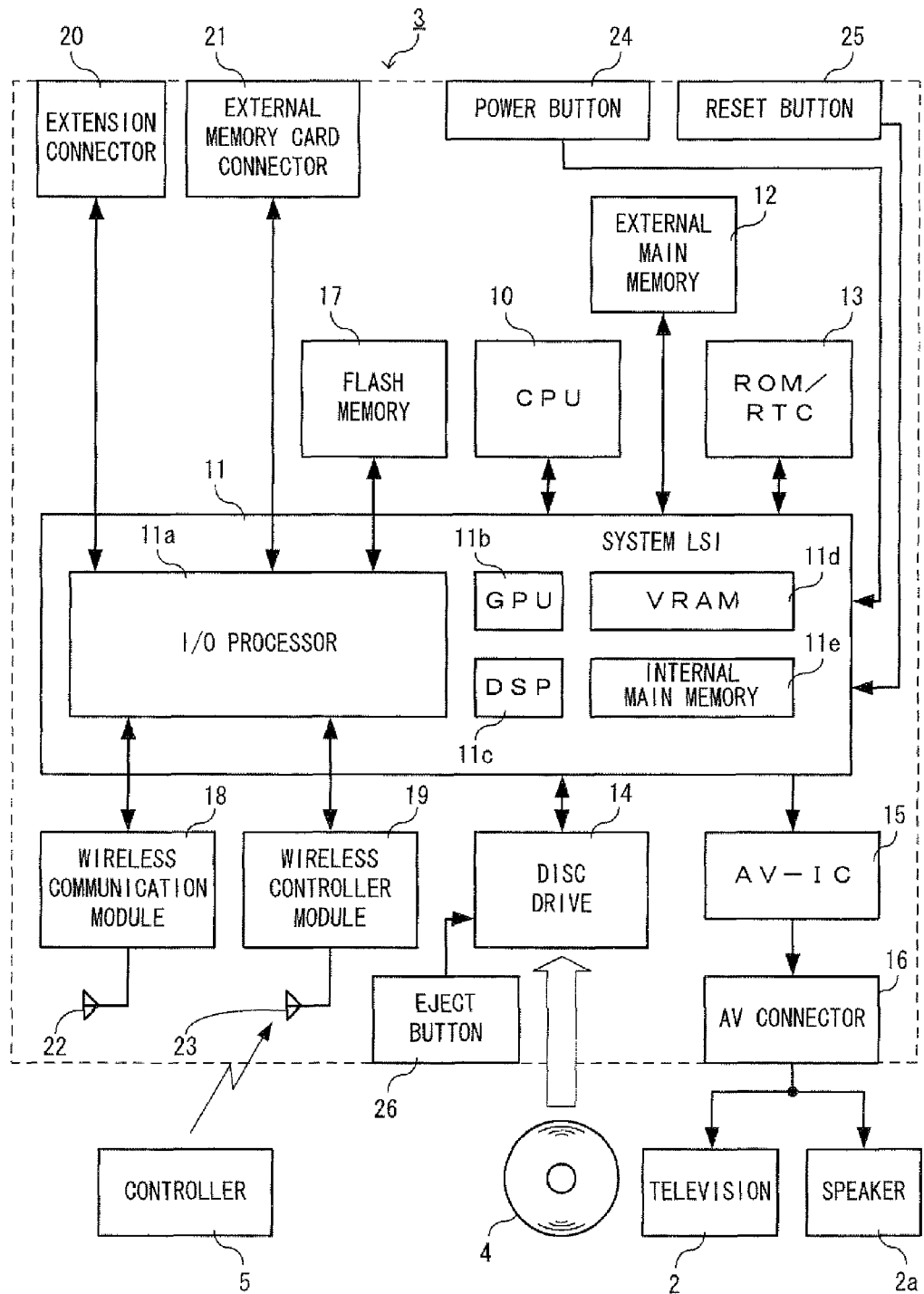
FIG. 2 is a functional block diagram of a game apparatus.

Next, an internal structure of the game apparatus 3 will be described with reference to FIG. 2. FIG. 2 is a block diagram illustrating a structure of the game apparatus 3. The game apparatus 3 includes the CPU 10, a system LSI 11, an external main memory 12, a RCM/RTC 13, a disk drive 14, an AV-IC 15, and the Like.

The CPU 10, functioning as a game processor, performs a game process by executing the game program stored in the optical disc 4. The CPU 10 is connected to the system LSI 11. To the system LSI 11, the external main memory 12, the ROM/RTC 13, the disk drive 14, and the AV-IC 15 as well as the CPU 10 are connected. The system LSI 11 performs processes for controlling data transmission between the respective components connected thereto, generating an image to be displayed, acquiring data from an external device, and the like. The internal structure of the system LSI will be described below. The external main memory 12 of a volatile type stores a program such as a game program read from the optical disc 4 and a game program read from a flash memory 17, and various data, and the external main memory 12 is used as a work area and a buffer area for the CPU 10. The ROM/RTC 13 includes a ROM (so-called a boot ROM) incorporating a boot program for the game apparatus 3, and a clock circuit (RTC: Real Time Clock) for counting a time. The disk drive 14 reads program data, texture data, and the like from the optical disk 4, and writes the read data into an internal main memory 11e or the external main memory 12 described below.

Further, the system LSI 11 includes an input/output processor (I/O processor) 11a, a GPU (Graphics Processor Unit) 11b, a DSP (Digital Signal Processor) 11c, a VRAM 11d, and the internal main memory 11e. These components 11a, 11b, 11c, 11d, and 11e are connected with each other through an internal bus, which is not shown.

The CPU 11b, acting as a part of rendering means, generates an image in accordance with a graphics command (rendering command) from the CPU 10. The VRAM 11d stores data (data such as polygon data and texture data) necessary for the GPU 11b to execute the graphics command. When an image is generated, the GPU 11b generates image data by using data stored in the VRAM 11d.

The DSP 11c, functioning as an audio processor, generates audio data by using sound data and sound waveform (tone quality) data stored in the internal main memory 11e or the external main memory 12.

The image data and the audio data generated as described above are read by the AV-IC 15. The AV-IC 15 outputs the read image data to the television 2 through an AV connector 16, and outputs the read audio data to a speaker 2a incorporated in the television 2. Thus, an image is displayed on the television 2, and a sound is outputted from the speaker 2a.

The input/output processor 11a performs data transmission to and data reception from the component connected thereto, and download of data from an external device. The Input/output processor 11a is connected to the flash memory 17, a wireless communication module 18, a wireless controller module 19, an extension connector 20, and a memory card connector 21. The wireless communication module 18 is connected to an antenna 22, and the wireless controller module 19 is connected to an antenna 23.

The input/output processor 11a is connected to a network via the wireless communication module 18 and the antenna 22, so as to communicate with another game apparatus and various servers connected to the network. The input/output processor 11a regularly accesses the flash memory 17, and detects for data which needs to be transmitted to the network, and transmits, when the data is detected, the data to the network through the wireless communication module 18 and the antenna 22. Further, the input/output processor 11a receives data transmitted from another game apparatus, and/ or download data from a download server, through the network, the antenna 22, and the wireless communication module 18, and stores the received data and/or the downloaded data in the flash memory 17. The CPU 10 executes a game program so as to read data stored in the flash memory 17 and use the data on the game program. The flash memory 17 may store saved data (game result data or intermediate step data) of a game played by using the game apparatus 3 in addition to data transmitted from the game apparatus 3 to another game apparatus or the various servers, and data received by the game apparatus 3 from another game apparatus or the various servers.

The input/output processor 11a receives operation data transmitted from the controller 5 through the antenna 23 and the wireless controller module 19, and (temporarily) stores the received operation data in a buffer area of the internal main memory 11e or the external main memory 12.

Further, the input/output processor 11a is connected to the extension connector 20 and the memory card connector 21. The extension connector 20 is a connector for interface, such as a USB or a SCSI, and allows communication with the network by connecting thereto a media such as an external storage media, connecting thereto a peripheral device such as another controller, and/or connecting thereto a wired communication connector, without using the wireless communication module 18. The memory card connector 21 is a connector for connecting thereto an external storage media such as a memory card. For example, the input/output processor 11a accesses an external storage media through the extension connector 20 or the memory card connector 21 so as to store data in the external storage media or read data from the external storage media.

The game apparatus 3 includes a power button 24, a reset button 25, and an eject button 26. The power button 24 and the reset button 25 are connected to the system LSI 11. When the power button 24 is on, power is supplied to the respective components of the game apparatus 3 through an AC adaptor not shown. When the reset button 25 is pressed, the system LSI 11 reboots a boot program of the game apparatus 3. The eject button 26 is connected to the disk drive 14. When the eject button 26 is pressed, the optical disc 4 is ejected from the disk drive 14.

[Structure of Input Device 8]

Figure 3:
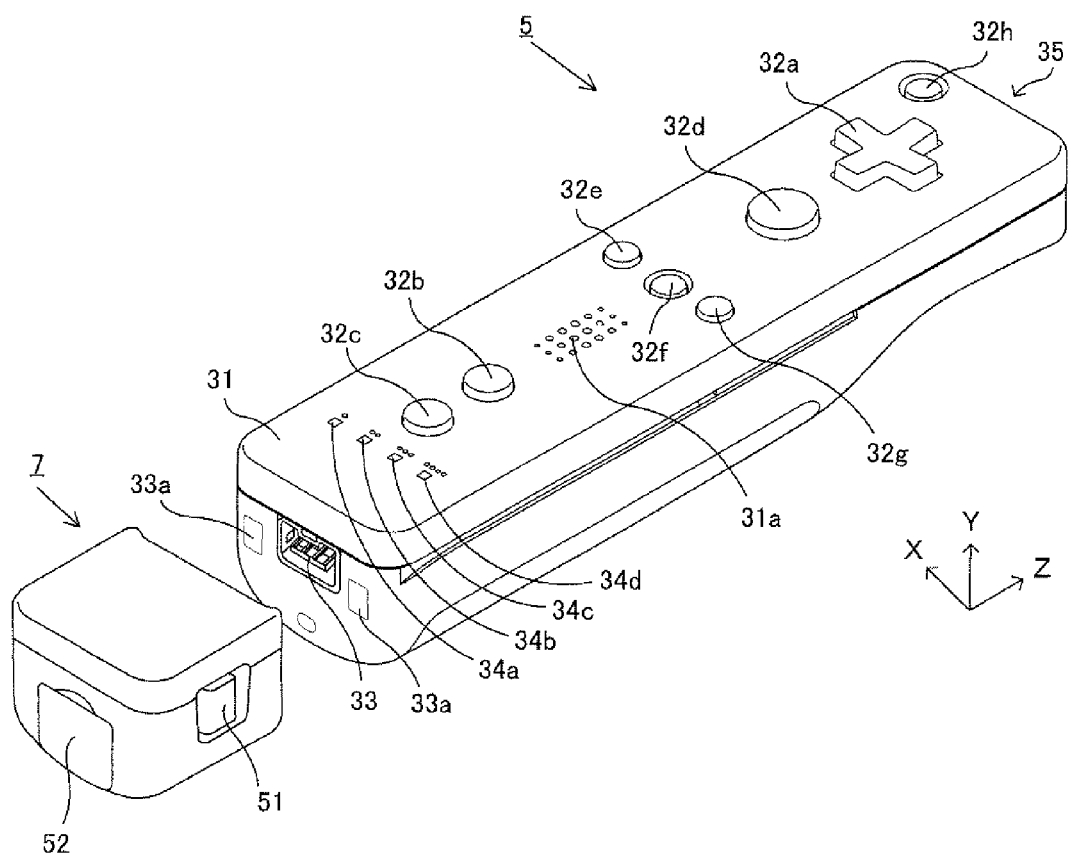
FIG. 3 is a perspective view illustrating an external structure of an input device.
Figure 4:
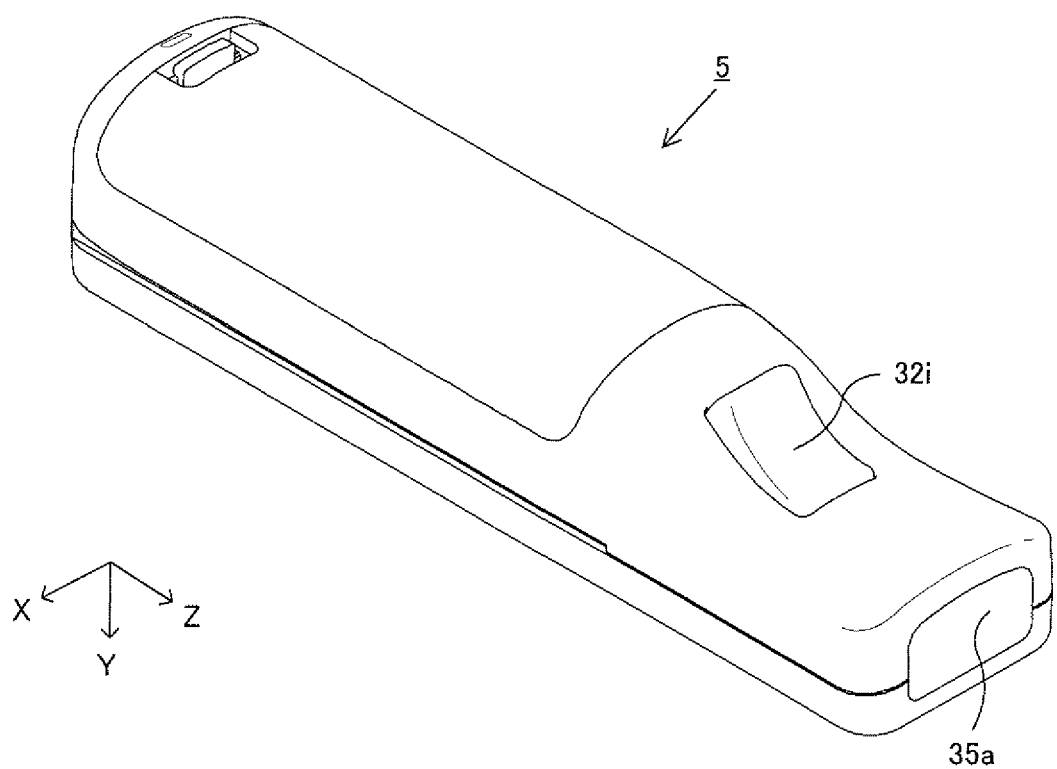
FIG. 4 is a perspective view illustrating an external structure of a controller.

Next, with reference to FIGS. 3 to 6, the input device 8 will be described. FIG. 3 is a perspective view illustrating an external structure of an input device 8. FIG. 4 is a perspective view illustrating an external structure of the controller 5. FIG. 3 is a perspective view illustrating the controller 5 as viewed from the top rear side thereof, and FIG. 4 is a perspective view illustrating the controller 5 as viewed from the bottom front side thereof.

As shown in FIG. 3 and FIG. 4, the controller 5 has a housing 31 formed by, for example, plastic molding. The housing 31 has a generally parallelepiped shape extending in a longitudinal direction from front to rear (Z-axis direction shown in FIG. 3), and the entire housing 31 has such a size as to be able to be held by one hand of an adult or even a child. A player is allowed to perform game operation by pressing buttons provided on the controller 5, and moving the controller 5 so as to change the position and the orientation thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In the present invention, the top surface of the housing 31 on which the buttons 32a to 31h are provided may be referred to as a "button surface". On the other hand, as shown in FIG. 4, a recessed portion is formed on a bottom surface of the housing 31, and a B button 32i is provided on a rear slope surface of the recessed portion. The operation buttons 32a to 32i are assigned, as necessary, with respective functions in accordance with the game program executed by the game apparatus 3. Further, the power button 32h remote-controls the power of a body of the game apparatus 3 to be on or off. The home button 32f and the power button 32h each has the top surface thereof buried in the top surface of the housing 31. Therefore, the home button 32f and the power button 32h are prevented from being inadvertently pressed by the player.

On a rear surface of the housing 31, the connector 33 is provided. The connector 33 is used for connecting the controller 5 to another device (for example, the gyro sensor unit 7 or another controller). Both side surfaces of the connector 33 provided on the rear surface of the housing 31 each has a locking hole 33a for preventing easy removal of another device as described above.

In the rear portion on the top surface of the housing 31, a plurality (four in FIG. 3) of LEDs 34a, 34b, 34c, and 34d are provided. The controller 5 is assigned a controller type (number) so as to be distinguishable from another main controller. The LEDs 34a, 34b, 34c, and 34d are each used for informing a player of the controller type which is currently set to controller 5 that he or she is using, and for informing a player of remaining battery power of the controller 5, for example. Specifically, when a game operation is performed by using the controller 5, one of the plurality of LEDs 34a, 34b, 34c, and 34d corresponding to the controller type is lit up.

The controller 5 has an imaging information calculation section 35 (FIG. 6), and a light incident surface 35a through which a light is incident on the imaging information calculation section 35 is provided on the front surface of the housing 31, as shown in FIG. 4. The light incident surface 35a is made of material passing therethrough at least infrared light outputted from the markers 6R and 6L.

On the top surface of the housing 31, a sound hole 31a for externally outputting a sound from a speaker 49 (shown in FIG. 5) which is incorporated in the controller 5 is provided between the first button 32b and the home button 32f.

Figure 5:
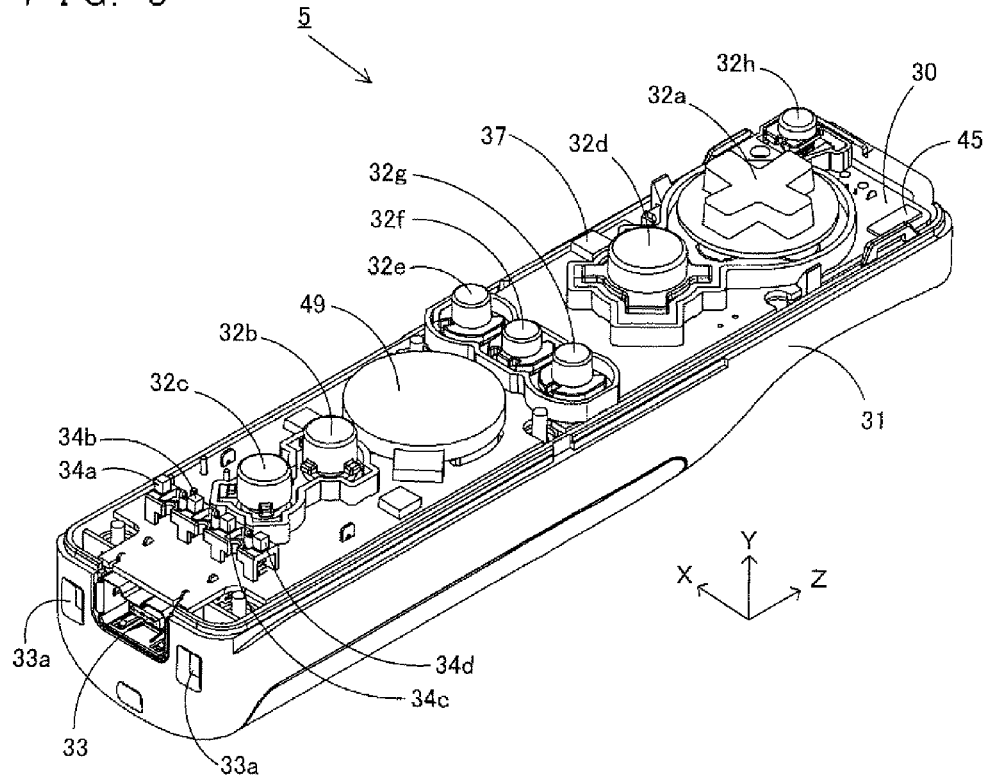
FIG. 5 is a perspective view illustrating an internal structure of a controller.
Figure 6:
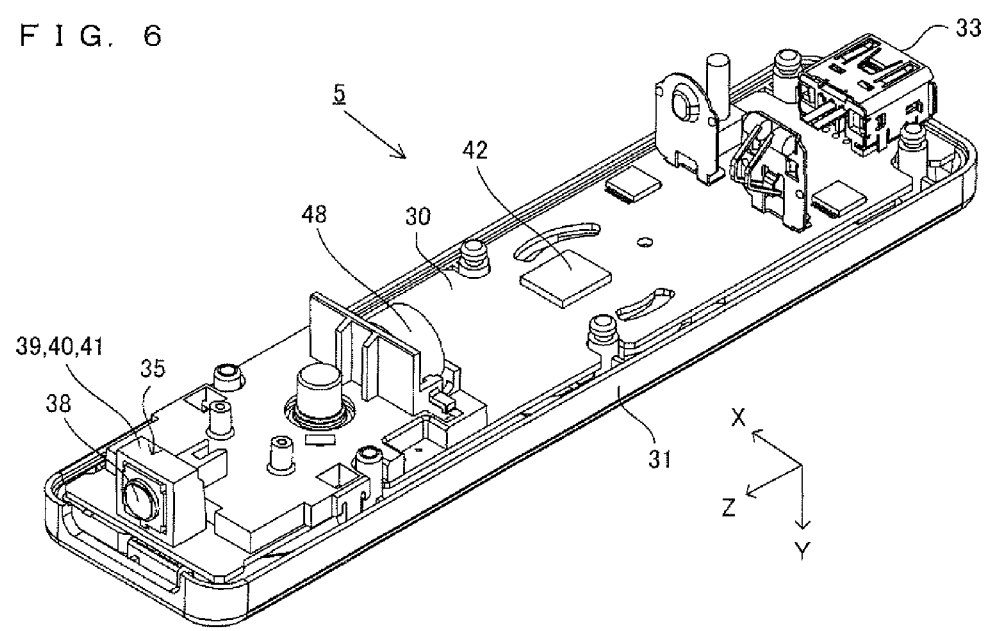
FIG. 6 is a perspective view illustrating an internal structure of the controller.

Next, with reference to FIGS. 5 and 6, an internal structure of the controller 5 will be described. FIG. 5 and FIG. 6 are diagrams illustrating the internal structure of the controller 5. FIG. 5 is a perspective view illustrating a state where an upper casing (a part of the housing 31) of the controller 5 is removed. FIG. 6 is a perspective view illustrating a state where a lower casing (a part of the housing 31) of the controller 5 is removed. FIG. 6 is a perspective view illustrating a reverse side of a substrate 30 shown in FIG. 5.

As shown in FIG. 5, the substrate 30 is fixed inside the housing 31, and on a top main surface of the substrate 30, the operation buttons 32a to 32h, the LEDs 34a, 34b, 34c, and 34d, an acceleration sensor 37, an antenna 45, the speaker 49, and the like are provided. These elements are connected to a microcomputer 42 (see FIG. 6) via lines (not shown) formed on the substrate 30 and the like. In the present embodiment, the acceleration sensor 37 is provided on a position offset from the center of the controller 5 with respect to the X-axis direction. Thus, calculation of the movement of the controller 5 being rotated around the Z-axis may be facilitated. Further, the acceleration sensor 37 is provided in front of the center of the controller 5 with respect to the longitudinal direction (Z-axis direction). Further, a wireless module 44 (see FIG. 6) and the antenna 45 allow the controller 5 to act as a wireless controller.

On the other hand, as shown in FIG. 6, at a front edge of a bottom main surface of the substrate 30, the imaging information calculation section 35 is provided. The imaging information calculation section 35 includes an infrared filter 38, a lens 39, the image pickup element 40 and an image processing circuit 41 located in order, respectively, from the front surface of the controller 5. These components 38 to 41 are attached on the bottom main surface of the substrate 30.

On the bottom main surface of the substrate 30, the microcomputer 42 and a vibrator 48 are provided. The vibrator 48 is, for example, a vibration motor or a solenoid, and is connected to the microcomputer 42 via lines formed on the substrate 30 or the like. The controller 5 is vibrated by an actuation of the vibrator 48 based on a command from the microcomputer 42. Therefore, the vibration is conveyed to the player's hand holding the controller 5, and thus a so-called vibration-feedback game is realized. In the present embodiment, the vibrator 48 is disposed slightly toward the front of the housing 31. That is, the vibrator 48 is positioned at the end portion of the controller 5 offset from the center thereof, and therefore the vibration of the vibrator 48 can lead to enhancement of the vibration of the entire controller 5. Further, the connector 33 is provided at the rear edge of the bottom main surface of the substrate 30. In addition to the components shown in FIGS. 5 and 6, the controller 5 includes a quartz oscillator for generating a reference clock of the microcomputer 42, an amplifier for outputting a sound signal to the speaker 49, and the like.

Further, the gyro sensor unit 7 includes a gyro sensor (gyro sensors 55 and 56 shown in FIG. 7) for detecting for angular velocities around three axes, respectively. The gyro sensor unit 7 is detachably mounted to the connector 33 of the controller 5. The gyro sensor unit 7 has, at the front edge (an edge portion facing toward the Z-axis positive direction shown in FIG. 3), a plug (a plug 53 shown in FIG. 7) connectable to the connector 33. Further, the plug 53 has hooks (not shown) on both sides, respectively. In a state where the gyro sensor unit 7 is mounted to the controller 5, the plug 53 is connected to the connector 33, and the hooks engage in the locking holes 33a, respectively, of the controller 5. Therefore, the controller 5 and the gyro sensor unit 7 are securely fixed to each other. Further, the gyro sensor unit 7 has a button 51 on each side surface (surfaces facing toward the X-axis direction shown in FIG. 3). When the buttons 51 are pressed, the hooks are disengaged from the locking holes 33a. Therefore, when the plug 53 is removed from the connector 33 while the buttons 51 are being pressed, the gyro sensor unit 7 can be disconnected from the controller 5.

Further, a connector having the same shape as the connector 33 is provided at the rear edge of the gyro sensor unit 7. Therefore, another device which can be mounted to (the connector 33 of) the controller 5 can be mounted to the connector of the gyro sensor unit 7. In FIG. 3, a cover 52 is detachably provided over the connector.

FIGS. 3 to 6 each show only examples of a shape of each of the controller 5 and the gyro sensor unit 7, a shape of each operation button, the number of acceleration sensors, the number of vibrators, positions at which the acceleration sensor and the vibrator, respectively, are provided, and the like. The present invention can be realized when shapes of the controller 5, the gyro sensor unit 7, and the operations buttons, the number of acceleration sensors, the number of vibrators, positions at the acceleration sensors and the vibrators, respectively, are provided are other than those shown in FIGS. 3 to 6. Further, although in the present embodiment the imaging direction of the image pickup means is Z-axis positive direction, the imaging direction may be any direction. That is, the imagining information calculation section 35 (the light incident surface 35a through which a light is incident on the imaging information calculation section 35) of the controller 5 may not be provided on the front surface of the housing 31, but may be provided on any other surface on which a light can be received from the outside of the housing 31.

Figure 7:
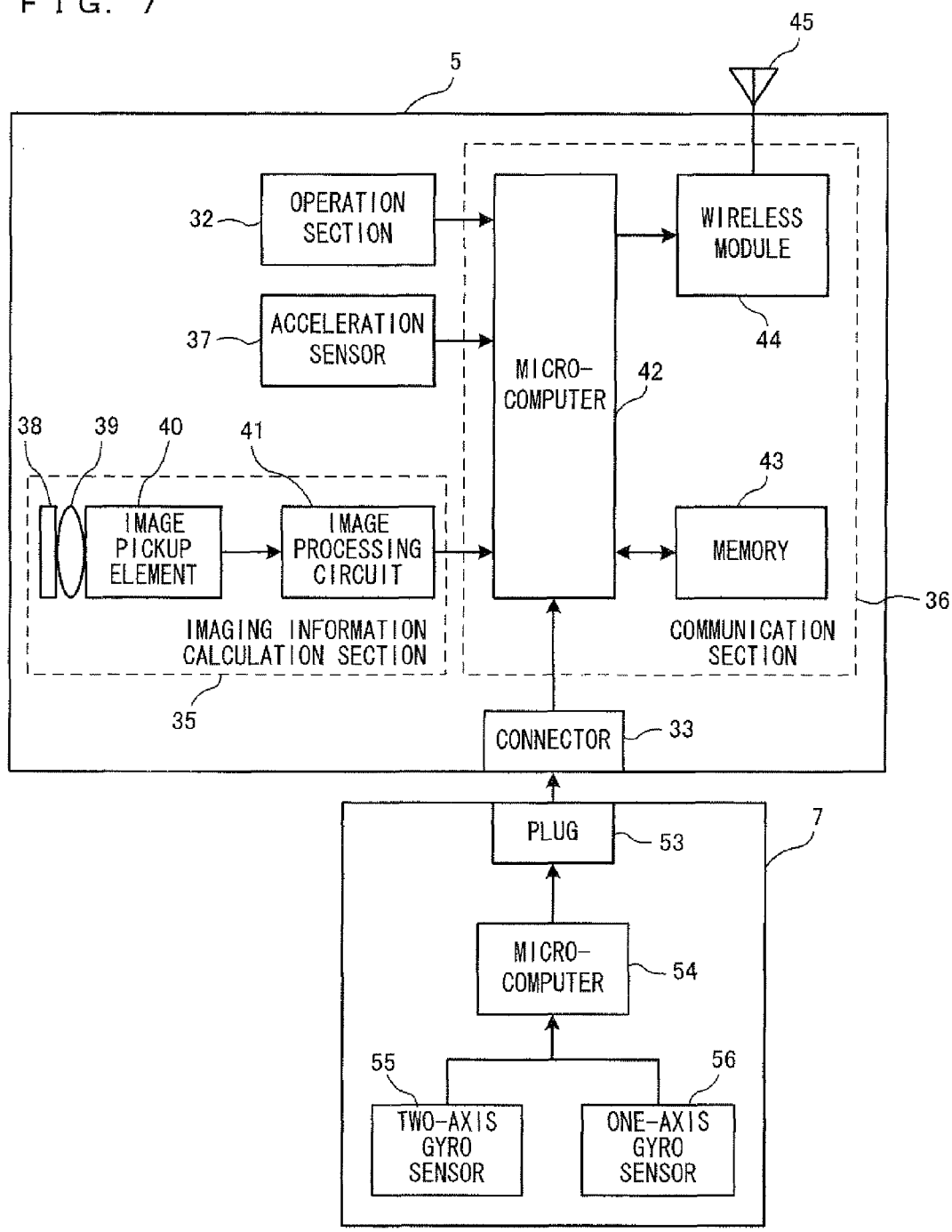
FIG. 7 is a block diagram illustrating a configuration of the input device.

FIG. 7 is a block diagram illustrating a structure of the input device 8 (the controller 5 and the gyro sensor unit 7). The controller 5 includes an operation section 32 (the respective operation buttons 32a to 32i), the connector 33, the imaging information calculation section 35, a communication section 36, and the acceleration sensor 37. The controller 5 transmits, as operation data, data representing a content of operation performed on the controller 5 itself, to the game apparatus 3.

The operation section 32 includes the operation buttons 32a to 32i described above, and outputs, to the microcomputer 42 of a communication section 36, operation button data indicating an input state (that is, whether or not each operation button 32a to 32i is pressed) of each operation button 32a to 32i.

The imaging information calculation section 35 is a system for analyzing image data taken by the image pickup means and calculating the centroid, the size and the like of an area having a high brightness in the image data. The imaging information calculation section 35 has, for example, a maximum sampling period of about 200 frames/sec., and therefore can trace and analyze even a relatively fast motion of the controller 5.

The imaging information calculation section 35 includes the infrared filter 38, the lens 39, the image pickup element 40 and the image processing circuit 41. The infrared filter 38 allows only infrared light to pass therethrough, among light incident on the front surface of the controller 5. The lens 39 collects the infrared light which has passed through the infrared filter 38 so as to be incident on the image pickup element 40. The image pickup element 40 is a solid-state imaging device such as, for example, a CMOS sensor or a CCD sensor, and receives the infrared light collected by the lens 39, and outputs an image signal. The markers 6R and 6L of the marker section 6 provided near the display screen of the television 2 each include an infrared LED for outputting infrared light forward from the television 2. Therefore, the infrared filter 38 enables the image pickup element 40 to receive only the infrared light which has passed through the infrared filter 38 and generate image data, so that an image of each of the markers 6R and 6L can be taken with enhanced accuracy. Hereinafter, the image taken by the image pickup element 40 is referred to as a pickup image. The image data generated by the image pickup element 40 is processed by the image processing circuit 41. The image processing circuit 41 calculates, in the pickup image, a position of an imaging subject (the marker 6R and the marker 6L). The image processing circuit 41 outputs data representing a coordinate point of the calculated position, to the microcomputer 42 of the communication section 36. The data representing the coordinate point is transmitted as operation data to the game apparatus 3 by the microcomputer 42. Hereinafter, the coordinate point is referred to as a "marker coordinate point". The marker coordinate point changes depending on an orientation (angle of tilt) and/or a position of the controller 5 itself, and therefore the game apparatus 3 is allowed to calculate the orientation and the position of the controller 5 by using the marker coordinate point.

In another embodiment, the controller 5 may not necessarily include the image processing circuit 41, and the controller 5 may transmit the pickup image as it is to the game apparatus 3. At this time, the game apparatus 3 may have a circuit or a program, having the same function as the image processing circuit 41, for calculating the marker coordinate point.

The acceleration sensor 37 detects for an acceleration including gravitational acceleration) of the controller 5, that is, detects for a force (including gravity) applied to the controller 5. The acceleration sensor 37 detects a value of an acceleration (linear acceleration) in the straight line direction along the sensing axis direction, among accelerations applied to a detection section of the acceleration sensor 37. For example, multiaxial acceleration sensor having two or more axes detects an acceleration of a component for each axis, as an acceleration applied to the detection section of the acceleration sensor. For example, three-axis or two-axis acceleration sensor may be of the type available from Analog Devices, Inc. or STMicroelectronics N.V. The acceleration sensor 37 is, for example, an electrostatic capacitance type acceleration sensor. However, another type of acceleration sensor may be used.

In the present embodiment, the acceleration sensor 37 detects for a linear acceleration in three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects for an acceleration for the straight line direction along each axis, and an output from the acceleration sensor 37 represents a value of the linear acceleration for each of the three axes. In other words, the detected acceleration is represented as a three-dimensional vector (ax, ay, az) in an XYZ-coordinate system (controller coordinate system (object coordinate system)) defined relative to the input device 8 (controller 5). Hereinafter, a vector representing components of the acceleration values detected for the three axes, respectively, by the acceleration sensor 37 is referred to as an acceleration vector.

Data (acceleration data) representing an acceleration detected by the acceleration sensor 37 is outputted to the communication section 36. The acceleration detected by the acceleration sensor 37 changes depending on an orientation (angle of tilt) and the movement of the controller 5, and therefore the game apparatus 3 is allowed to calculate the orientation and the movement of the controller 5 by using the acceleration data. In the present embodiment, the game apparatus 3 determines the orientation of the controller 5 based on the acceleration data and angular velocity data which is described below.

The data (acceleration data) representing the acceleration (acceleration vector) detected by the acceleration sensor 37 is outputted to the communication section 36. In the present embodiment, the acceleration sensor 37 is used as a sensor for outputting data for determining the angle of tilt of the controller 5.

When a computer such as a processor (for example, the CPU 10) of the game apparatus 3 or a processor (for example, the microcomputer 42) of the controller 5 processes an acceleration signal outputted from the acceleration sensor 37, additional information relating to the controller 5 can be inferred or calculated (determined), as one skilled in the art will readily understand from the description herein. For example, a case where the computer performs process when it is anticipated that the controller 5 including the accelerate sensor 37 is in a static state (that is, a case where process is performed when it is anticipated that an acceleration detected by the acceleration sensor will include only a gravitational acceleration) will be described. When the controller 5 is actually in the static state, it is possible to determine whether or not the controller 5 tilts relative to the direction of gravity and to also determine a rate of the tilt, based on the acceleration having been detected. Specifically, when a state where a detection axis of the acceleration sersor 37 is toward the vertically downward direction represents a reference, whether or not the controller 5 tilts relative to the reference can be determined based on whether or not 1G (gravitational acceleration) is applied to the detection axis and a degree to which the controller 5 tilts relative to the reference can be determined based on the magnitude of the gravitational acceleration. Further, the multiaxial acceleration sensor 37 subjects, to a processing, the acceleration signals having been detected in the respective axes so as to more specifically determine the degree to which the controller 5 tilts relative to the direction of gravity. In this case, the processor may calculate, based on the output from the acceleration sensor 37, an angle of the tilt at which the controller 5 tilts, or calculate direction in which the controller 5 tilts without calculating the angle of the tilt. Thus, when the acceleration sensor 37 is used in combination with the processor, an angle of tilt or an orientation of the controller 5 may be determined.

On the other hand, in a case where it is anticipated that the controller 5 will be in a dynamic state (a state where the controller 5 is being moved), the acceleration sensor 37 detects for an acceleration based on a movement of the controller 5, in addition to the gravitational acceleration. Therefore, when the gravitational acceleration component is eliminated from the detected acceleration through a predetermined process, it is possible to determine a direction in which the controller 5 moves. Even when it is anticipated that the controller 5 will be in the dynamic state, the acceleration component based on the movement of the acceleration sensor is eliminated from the detected acceleration through a predetermined process, whereby it is possible to determine the tilt of the controller 5 relative to the direction of gravity. In another embodiment, the acceleration sensor 37 may include an embedded processor or another type of dedicated processor for performing, before outputting to the microcomputer 42 an acceleration signal detected by the acceleration detection means incorporated therein, any desired processing of the acceleration signal. For example, when the acceleration sensor 37 is intended to detect static acceleration (for example, gravitational acceleration), the embedded or dedicated processor could convert the acceleration signal to a corresponding angle of tilt (or another perferable parameter).

The communication section 36 includes the microcomputer 42, a memory 43, the wireless module 44 and the antenna 45. The microcomputer 42 controls the wireless module 44 for wirelessly transmitting, to the game apparatus 3, data acquired by the microcomputer 42 while using the memory 43 as a storage area in the process. Further, the microcomputer 42 is connected to the connector 33. Data transmitted from the gyro sensor unit 7 is inputted to the microcomputer 42 through the connector 33. Hereinafter, a structure of the gyro sensor unit 7 will be described.

The gyro sensor unit 7 includes the plug 53, a microcomputer 54, the two-axis gyro sensor 55, and the one-axis gyro sensor 56. As described above, the gyro sensor unit 7 detects angular velocities around three axes (XYZ axes in the present embodiment), respectively, and transmits data (angular velocity data) representing the detected angular velocities, to the controller 5.

The two-axis gyro sensor 55 detects an angular velocity (per unit time) around each of the X-axis and the Y-axis. Further, the one-axis gyro sensor 56 detects an angular velocity (per unit time) around the Z-axis. In the present invention, directions of the rotations around the Z-axis, the X-axis, and the Y-axis relative to the imaging direction (the Z-axis positive direction) of the controller 5 are referred to as a roll direction, a pitch direction, and a yaw direction, respectively. That is, the two-axis gyro sensor 55 detects angular velocities in the pitch direction (direction of rotation around the X-axis) and the yaw direction (direction of rotation around the Y-axis), and the one-axis gyro sensor 56 detects for an angular velocity in the roll direction (the direction of rotation around the Z-axis).

In the present embodiment, the two-axis gyro sensor 55 and the one-axis gyro sensor 56 are used so as to detect the angular velocities around the three axes. However, in another embodiment, the number of gyro sensors and a combination thereof to be used may be optionally selected provided that the angular velocities around the three axes can be detected.

Further, in the present embodiment, the three axes around which the gyro sensors 55 and 56 detect the angular velocities are set to correspond to three axes (XYZ-axes), respectively, for which the acceleration sensor 37 detects the accelerations. However, in another embodiment, the three axes around which the gyro sensors 55 and 56 detect the angular velocities may not correspond to the three axes for which the acceleration sensor 37 detects the accelerations.

Data representing the angular velocities detected by the gyro sensors 55 and 56 are outputted to the microcomputer 54. Therefore, data representing the angular velocities around the three axes of the X, Y, and Z axes are inputted to the microcomputer 54. The microcomputer 54 transmits the data representing the angular velocities around the three axes, as angular velocity data, to the controller 5 through the plug 53. The transmission from the microcomputer 54 to the controller 5 is sequentially performed at a predetermined cycle, and the game is typically processed at a cycle of 1/60 seconds (corresponding to one frame time), and the transmission is preferably performed at a cycle shorter than a cycle of 1/60 seconds.

The controller 5 will be described again. Data outputted from the operation section 32, the imaging information calculation section 35, and the acceleration sensor 37 to the microcomputer 42, and data transmitted from the gyro sensor unit 7 to the microcomputer 42 are temporarily stored in the memory 43. The data are transmitted as the operation data to the game apparatus 3. At a timing of the transmission to the wireless controller module 19 of the game apparatus 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the operation data is modulated on to the low power radio wave signal by the wireless module 44 and transmitted from the controller 5. The wireless controller module 19 of the game apparatus 3 receives the low power radio wave signal. The game apparatus 3 demodulates or decodes the received low power radio wave signal to obtain the operation data. Based on the obtained operation data and the game program, the CPU 10 of the game apparatus 3 performs the game process. The wireless transmission from the communication section 36 to the wireless controller module 19 is sequentially performed at a predetermined time interval. Since game process is generally performed at a cycle of 1/60sec. (corresponding to one frame time), data is preferably transmitted at a cycle of a shorter time period. The communication section 36 of the controller 5 outputs, to the wireless controller module 19 of the game apparatus 3, the respective operation data at intervals of 1/200 seconds, for example.

When the controller 5 is used, a player is allowed to not only perform a conventional typical game operation of pressing the respective operation buttons, but also to perform an operation of tilting the controller 5 at a desired angle of tilt. Other than these operations, by using the controller 5, a player is allowed to perform an operation of designating a desired position on a screen, or perform an operation of moving the controller 5 itself.

[Outline of Game Process]

Figure 8:
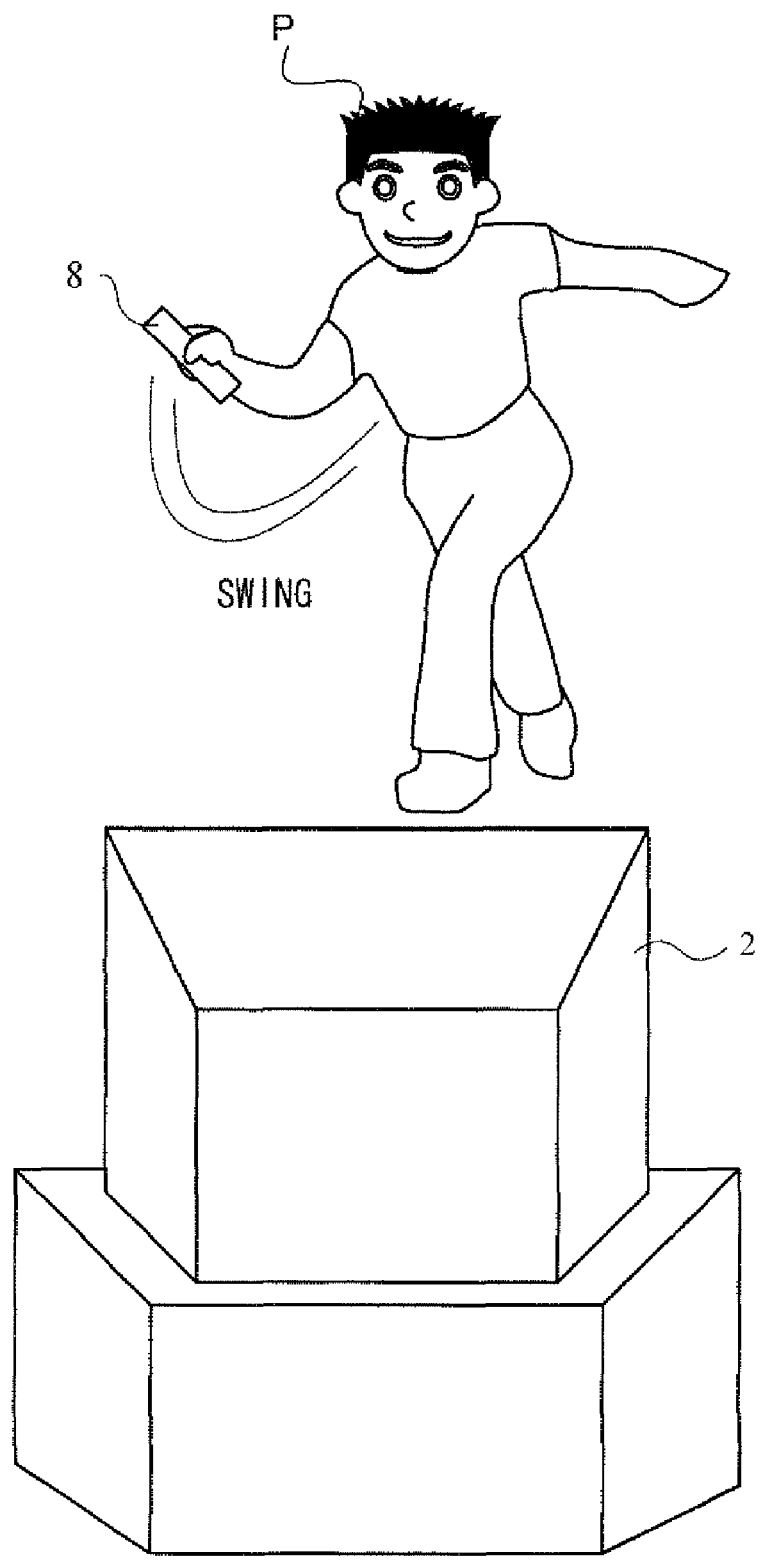
FIG. 8 is a diagram schematically illustrating a state where a game operation is performed with the use of the input device 8.
Figure 9:
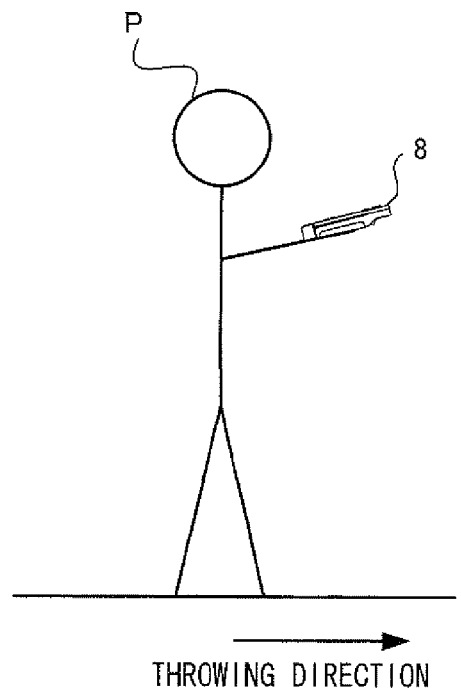
FIG. 9 is a diagram illustrating a player holding the input device 8 while having an attitude of pre-throwing motion.
Figure 10:
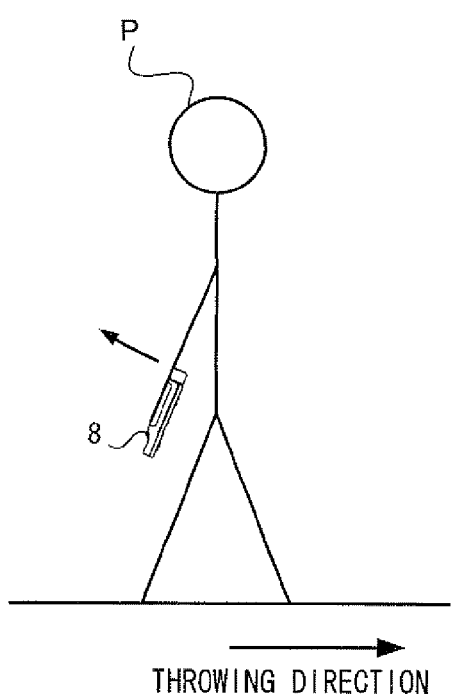
FIG. 10 is a diagram illustrating a player performing a back-swing.
Figure 11:
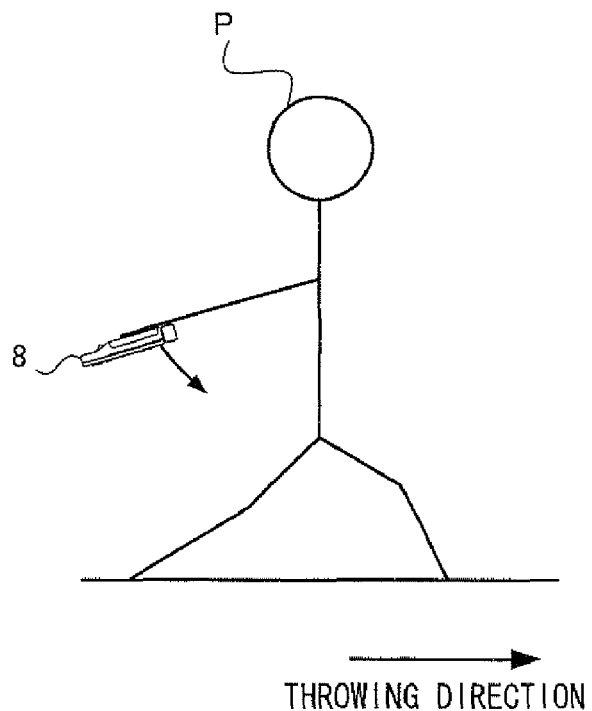
FIG. 11 is a diagram illustrating a player performing a forward-swing.
Figure 12:
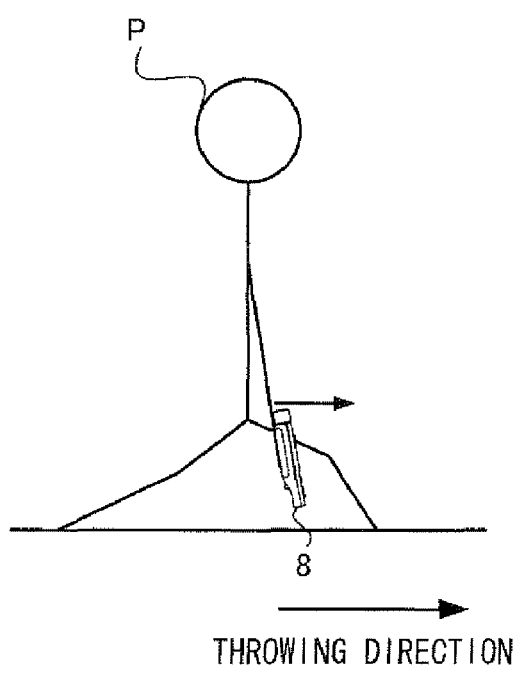
FIG. 12 is a diagram illustrating an instant at which a player releases a ball.
Figure 13:
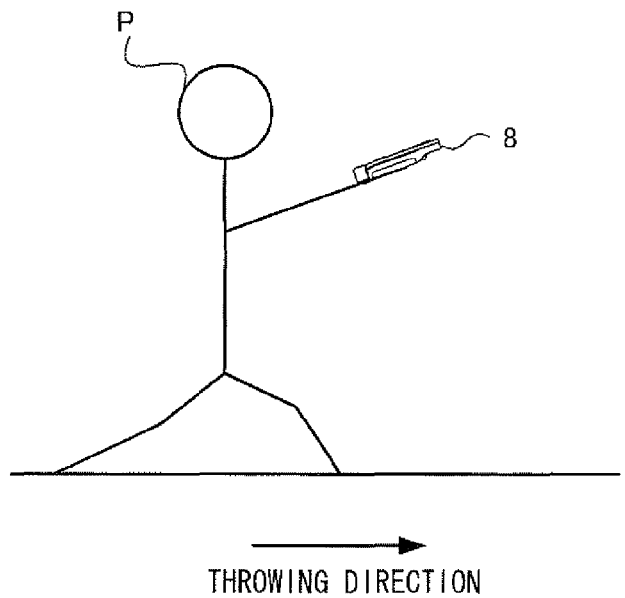
FIG. 13 is a diagram illustrating a player after releasing a ball.

Next, with reference to FIGS. 8 to 15B, an outline of a game process according to an embodiment of the present invention will be described. In the present embodiment, a bowling game is performed. FIG. 8 is a diagram schematically illustrating a state where a game operation is performed by using the input device 8. FIG. 9 a diagram illustrating a player holding the input device 8 while having an attitude of pre-throwing motion. FIG. 10 is a diagram illustrating a player performing a back-swing. FIG. 11 is a diagram illustrating a player performing a forward-swing. FIG. 12 is a diagram illustrating an instant at which a player releases a ball. FIG. 13 is a diagram illustrating a player after releasing a ball. As shown in FIG. 8, a player P holds the input device 8, and swings the input device 8 as if the player P is actually throwing a bowling ball. In accordance with the player's swinging the input device 8, the game apparatus 3 displays an appearance of a player character throwing a bowling ball on the television 2.

First, the player P holds the input device 8 in a manner to take an address position for throwing a bowling ball (pre-throwing motion, FIG. 9), presses the B button 32i of the controller 5 (input device 8), and performs a back-swing motion (FIG. 10) and then a forward-swing motion (FIG. 11). In accordance with the motions of the player P, the television 2 displays a player character who takes an address motion, starts back-swing motion, and then performs the forward-swing motion. After performing the forward-swing motion, the player P swings the input device 8 as if actually throwing a bowling ball (a release motion, FIG. 12). Normally, to actually throw a bowling ball, the player releases the ball when the ball reaches substantially a lowest point (a position closest to a lane) during the forward-swing. When a player releases a ball, the player throws a ball while applying a force to the ball. In this game as well, in the same manner as a case where the bowling ball is actually thrown, the player swings the input device 8 as if releasing a bowling ball when the input device 8 reaches substantially a lowest point during forward-swing (FIG. 12). In accordance with the throwing motion of the player P, the game apparatus 3 determines that the ball has been thrown (an automatic ball-throwing determination), and displays, on the television 2, an appearance of the player character throwing a ball. Thereafter, the player P finishes the ball-throwing motion (finish, FIG. 13). In this manner, the ball-throwing motion can be divided into the address motion, the back-swing motion, the forward-swing motion, the release motion, and the finish motion.

Here, the speed and the path of the thrown ball are determined in accordance with the intensity and the direction of a force applied to the input device 8 (that is, the speed and the direction of the controller 5 swung by the player) while the player performs a ball-throwing motion. In addition, the intensity and the direction of the force applied to the controller 5 after the ball-throwing determination also affects the speed and the path of the thrown ball.

Specifically, the game apparatus 3 detects the orientation of the input device 8 using angular velocities detected by the two-axis gyro-sensor 55 and the one-axis gyro-sensor 56, whereby a motion shift from the back-swing motion to the forward-swing motion is detected. That is, the game apparatus 3 integrates angular velocities around the respective axes, the angular velocities being outputted from the two-axis gyro-sensor 55 and the one-axis gyro-sensor 56 sequentially, and calculates, based on the result of the integration, a change amount of the orientation of the input device 8 from its initial state, whereby a current orientation of the input device 8 is calculated. Based on the calculated change amount of the orientation of the input device 8, the game apparatus 3 recognizes that the player's motion is shifted from the back-swing motion to the forward-swing motion.

Here, the orientation of the input device 8 represents an orientation on an xyz-coordinate system which is based on a predetermined position in a space where the input device 8 is located. As shown in FIG. 1, the xyz-coordinate system is set based on the condition that the input device 8 is located in front of the maker section 6. In the coordinate system, a direction extending from the position of the input device 8 to the maker section 6 is set as a z-axis positive direction, a direction extending from the position of the input device 8 toward a vertically upward direction (opposite to the direction of gravity) is set as a y-axis positive direction, and a direction extending from the position of the input device 8 toward its left side direction when facing the maker section 6 is set as an x-axis positive direction. Further, when an X-axis, a Y-axis, and a Z-axis based on the input device 8 coincide with the x-axis, y-axis, and the z-axis, respectively, the orientation of the input device 8 in such a situation is referred to as a reference orientation. The orientation of the input device 8 is represented by its orientation on the xyz-coordinate system when the input device is rotated from its reference orientation in the roll direction (around the Z-axis), in the pitch direction (around the X-axis), and in the yaw direction (around the Y-axis) while the Z-axis direction is set as a reference. The orientation is expressed by a rotation matrix M described later.

Next, the game apparatus 3 performs automatic ball-throwing determination using the angular velocities detected by the two-axis gyro-sensor 55 during the forward-swing motion. Specifically, when the magnitude of an angular velocity vector which is obtained based on the respective angular velocities around the X-axis and around the Y-axis (the magnitude of the angular velocity vector varies depending on the speed of swinging the input device 8) exceeds a predetermined threshold, the game apparatus 3 determines that a ball has been thrown. More accurately, as described later, when the magnitude of the angular velocity vector exceeds the predetermined threshold, and reaches its local maximum value, then it is determined that the ball has been thrown. That is, the game apparatus 3 determines that the bait has been thrown when the player has swung the input device 8 around the X-axis and the Y-axis at a speed faster than a predetermined level.

Next, the game apparatus 3 determines the speed of the thrown ball in accordance with the acceleration detected by the acceleration sensor 37 during a predetermined period of time defined based on the above automatic ball-throwing determination. Namely, the game apparatus 3 determines the speed of the thrown ball in accordance with the magnitude of the acceleration detected by the acceleration sensor 37 during the predetermined period of time prior to the above automatic ball-throwing determination. In addition, the game apparatus 3 changes the speed of the ball in accordance with the magnitude of the acceleration detected by the acceleration sensor 37 during the predetermined period of time after the automatic ball-throwing determination. In this manner, based on the value of the acceleration detected after the automatic ball-throwing determination, the speed of the ball is changed, whereby it is possible to reflect the swinging motion of the player in the game process with enhanced accuracy. That is, in the automatic ball-throwing determination, it is determined that the hall has been thrown when the speed of swinging the input device 8 is equal to or more than a predetermined value. Thus, when a player swings the input device 8 faster, then there may be a case where it is determined that the ball has been thrown while the player is performing a forward-swing motion, which is prior to his/her intended release timing. That is, in the automatic ball-throwing determination, it is difficult to accurately recognize the player's intended release timing, and consequently, there may be a case where it is determined that the ball has been thrown prior to the release timing. In this case, it is estimated that the speed of swinging the input device 8 reaches its maximum level after the automatic ball-throwing determination. When the speed of the ball which is thrown and rotating is determined based on the acceleration detected before the automatic ball-throwing determination, the speed of the rotating ball does not reach a predetermined value or more (i.e., the ball speed based on the threshold of the automatic ball-throwing determination) even if the player swings the input device 8 faster so as to cause the ball to rotate faster. Therefore, based on the magnitude of the acceleration detected during the predetermined period of time after the automatic ball-throwing determination, the speed of the ball is corrected, whereby it is possible to reflect the swinging motion of the player with excellent accuracy in the speed of the ball rotating in a game space.

Further, the game apparatus 3 determines the number of rotations and the rotation direction of the ball in accordance with an integrated value of the acceleration detected by the acceleration sensor 37 and with an integrated value of the angular velocity around the Z-axis detected by the one-axis gyro-sensor 56, during a predetermined period of time before and after the automatic ball-throwing determination. Based on the determined number of rotations and the rotation direction, the game apparatus 3 causes the ball to rotate in a curve (changes the path of the ball). That is, in accordance with the player's motion to twist the input device 8, the ball is caused to move in a curve. Based on the above automatic ball-throwing determination, it is difficult to accurately recognize the player's intended release timing. Therefore, based on the acceleration and the angular velocity detected before and after the automatic ball-throwing determination, rotation (the number of rotations and the rotation direction) of the ball is determined. Accordingly, it is possible to reflect the player's intended ball rotation in the ball in the game space with excellent accuracy. In this manner, the player's actual swinging and twisting of the input device 8 performed before and after the automatic ball throwing determination is reflected in the number of rotations and the rotation direction of the ball in the game space.

Figure 14:
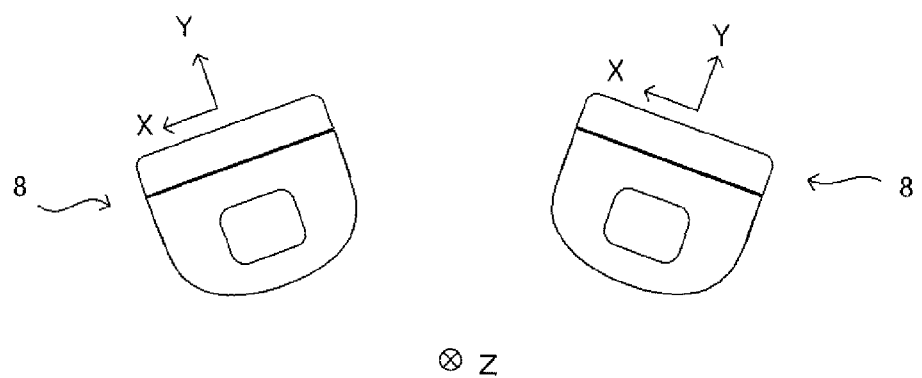
FIG. 14 is a diagram showing an orientation of the input device 8 as viewed from its rear surface in a state where the ball-throwing is finished.

Further, when the orientation of the input device 8 is directed to a predetermined orientation when the player finishes swinging the input device 8 after the automatic ball-throwing determination, the game apparatus 3 corrects the path of the ball. Specifically, in the case where the input device 8 is not rotated in the roll direction (around the Z-axis) after finish motion, which correspond to a state after the player finishes swinging the input device 8, then the game apparatus determines that the player has thrown a ball straight, and thus performs straight correction. The straight correction is to correct the direction of rotating ball such that the ball rotates straight. For example, the game apparatus 3 corrects the rotation direction of the ball such that the ball travels toward pins, or reduces the number of rotations of the ball, thereby correcting direction of the ball so as to rotate straight. FIG. 14 is a diagram showing the input device 8 as viewed from its rear surface in a finish motion state. In FIG. 14, the Z-axis direction is a direction extending from the near side toward the depth direction of the drawing sheet. As shown in FIG. 14, in the finish motion state, when the input device 8 rotates around the Z-axis at a predetermined angle or more, the game apparatus 3 determines that the player has applied rotation to the ball, and consequently does not perform the above straight correction.

Figure 15A:
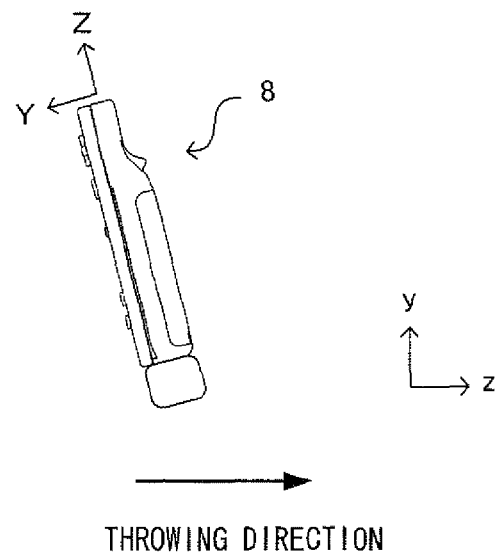
FIG. 15A is a diagram showing the orientation of the input device 8 as viewed from a direction perpendicular to the ball-throwing direction in the state where the ball-throwing is finished.
Figure 15B:
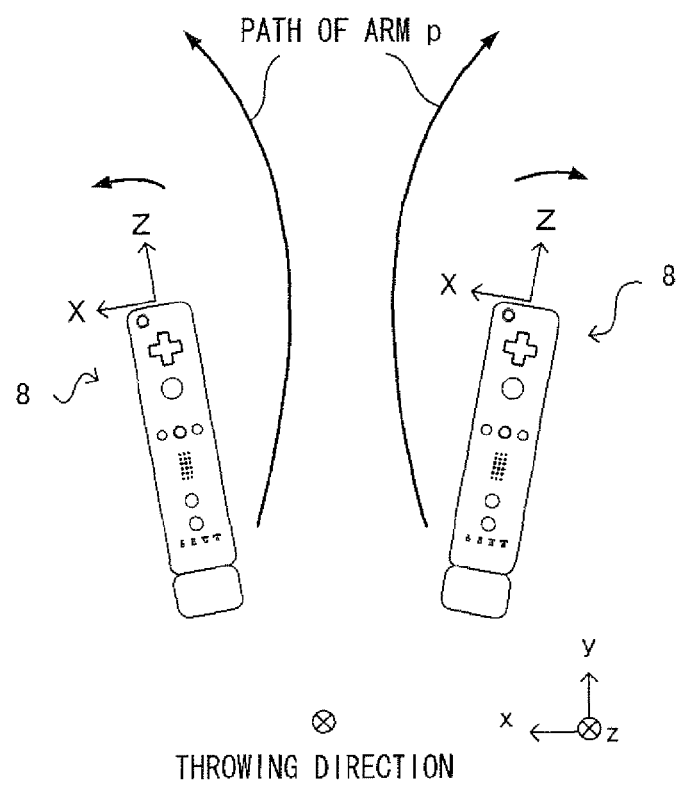
FIG. 15B is a diagram showing the orientation of the input device 8 as viewed from its immediate rear side toward the ball-throwing direction when the ball-throwing is finished, in the case where straight correction is not performed.

In the finish motion state, however, if the top surface of the input device 8 face a downward direction, and the Z-axis positive direction does not face a direction right behind the player, the game apparatus 3 does not perform the straight correction even if the input device 8 does not rotate around the Z-axis at the predetermined angle or more. FIG. 15A is a diagram showing the orientation of the input device 8 in the finish motion state, as viewed from a direction perpendicular to the ball-throwing direction. FIG. 15B is a diagram showing the orientation of the input device 8 in the finish motion state, as viewed from its immediate rear side toward the bowing direction, in the case where straight correction is not performed. As shown in FIG. 15A and FIGS. 15B, under a state where the player finishes swinging the input device 8, when the top surface of the input device 8 faces the downward direction (that is, when a half line infinitely extending from the position of the input device 8 toward the Y-axis positive direction intersects the ground surface), and when the Z-axis tilts toward the x-axis positive direction (on the left side in FIG. 15B) or the x-axis negative direction (on the right side in FIG. 15B) in the xyz-coordinate system, then the game apparatus 3 determines that the player applies rotation to the ball and does not perform the straight correction.

As above described, a reason why whether or not straight correction is performed is determined based on the orientation of the input device 8 in the finish motion state will be described, hereinbelow. When the player throws a straight ball, the player turns his/her palm up, and performs the back-swing motion immediately backward without twisting the wrist, and then performs the forward-swing motion without twisting the wrist. After releasing the ball, the player turns the palm to face the throwing direction (or a direction opposite to the throwing direction in the case of a large swing motion) without twisting the wrist, and finishes the ball-throwing motion (finish motion state). That is, when the player throws a straight ball, the player swings his/her arm straight toward the throwing direction during and after throwing the ball. On the other hand, when the player is to apply spin to a ball, the player is considered to throw the ball while twisting the ball. Thus, in the finish motion state, the wrist of the player is twisted. In this case, the input device 8 is rotated around the Z-axis. Therefore, when the rotation of the input device 8 around the Z-axis is detected in the finish motion state, it is possible to determine whether the player throws a curve ball or a straight ball.

In addition, in the case where the path of the arm after swinging the input device 8 does not extend straight toward the throwing direction, the input device 8 is considered to tilt toward the x-axis positive direction or the x-axis negative direction, as shown in FIG. 15B, in the finish motion state. Further, an arrow P indicative of the path of the arm shown in FIGS. 15B shows the path of the arm of the player moving his/her arm from backward (a state of the instant of shifting from the back-swing to the forward-swing) to forward (the finish motion state), as viewed from an upper side thereof. In this manner, when the path p of the arm does not extend straight toward the throwing direction, it is considered that the player intends to apply a spin to the bail. When the player does not swing the input device 8 straight toward the throwing direction, it is considered that the input device 8 in the finish motion state tilts to a certain degree with respect to the y-axis direction (a direction opposite to the direction of gravity) as shown in FIG. 15B.

As above described, it is possible to determine whether or not the player intends to spin the ball, in accordance with the orientation of the input device 8 in the finish motion state. Therefore, whether or not the straight correction is performed is determined based on the orientation of the input device 8 in the finish motion state, whereby the ball is thrown as intended by the player.

[Details of Game Process]

Figure 16:
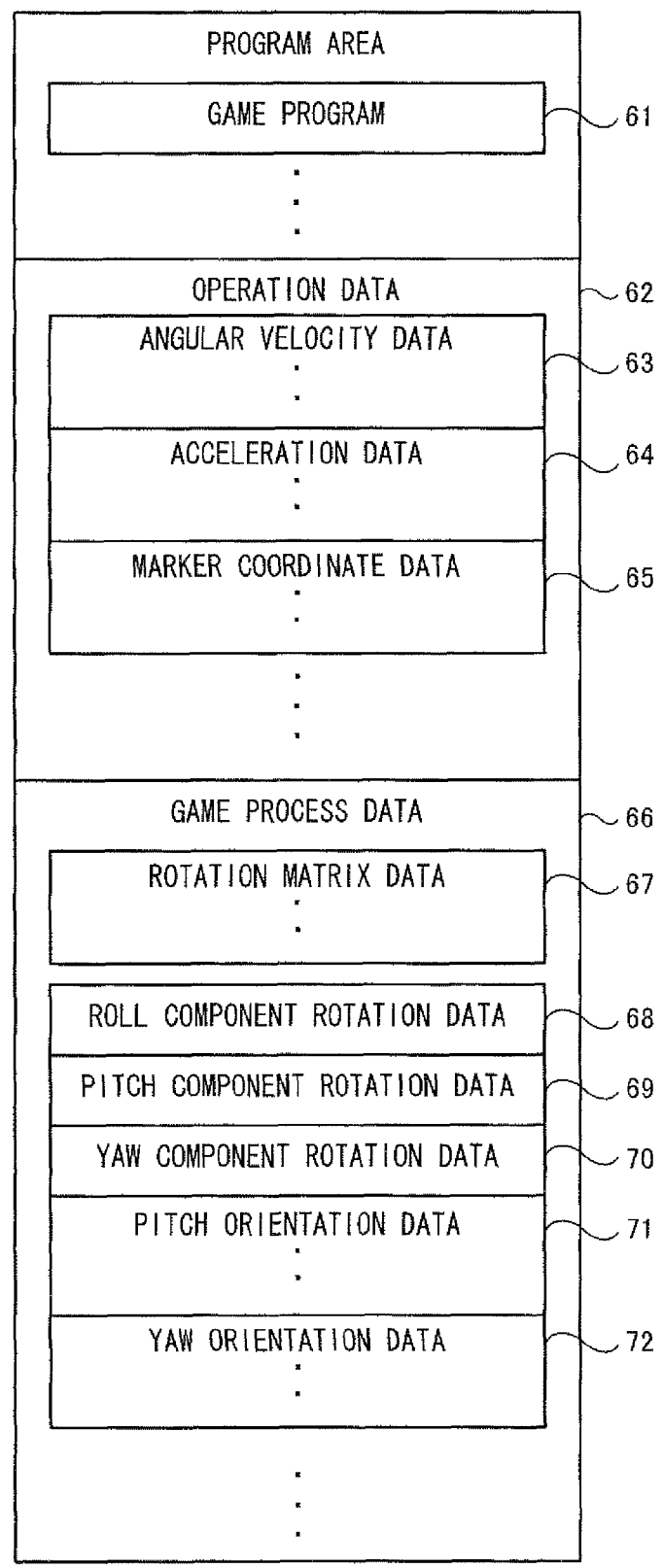
FIG. 16 is a diagram illustrating main data 16 stored in a main memory (external main memory 12 or internal main memory 11e) of the game apparatus 3.

Next, with reference to FIGS. 16 to 29, the process performed on the game apparatus 3 will be described in detail. Firstly, main data used in the process performed on the game apparatus 3 will be described with reference to FIG. 16. FIG. 16 is a diagram illustrating main data stored in the main memory (external main memory 12 or internal main memory 11e) of the game apparatus 3. As shown in FIG. 16, a game program 61, operation data 62, and game process data 66 are stored in the main memory of the game apparatus 3. In addition to the data shown in FIG. 16, data necessary for game process, such as image data of various objects appearing in a game, data representing various parameters of the objects, data representing input state with the use of any of the respective operation buttons 32a to 32i, are stored in the main memory.

A part or all of the game program 61 are read from the optical disc 4 and stored in a program area in the main memory at an appropriate time after the game apparatus 3 is powered on.

The operation data 62 is operation data transmitted from the controller 5 to the game apparatus 3. As described above, the operation data is transmitted from the controller 5 to the game apparatus 3 at intervals of 1/200 seconds, and the operation data 62 stored in the main memory is updated at the same intervals. In the present embodiment, the operation data transmitted at intervals of 1 1/200 seconds is regarded as one sample, and in addition to the most recent operation data (having been obtained most recently), a predetermined number of pieces of operation data obtained in the past is stored in the main memory.

The operation data 62 includes angular velocity data 63, acceleration data 64, and marker coordinate data 65. In addition, the operation data 62 also includes data indicative of whether or not the respective buttons are pressed. The angular velocity data 63 is a set of data representing angular velocities detected by the gyro-sensors 55 and 56 of the gyro-sensor unit 7. The angular velocity data 63 represents the angular velocities around the respective axes in the XYZ-coordinate system shown in FIG. 3, and also represents a set of angular velocities around the respective axes detected currently and in the past. The acceleration data 64 is a set of data representing acceleration (acceleration vector) detected by the acceleration sensor 37 currently and in the past.

The marker coordinate data 65 is data representing the above-described marker coordinate point, i.e., the coordinate point calculated by the image processing circuit 41 of the imaging information calculation section 35. The marker coordinate point is based on a two-dimensional coordinate system for representing, on a plane, a position corresponding to a captured image.

The game process data 66 is data used for a game process (FIG. 17) described later. The game process data 66 includes rotation matrix data 67, roll component rotation data 68, pitch component rotation data 69, yaw component rotation data 70, pitch orientation data 61, and yaw orientation data 72.

The rotation matrix data 67 is data representing rotation of the input device 8 (controller 5) from the reference orientation (the orientation in the case where the XYZ-axes coincide with the xyz-axes) to the current orientation, and the rotation is represented as a rotation matrix M. As will be described later, the rotation matrix M is represented by unit vectors of the input device 8, which indicate the X-axis, Y-axis, and Z-axis directions, and by expressing the unit vectors with the use of the coordinate system in the space defined by the xyz-axes. In the same manner as the operation data 62, the rotation matrix data 67 is a set of data representing a predetermined number of samples of rotation matrices M in addition to the most recent rotation matrix M. The rotation matrix M is represented by a 3×3 matrix, as shown below $$M = \begin{bmatrix} Xx & Yx & Zx \\ Xy & Yy & Zy \\ Xz & Yz & Zz \end{bmatrix} \quad (1)$$

In addition, the roll component rotation data 68 is data representing rotation of the input device 8 around the Z-axis, and referred to as a roll component rotation matrix Mr. The pitch component rotation data 69 is data representing rotation of the input device 8 around the X-axis, and referred to as a pitch component rotation matrix Mp. Further, the yaw component rotation data 70 is data representing rotation of the input device 8 around the Y-axis, and referred to as a yaw component rotation matrix My. The roll component rotation matrix Mr, the pitch component rotation matrix Mp, and the yaw component rotation matrix My are each represented by a 3×3 matrix shown in the following formulas (2) to (4).

$$Mr = \begin{bmatrix} \cos\theta r & -\sin\theta r & 0 \\ \sin\theta r & \cos\theta r & 0 \\ 0 & 0 & 1 \end{bmatrix} \quad (2)$$

$$Mp = \begin{bmatrix} 1 & 0 & 0 \\ 0 & \cos\theta p & \sin\theta p \\ 0 & -\sin\theta p & \cos\theta p \end{bmatrix} \quad (3)$$

$$My = \begin{bmatrix} \cos\theta y & 0 & -\sin\theta y \\ 0 & 1 & 0 \\ \sin\theta y & 0 & \cos\theta y \end{bmatrix} \quad (4)$$

Here, rotation angles in the roll direction (around the Z-axis), the pitch direction (around the X-axis), and the yaw direction (around the Y-axis) are set as $\theta r$, $\theta p$, and $\theta y$, respectively. The angles $\theta r$, $\theta p$, and $\theta y$ are obtained based on the angular velocity data 63. In other words, the angle $\theta r$ is a rotation angle from the reference orientation around the Z-axis, and the rotation angle is obtained by integrating the angular velocity around the Z-axis. In a similar manner, the angles $\theta p$, and $\theta y$ are also obtained by integrating the angular velocity around the X-axis, and the Y-axis, respectively. Generally, since an output from the gyro-sensors may include errors caused by drifts or the like, the orientation of the input device 8 may be corrected not only based on the integration of the angular velocity but also based on the acceleration data 64. Specifically, when the input device 8 is in a static state, or in a uniform motion, the acceleration indicated by the acceleration data 64 corresponds to the gravity, and thus the orientation of the input device 8 is calculated based on the gravity direction, and the orientation calculated based on the angular velocity is corrected so as to be approximated to the orientation calculated based on the acceleration. In that case, if the degree of correction is set to be increased in the case where the magnitude of the acceleration is close to the magnitude of the gravity, it is possible to ignore the orientation of the input device in the case where the orientation cannot be calculated based on the acceleration, such as a case where the input device is moving. Further, it is possible to correct the orientation of the input device in accordance with the marker coordinate data 65. That is, it is possible to calculate the orientation of the input device in the roll direction, based on a direction connecting the two marker coordinate points. In addition, it is possible to correlate the position of the marker coordinate points to the orientation in the yaw direction and/or in the pitch direction. Accordingly, the orientation calculated based on the angular velocity and the orientation calculated based on the acceleration are approximated to the orientation calculated based on the marker coordinate points to a certain degree, whereby the orientation is corrected.

The above-described rotation matrix M is a result of the product of rotation matrices indicative of rotations in the roll direction, in the pitch direction, and in the yaw direction with respect to the Z-axis. That is, the rotation matrix M is the result of the product of the respective components in the rotation matrices expressed by the above formulas (2) to (4). In the present embodiment, the rotation matrix M (rotation matrix data 67) is calculated every time the angular velocity data 63 is updated (at intervals of 1/200 seconds), and is stored in the main memory.

The pitch orientation data 71 is a set of data indicative of the orientation of the input device 8 in the pitch direction in the xyz-coordinate system, and the orientation in the pitch direction is obtained based on the above rotation matrix M. Here, the orientation in the pitch direction in the xyz-coordinate system is an orientation indicative of rotation around the x-axis, after the input device 8 is rotated based on the object coordinate system (XYZ-coordinate system), as viewed based on the space fixed coordinate system (xyz-coordinate system).

The yaw orientation data 72 is a set of data indicative of the orientation of the input device 8 in the yaw direction in the xyz-coordinate system, and the orientation in the yaw direction is obtained based on the above rotation matrix M. Here, the orientation in the yaw direction in the xyz-coordinate system is an orientation indicative of rotation around the y-axis, after the input device 8 is rotated based on the object coordinate system (XYZ-coordinate system), as viewed based on the space fixed coordinate system (xyz-coordinate system).

Figure 17:
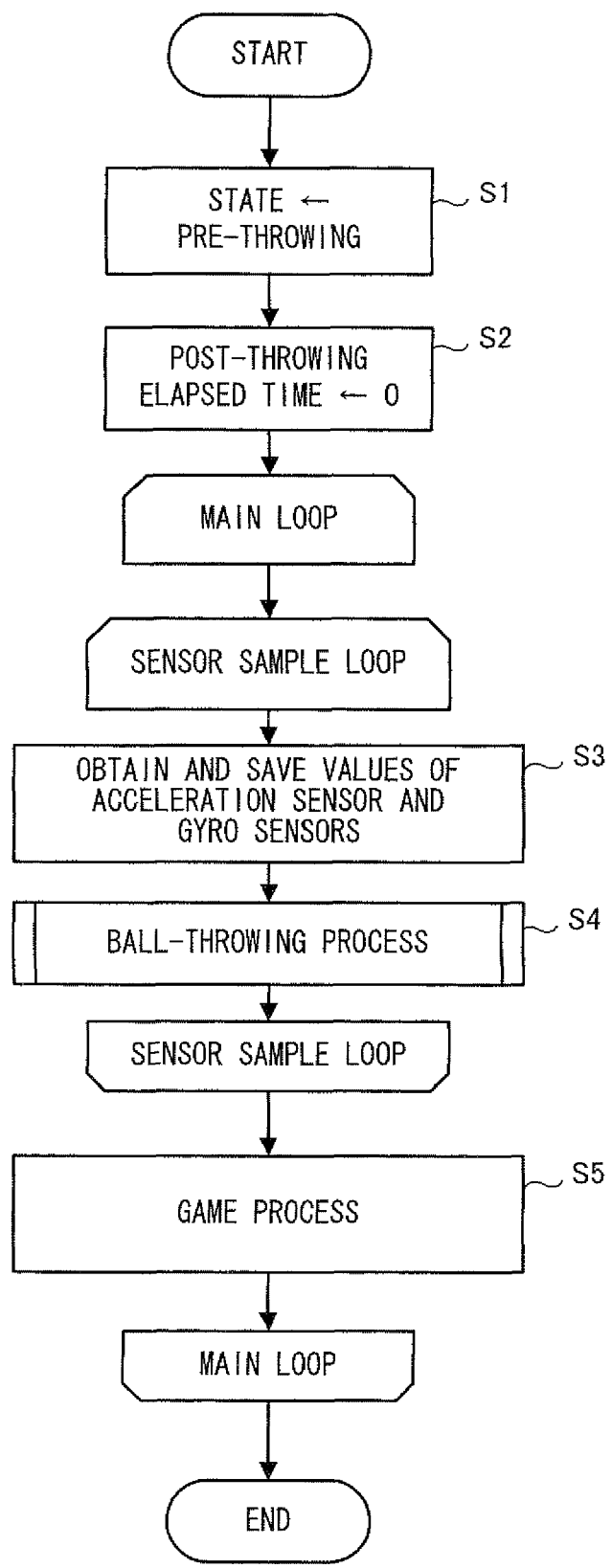
FIG. 17 is a main flowchart showing a flow of a game process executed on the game apparatus 3.

FIG. 17 is a main flowchart showing a flow of a game process executed on the game apparatus 3. When the game apparatus 3 is powered on, the CPU 10 in the game apparatus 3 executes a boot program stored in a boot ROM (not shown), so as to initialize the respective units such as the main memory. The game program stored in the optical disc 4 is loaded to the main memory, and the CPU 10 starts executing the game program 61. The flowchart shown in FIG. 17 is a flowchart illustrating a process performed when the processed described above are completed.

Firstly, in step S1, the CPU 10 sets a pre-throwing state as a current state. Specifically, the CPU 10 stores a value (e.g., 1), indicative of the pre-throwing state, as one of variables (state variables) which are stored in the main memory and which are indicative of the ball-throwing state. Next, in step S2, the CPU 10 sets a post-throwing elapsed time to 0. The post-throwing elapsed time is an elapsed time after the automatic ball-throwing determination, which is described later, is performed. Next, the CPU 10 executes a process of a main loop.

The process of the main loop is executed every frame time (for example, every 1/60 seconds), and is executed repetitively until a game ends. In the main loop process, a process of a sensor sample loop is executed. In the sensor sample loop, a process based on the respective pieces of operation data (acceleration in the respective axes direction and the angular velocities around the respective axes), which is detected by the acceleration sensor 37, the two-axis gyro-sensor 55, and the one-axis gyro-sensor 56 and which is transmitted from the controller 5 at intervals of a sampling period (e.g., 1/200 sec.,), is executed sequentially in accordance with the sampling period. In the sensor sample loop, a process of step S3 is first executed.

In step S3, the CPU 10 stores, in the main memory, values detected by the acceleration sensor 37, the two-axis gyro-sensor 55, and the one-axis gyro-sensor 56. Specifically, the CPU 10 stores the angular velocities around the respective axes transmitted from the controller 5, as the angular velocity data 63, in the main memory. In a similar manner, the CPU 10 stores the acceleration transmitted from the controller 5, as the acceleration data 64, in the main memory. Here, the CPU 10 stores the acceleration and the angular velocities obtained from a current sample and a predetermined number of most recent samples before the current sample, as the history, in the main memory. Next, the CPU 10 executes a process of step 4.

Figure 18:
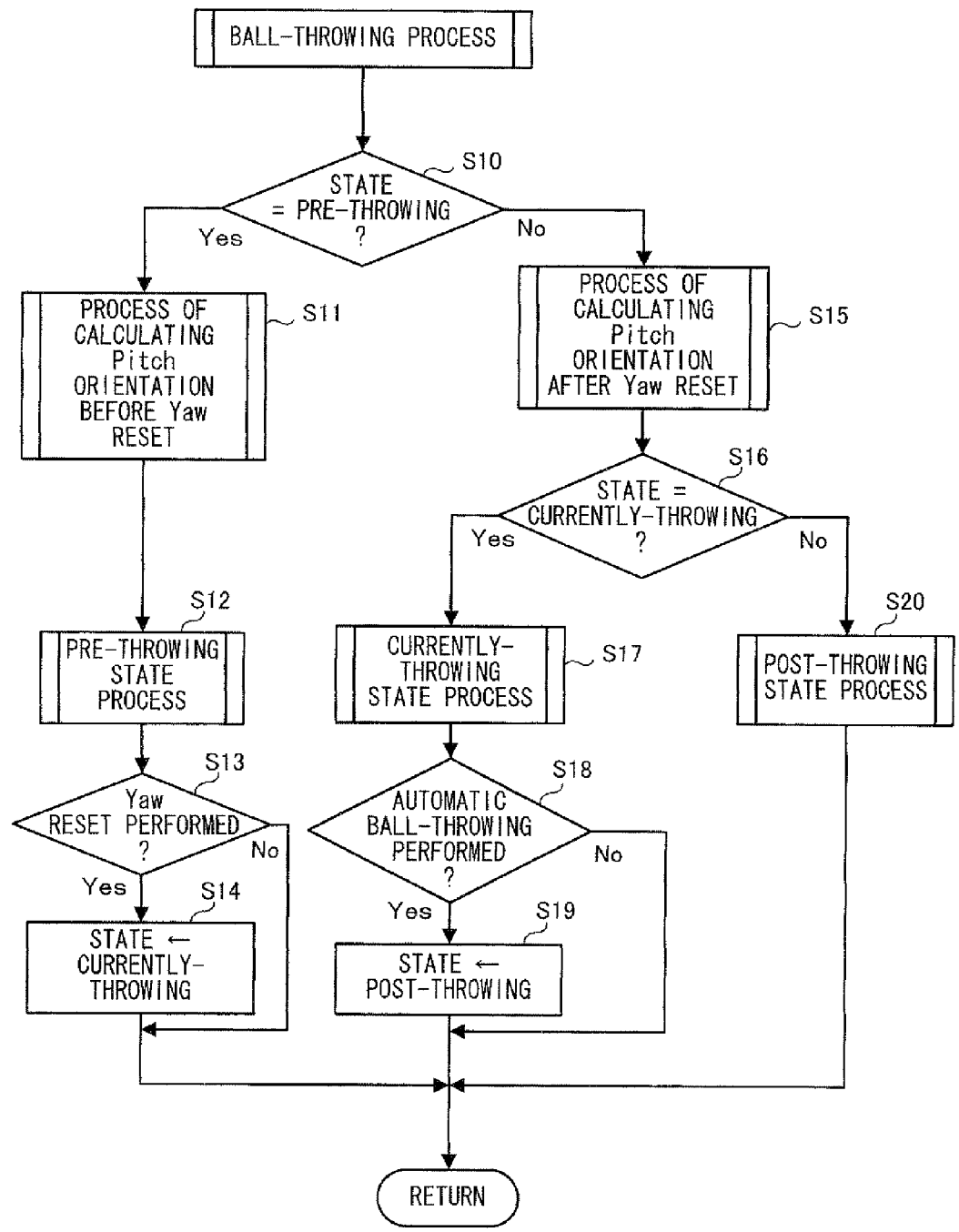
FIG. 18 is a flowchart showing, in detail, a ball-throwing process (step S4) shown in FIG. 17.

In step S4, the CPU 10 executes a ball-throwing process based on the obtained acceleration and the angular velocity. The process in step S4 will be described in detail with reference to FIG. 18. FIG. 18 is a flowchart showing, in detail, the ball-throwing process (step S4) shown in FIG. 17.

Firstly, the CPU 10 executes a process of step 10. In step S10, the CPU 10 determines whether or not the current state is a pre-throwing state. Specifically, the CPU 10 determines whether or not the state variable indicative of the current state corresponds to a value (e.g., 1) indicative of the pre-throwing state. In the present game process, the state is defined as any one of the pre-throwing state, a currently-throwing state, and a post-throwing state. Instep S10, the CPU 10 determines whether or not the current state is a pre-throwing state. The pre-throwing state is a state where the player character holds a ball before starting a throwing motion. The currently-throwing state is a state where the player character is holding a ball and currently performing a throwing motion. The post-throwing state is a state where the player character has released and thrown a ball. When the determination result is Yes, CPU 10 executes a process of step 11 subsequently. When the determination result is No, CPU 10 executes a process of step 15 subsequently.

Figure 19:
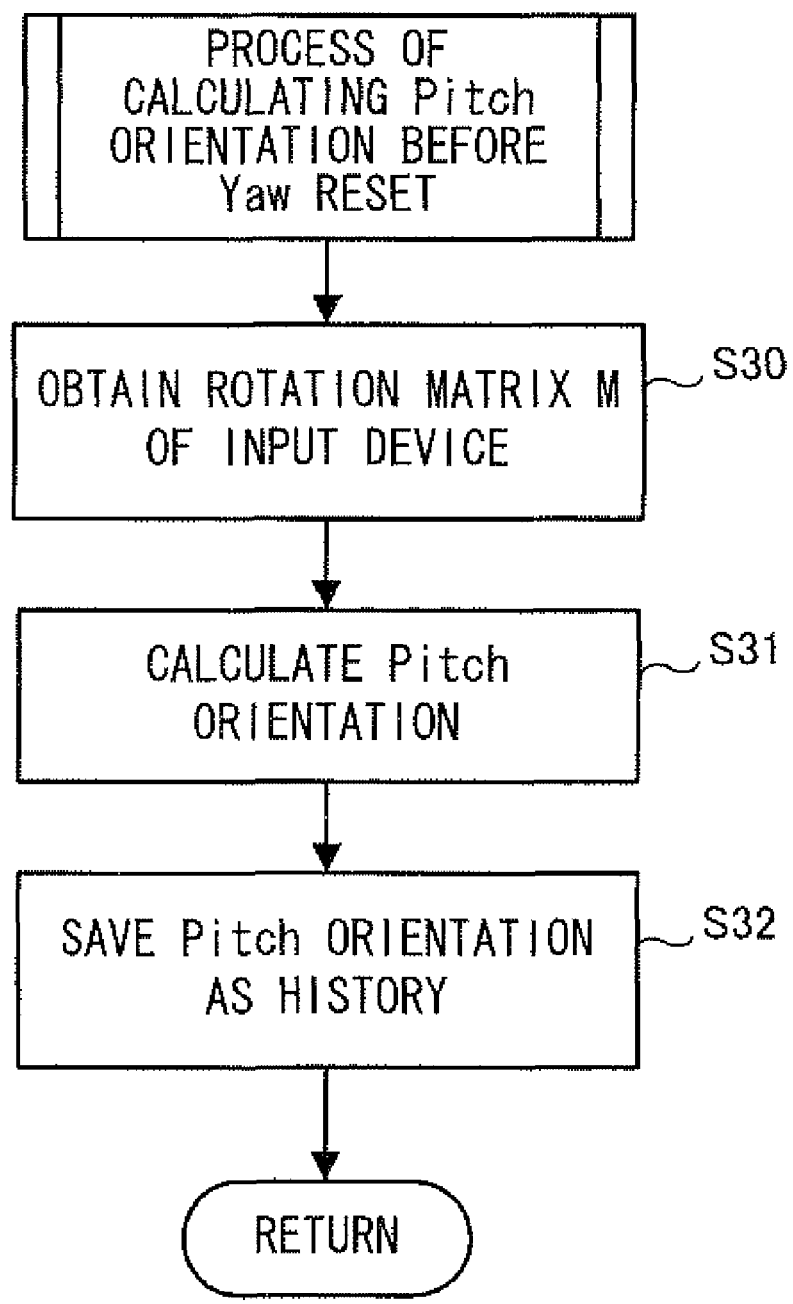
FIG. 19 is a flowchart showing, in detail, a process of calculating a pitch orientation before Yaw reset (step S11)

In step S11, the CPU 10 calculates a pitch orientation before Yaw reset. The process performed in step S11 is to calculate the pitch orientation of the input device 8 before a reset process in the Yaw direction is performed. Here, the pitch orientation is an orientation of the input device 8 with respect to the pitch direction (around the x-axis) in the space fixed coordinate system (xyz-coordinate system). The process to calculate the pitch orientation before the Yaw reset in step S11 will be described in detail with respect to FIG. 19. FIG. 19 is a flow chart showing, in detail, the process of calculating the pitch orientation before Yaw reset (step S11).

Firstly, the CPU 10 executes a process of step S30. In step S30, the CPU 10 obtains a rotation matrix M indicative of the rotation of the input device 8. Specifically, the CPU 10 refers to the main memory, and obtains the rotation matrix data 67. As described above, the rotation matrix data 67 is data representing the rotation matrix M expressed by above formula (1). The rotation matrix M represents the orientation of the input device 8 calculated based on the most recent angular velocities obtained in step S3. Next, the CPU 10 executes a process of step 31.

In step S31, the CPU 10 calculates the orientation in the pitch direction. The orientation in the pitch direction indicates a pitch direction component (rotation around the x-axis) of the orientation of the input device 8 in the xyz-coordinate system in the case where the input device 8 is rotated based on the rotation matrix M. Specifically, the CPU 10 calculates the orientation in the pitch direction by using the following formula (5).

$$\text{Orientation in the pitch direction} = \text{ArcSin}(Zy) \quad (5)$$

Zy is a value calculated based on the rotation matrix M obtained in step S30, and is one of the elements of the rotation matrix M expressed by formula (1). When the unit vector ez (0,0,1) in the Z-axis direction of the object coordinate system (XYZ-coordinate system) is multiplied by the rotation matrix M, the calculated vector ez' satisfies ez'=(Zx, Zy, Zz). In other words, Zy indicates a coordinate value, along the y-axis in the xyz-coordinate system, of a vector after rotation in the case where a unit vector in the Z-axis is rotated from the reference orientation (i.e., the orientation in the case where the XYZ-coordinate system coincides with the xyz-coordinate system) by using the rotation matrix M. In a similar manner, Zx indicates a coordinate value, along the x-axis in the xyz-coordinate system, of a vector after rotation in the case where the unit vector in the Z-axis is rotated from the reference orientation by using the rotation matrix M. Zz also indicates a coordinate value in a similar manner. Further, the other elements also indicates coordinate values in a similar manner. For example, Xz, Xy, and Xz indicate coordinate values, along the x-axis, y-axis, and x-axis in the xyz-coordinate system, of a vector after rotation in the case where the unit vector in the X-axis is rotated from the reference orientation by using the rotation matrix M. Further Yz, Yy, and Yz indicate coordinate values, along the x-axis, y-axis, and z-axis in the xyz-coordinate system, of a vector after rotation in the case where the unit vector in the Y-axis is rotated from the reference orientation by using the rotation matrix M.

Figure 28:
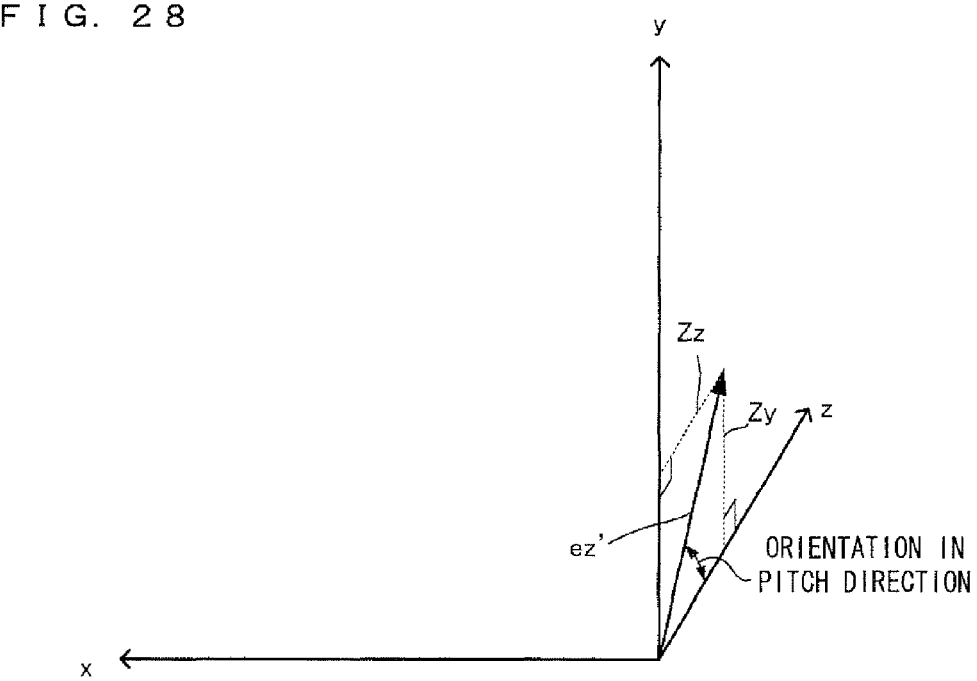
FIG. 28 is a diagram illustrating an orientation in a pitch direction calculated in step S31.

FIG. 28 is a diagram illustrating the orientation in the pitch direction calculated in step S31. In the process in step S31, the orientation in the pitch direction is calculated with the orientation in the yaw direction ignored (i.e., calculated as Zx=0). The orientation in the yaw direction indicates a yaw direction component (rotation around the y-axis) of the orientation of the input device 8 in the xyz-coordinate system in the case where the input device 8 is rotated based on the rotation matrix M. As is clear from FIG. 28, the orientation in the pitch direction obtained based on formula (5) is represented by an angle between the vector ez' (0, Zy, Zz) after rotation and the Z-axis.

Figure 29:
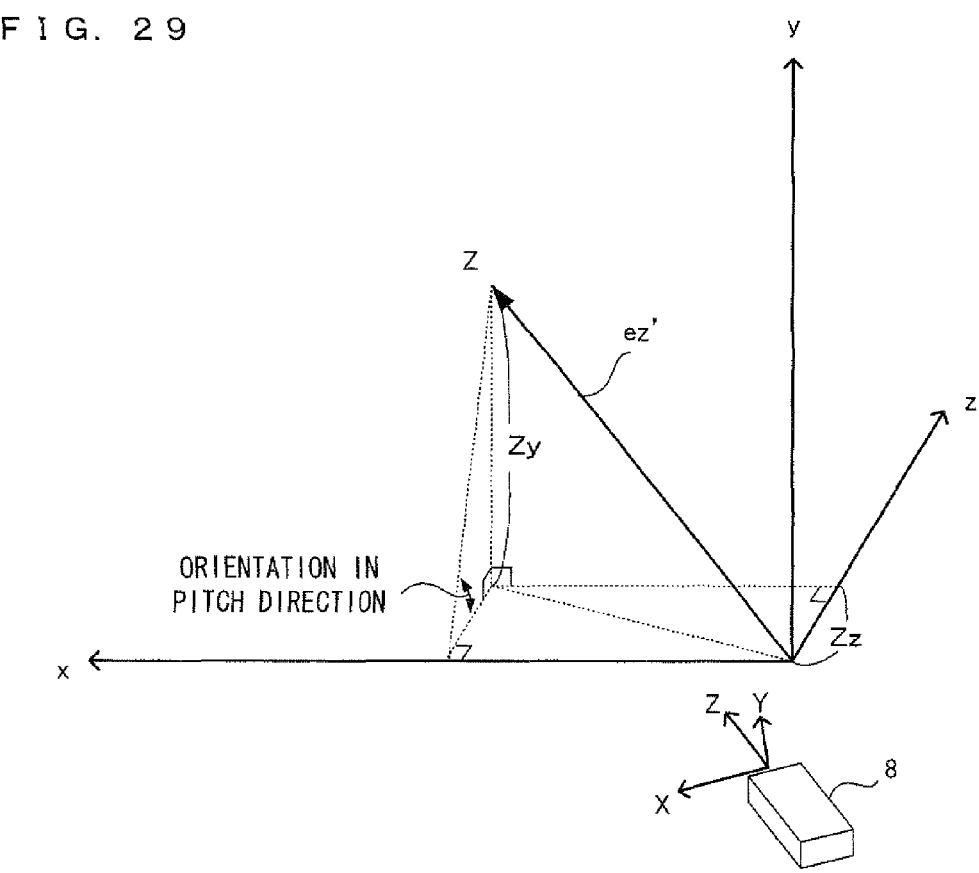
FIG. 29 is a schematic diagram illustrating the orientation in the pitch direction and in a yaw direction.

On the other hand, there may be a case where the Z-axis after rotation tilts with respect to the x-axis (that is, a case where Zx is not equal to 0). The orientation in the pitch direction and the orientation in the yaw direction in this case will be described with reference to FIG. 29. FIG. 29 is a schematic diagram illustrating the orientation in the pitch direction and the orientation in the yaw direction. In FIG. 29, the vector ez' is a vector obtained by rotating the unit vector ez which is along the Z-axis direction, around the X-axis (or x-axis) and around the Y-axis (or y-axis) As shown in FIG. 29, the orientation in the pitch direction is represented by an angle between the z-axis and a zy projection vector which is obtained by projecting, on a zy plane, the rotated unit vector ez' along the Z-axis. That is, the orientation in the pitch direction represents the amount of rotation around the x-axis. Specifically, the orientation in the pitch direction in this case is obtained by the following formula (6), instead of by formula (5).

$$\text{Orientation in the pitch direction} = \text{ArcTan}(Zy/Zz) \quad (6)$$

Further, the orientation in the yaw direction is an orientation indicative of the amount of deviation of the vector ez' in the x-axis. Specifically, the orientation in the yaw direction is represented by an angle between the z-axis and an xz projection vector which is obtained by projecting the vector ez' on an xz plane. That is, the orientation in the yaw direction represents the amount of rotation around the y-axis.

However, in step S31, the orientation in the pitch direction is obtained based on formula (5) while the component in the x-axis direction, that is, the orientation in the yaw direction (rotation around the y-axis), is not taken into consideration. The reason for this is described below.

That is, the orientation (orientation in the xyz-coordinate system) of the input device 8 can be constantly obtained with accuracy with respect to its orientation n the roll direction (rotation around the z-axis) and the orientation in the pitch direction (rotation around the x-axis). However, it is difficult to obtain the orientation of the input device 8 with respect to its orientation in the yaw direction (rotation around the y-axis) depending on the conditions.

Specifically, rotation angles around the respective axes are obtained from the angular velocities detected by the gyro-sensors, whereby the orientation of the input device 8 is calculated. However, since each rotation angle around each axis base on the angular velocity is obtained by integrating the angular velocity with time, errors will be accumulated over time. In addition, the rotation angle to be obtained represent a rotation angle from a certain orientation, and thus if the certain orientation does not coincide with the reference orientation, it is impossible to obtain an accurate orientation in the xyz-coordinate system. However, with respect to the orientation in the roll direction and the orientation in the pitch direction, such errors can be corrected by using the acceleration data detected by the acceleration sensor 37. For example, when the input device 8 is in a static state, the direction of the acceleration vector detected by the acceleration sensor 37 coincides with the direction of gravity. Therefore, based on the direction of the acceleration vector detected by the acceleration sensor 37, it is possible to obtain the degree of rotation of the input device 8 in the roll direction (around the Z-axis) and in the pitch direction (around the X-axis). Further, even if the input device 8 is not in a static state, an average of the acceleration vector detected by the acceleration sensor 37 during a certain period of time is close to the direction of gravity. Therefore, when the average direction of the detected acceleration vector approximately coincides with the Y-axis negative direction, it is known that the input device 8 is not rotating in the roll direction or in the pitch direction. Accordingly, the rotation of the input device 8 in the roll direction and in the pitch direction can be obtained with a certain degree of accuracy. On the other hand, it is impossible to detect the rotation around the direction of gravity (the orientation in the yaw direction) from the result of the detection by the acceleration sensor 37. Therefore, the orientation in the yaw direction (rotation in the y-axis) cannot be obtained accurately when a Yaw reset process is yet to be performed (however, in the case where images of the markers 6R and 6L are included in an image generated by the image pickup element 40 of the controller 5, it is possible to accurately obtain the orientation of the input device 8 in the yaw direction (rotation around the y-axis) in accordance with the above marker coordinate point).

For the above-described reason, in step S31, the orientation in the yaw direction (rotation around the y-axis) is not taken into consideration. Therefore, in step S31, the CPU 10 calculates the orientation in the pitch direction by using formula (5) assuming that the input device 8 is not rotating in the yaw direction (i.e., the Z-axis is not tilting toward the x-axis direction).

When the input device 8 is rotated in the roll direction (around the Z-axis), in the pitch direction (around the X-axis), and in the yaw direction (around the Y-axis) at angles of θr, θp, and θy, respectively, the orientation in the pitch direction (rotation around the x-axis) and the orientation in the yaw direction (rotation around the y-axis) in the xyz-coordinate system after such rotation do not necessarily coincide with the angles θp and θy, respectively. For example, when the input device 8 is rotated in the roll direction (around the Z-axis) at an angle θr, and is further rotated in the pitch direction (around the X-axis) at an angle θp, the orientation of the input device 8 in the xyz-coordinate system indicates as if it is rotated in the yaw direction (around the y-axis) as well although the input device 8 is not rotated in the yaw direction (around the Y-axis). Therefore, in the present specification, to distinguish the rotation in the object coordinate system (XYZ-coordinate system) from the orientation in the space coordinate system (xyz-coordinate system) after the rotation, the "orientation in the pitch direction" represents the rotation around the x-axis in the xyz-coordinate system, whereas the "rotation in the pitch direction" represents the rotation around the X-axis in the XYZ-coordinate system, for instance, except for a case where the coordinate system is distinguishably expressed.

With reference back to FIG. 19, the CPU 10 executes a process of step 32. In step S32, the CPU 10 stores, as a history, the orientation in the pitch direction calculated in step S31. Specifically, the CPU 10 stores, in the main memory, the calculated orientation in the pitch direction as the pitch orientation data 71. Thereafter, the CPU 10 ends the process of calculating the pitch orientation before Yaw reset, and executes a process of step S12 shown in FIG. 18.

Figure 20:
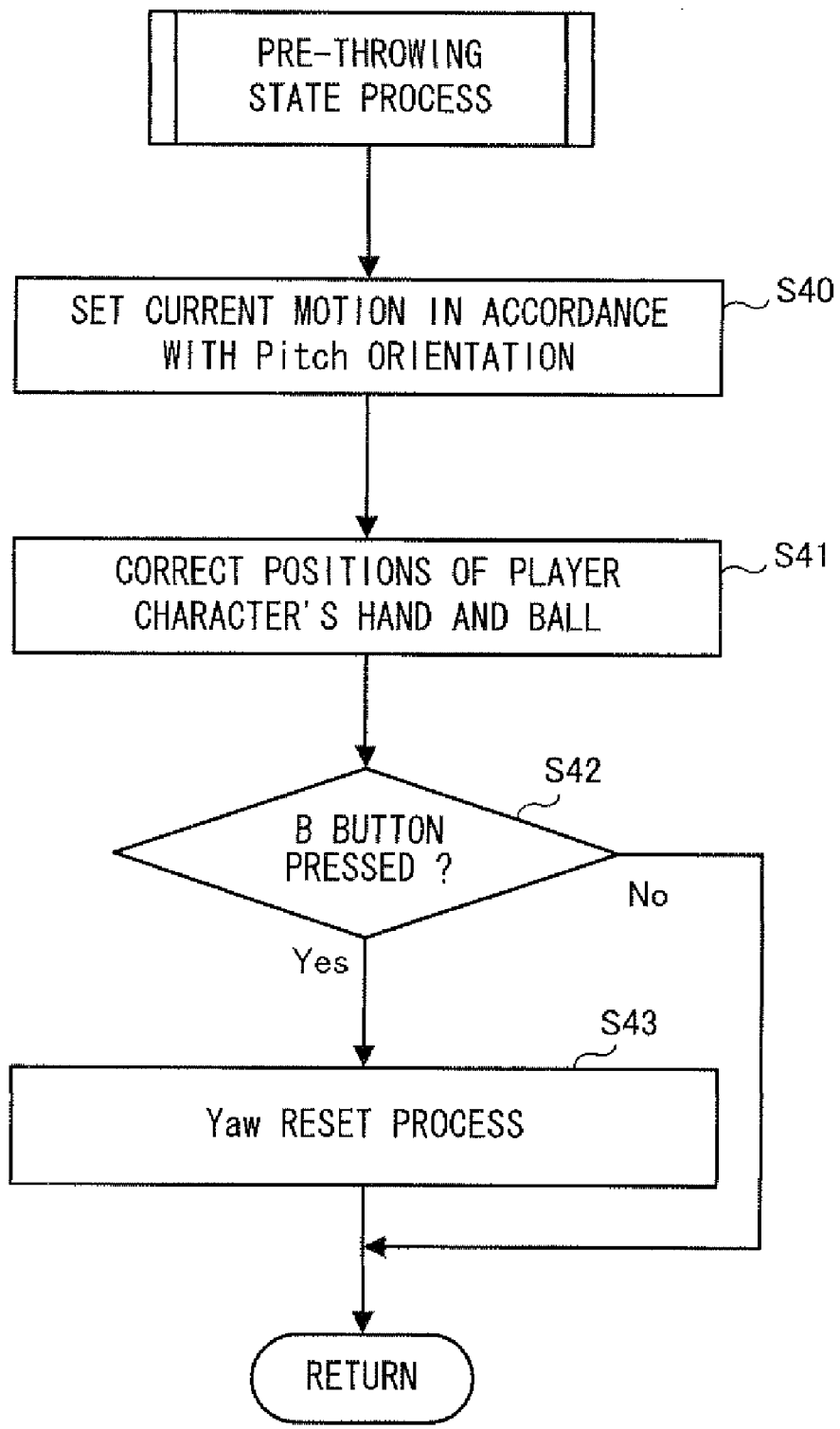
FIG. 20 is a flowchart showing, in detail, a pre-throwing state process (step S12)

With reference back to FIG. 18, in step S12, the CPU 10 executes a process of the pre-throwing state. In step S12, a process in the pre-throwing state is performed. The process of the pre-throwing state in step S12 will be described in detail with reference to FIG. 20. FIG. 20 is a flowchart showing, in detail, the pre-throwing state process (step S12).

In step S40, the CPU 10 sets a current motion in accordance with the orientation in the pitch direction. Specifically, the CPU 10 obtains the most recent orientation in the pitch direction calculated in step S31 from the pitch orientation data 71 in the main memory. Then, the CPU 10 selects a motion image that is correlated with the orientation in the pitch direction, from among a plurality of motion images stored in advance in the main memory, and sets the motion image as the current motion. For example, there are several dozen images of player characters in the main memory, and a motion image is selected in accordance with the orientation in the pitch direction, whereby an image of a player character performing a motion corresponding to a motion of a player is displayed on the television 2 in step S5, which is to be described later. Next, the CPU 10 executes a process of step S41.

In step S41, the CPU 10 corrects a position of the player character's hand and a position of a ball. Performed is a process to correct the position of the player character's hand a portion between the wrist and the finger tips) and the position of the ball in accordance with the orientation of the input device 8 in the yaw direction (rotation in the y-axis) while the position of the player character's wrist is defined as the center. More specifically, the position of the player character's hand is moved in the left/right direction relative to the throwing direction, n accordance with a value of an element Zx in a rotation matrix M. The element Zx in the rotation matrix M is a coordinate value of a vector along the x-axis in the xyz-coordinate system after rotation, in the case where a unit vector along the Z-axis is rotated by using the rotation matrix M. Therefore, for example, when the player swings the input device 8 on the right side while facing the screen, the position of the player character's hand and the position of the ball moves on the right side relative to the lane in accordance with the player's motion. Specifically, in step S41, the CPU 10 refers to the main memory and obtains a most recent rotation matrix M (rotation matrix data 67) which is obtained in step S30, and calculates an amount of correction in the x-axis direction by multiplying the value of the element Zx n the rotation matrix M by a predetermined coefficient. The CPU 10 applies the calculated amount of correction in the x-axis direction to the position of the hand and the position of the ball in the x-axis direction in the current motion set in step S40, thereby setting a new current motion.

As described above, in step S41, it is difficult to accurately obtain the orientation in the yaw direction (rotation in the y-axis). In other words, it is impossible to accurately understand the degree of rotation of the input device 8 in the yaw direction from the reference orientation (how much the front edge portion (light receiving surface 35a) of the controller 5 is deviated in the x-axis direction). However, with respect to the pre-throwing state, which is prior to the ball-throwing motion, the ball direction and strength and the like when a ball is thrown is irrelevant, and thus an inaccurate orientation in the yaw direction does not cause any problem. In the present case, for the sake of effective display, the position of the player character's hand and the position of the ball are corrected.

Next, the CPU 10 determines, in step S42, whether or not the B button 32*i* has been pressed. When determining that the B button 32*i* has been pressed, the CPU 10 executes a process of step S43 subsequently. When determining that the B button 32*i* is yet to be pressed, the CPU 10 ends the pre-throwing state process, and returns the process to the ball-throwing process shown in FIG. 18.

In step S43, the CPU 10 executes the Yaw reset process. Specifically, the CPU 10 calculates the orientation in the pitch direction by using formula (5), and sets the calculated orientation as the current orientation. In the process, an inaccurate orientation in the yaw direction is reset, and the orientation in the pitch direction is set as the current orientation. That is, in step S43, the orientation in the yaw direction is set to 0 when the player presses the button 32*i* (at this time, the player holds the input device 8 in an attitude shown in FIG. 9). As above described, since the orientation in the yaw direction may not be accurate, a point of time when the B button 32*i* is pressed is set as a reference point, and rotation in the yaw direction from the reference point is reflected in the subsequent ball-throwing process. Then, the CPU 10 ends the pre-throwing state process, and returns the process to the ball-throwing process shown in FIG. 18.

With reference back to FIG. 18, in step S13, the CPU 10 determines whether or not the Yaw reset has been performed. Specifically, when the Yaw reset process (the above-described process in step S43) is performed in step S12, the CPU 10 determines that the Yaw reset has been performed. When a result of the determination is Yes, the CPU 10 subsequently executes a process of step S14. When the result of the determination is No, CPU 10 ends the ball-throwing process shown in FIG. 18.

In step S4, the CPU 10 sets the currently-throwing state as the current state. Specifically, the CPU 10 stores a value (e.g., 2) indicative of the currently-throwing state in the state variables which are stored in the main memory. Therefore, since the currently-throwing state is set when the B button 32*i* has been pressed, it is possible to prevent ball-throwing from being performed by mistake, before the B button 32*i* is pressed, that is, even if the input device 8 is moved when the player does not intend to throw a ball. In addition, the player can throw a ball while pressing the B button 32*i*, and thus, when the player applies a force to his/her index finger, the player can hold the input device securely. Next, the CPU 10 ends the ball-throwing process shown in FIG. 18.

On the other hand, in step S10, when determining that the current state is not in the pre-throwing state, the CPU 10 executes the process of step S15 subsequently.

Figure 21:
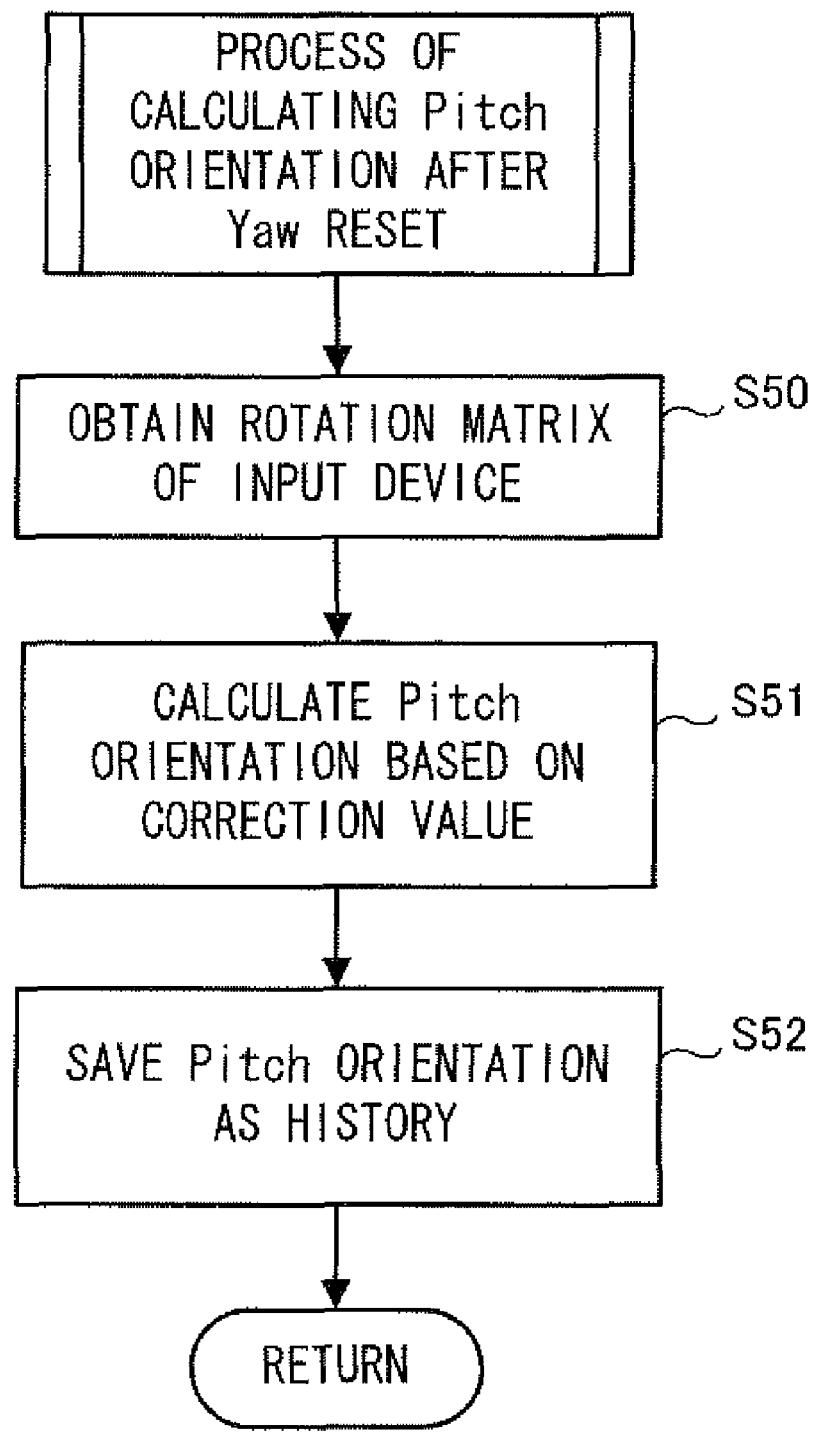
FIG. 21 is a flowchart showing, in detail, a process of calculating a pitch orientation after Yaw reset (step S15)

In step S15, the CPU 10 calculates the pitch orientation after the Yaw reset. In step S15, the orientation of the input device 8 in the pitch direction after the Yaw reset process is calculated. The process of calculating the pitch orientation after the Yaw reset, which is performed in step S15, will be described in detail with reference to FIG. 21. FIG. 21 is a flow chart showing, in detail, the process of calculating the pitch orientation after the Yaw reset (step S15).

Firstly, the CPU 10 executes a process of step S50. In step S50, the same process as that in above step S30 is performed. Namely, the CPU 10 obtains a rotation matrix M indicative of the rotation of the input device 8. Next, the CPU 10 executes a process of step 51.

In step S51, the CPU 10 calculates the orientation in the pitch direction based on a correction value. Specifically, the CPU 10 calculates the correction value using the following formula (7) or (8).

$$\text{Correction value } A = Zx \times Zx \tag{7}$$

$$\text{Correction value } A = -Zx \times Zx \tag{8}$$

In the case where Zx is a positive value, the correction value A is calculated by using formula (7), whereas in the case where the Zx is a negative value, the correction value A is calculated by using formula (8). When Zx is 0, the correction value A is 0. The CPU 10 calculates the orientation in the pitch direction using the following formula (9).

$$\text{Orientation in the pitch direction} = \text{ArcTan}((Zy \text{ correction value } A)/Zz) \tag{9}$$

Formula (9) corresponds to above formula (6) having added thereto correction value A. Hereinafter, the reason why the correction value A is added will be described.

While the input device 8 is swung from the reference orientation in the horizontal direction, the value of Zy is close to 0, and thus the orientation in the pitch direction calculated by using above formula (6) is a value close to 0. That is, when the input device 8 is swung at a predetermined angle in the horizontal direction, the input device 8 rotates on the xz-plane, and accordingly, the value of Zy stays 0. However, when the player swings the input device 8 in the horizontal direction, the input device 8 actually fluctuates in the vertical direction (y-axis direction), the value of Zy slightly deviates from 0 toward the negative side or the positive side. When the input device 8 is to be swung in the horizontal direction from the reference orientation at a small angle, a value of Zy/Zz is close to 0, and the orientation in the pitch direction calculated by using formula (6) results in an angle close to 0 degrees. When the input device 8 is swung in the horizontal direction at an angle as close to as 90 degrees relative to the reference orientation, the value of Zz is close to 0. Then, as to a value of Zy/Zz, since the denominator is close to 0, the value of Zy/Zz will be significantly increased when the value of Zy is slightly increased, and consequently, Zy/Zz will be a large positive value. In this case, the orientation in the pitch direction calculated by using formula (6) is a value close to 90 degrees. On the other hand, under a condition where the value of Zz is close to 0, when the Zy indicates a negative value (i.e., the front edge of the input device 8 slightly deviates downwardly), Zy/Zz indicates an extremely large negative value. That is, under a condition where the input device 8 is swung in the horizontal direction at an angle of 90 degrees relative to the reference orientation, when the front edge of the input device 8 deviates in the vertical direction, the value of Zy/Zz fluctuates between an infinite value and a negative infinite value. Therefore, the orientation in the pitch direction calculated by using formula (6) fluctuates between 90 degrees and −90 degrees. Accordingly, the motion image is set in accordance with the orientation in the pitch direction, and thus the player character displayed on the screen moves from a certain orientation to a completely opposite direction instantaneously. Therefore, when the orientation in the pitch direction is calculated by using formula (6), there may be a case where the player character performs an awkward movement. In order to prevent the player character from performing such an awkward movement, in step S51, the orientation in the pitch direction is calculated by using formula (9).

Note that the above-described correction value A may be calculated based on any method, and for example, the correction value A may be calculated based on the value of Yz.

Next, the CPU 10 executes a process of step 52. In step S52, in the same manner as the process in step S32, the CPU 10 stores, in the main memory, the orientation in the pitch direction calculated in step S51 as a history. The CPU 10 then ends the process of calculating the pitch orientation after the Yaw reset, and returns the process to the ball-throwing process shown in FIG. 18.

Figure 22:
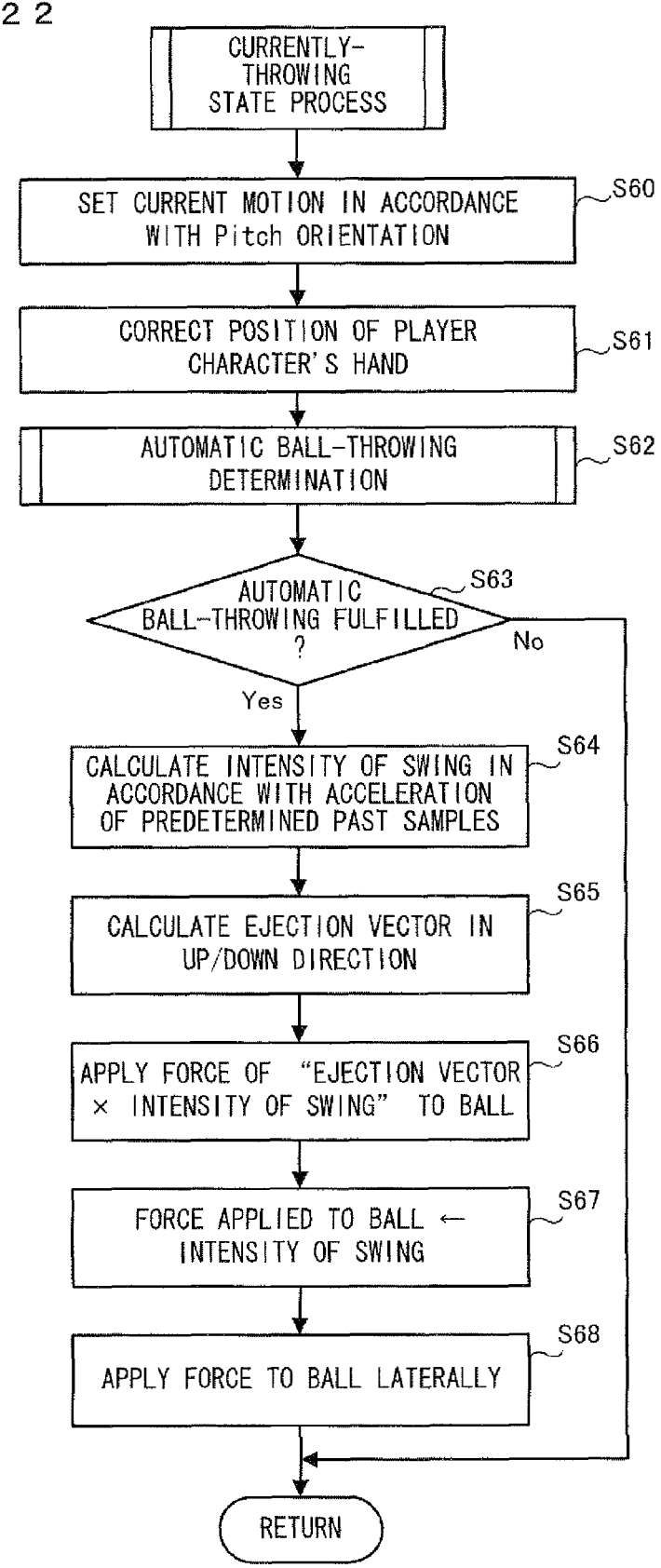
FIG. 22 is a flowchart showing, in detail, a currently-throwing state process (step S17)

With reference back to FIG. 18, the CPU 10 executes a process of step S16. In step S16, the CPU 10 determines whether or not the current state is a currently-throwing state. Specifically, the CPU 10 determines whether or not a state variable indicative of the current state corresponds to a value (e.g., 2) indicative of the currently-throwing state. When the result of the determination is Yes, the CPU 10 executes a process of step S17 subsequently. When the result of the determination is No, the CPU 10 executes a process of step S20 subsequently.

in step S17, the CPU 10 executes the currently-throwing state process. In step S17, a process of the currently-throwing state is performed. The process of the currently-throwing state in step S17 will be described in detail with reference to FIG. 22. FIG. 22 is a flowchart showing, in detail, the process of the currently-throwing state (step S17).

Firstly, in step S60, the CPU 10 sets the current motion in accordance with the orientation in the pitch direction. Specifically, in the same manner as the process in above-described step S40, the CPU 10 obtains, from the main memory, the orientation in the pitch direction calculated in step S51, and sets an motion image corresponding to the obtained orientation in the pitch direction as the current motion. Next, in step S61, in the same manner as the process in step S41, the CPU 10 corrects the position of the player character's hand and that of the ball in accordance with the orientation of the input device 8 in the yaw direction. Next, the CPU 10 performs a process of step 62.

Figure 23:
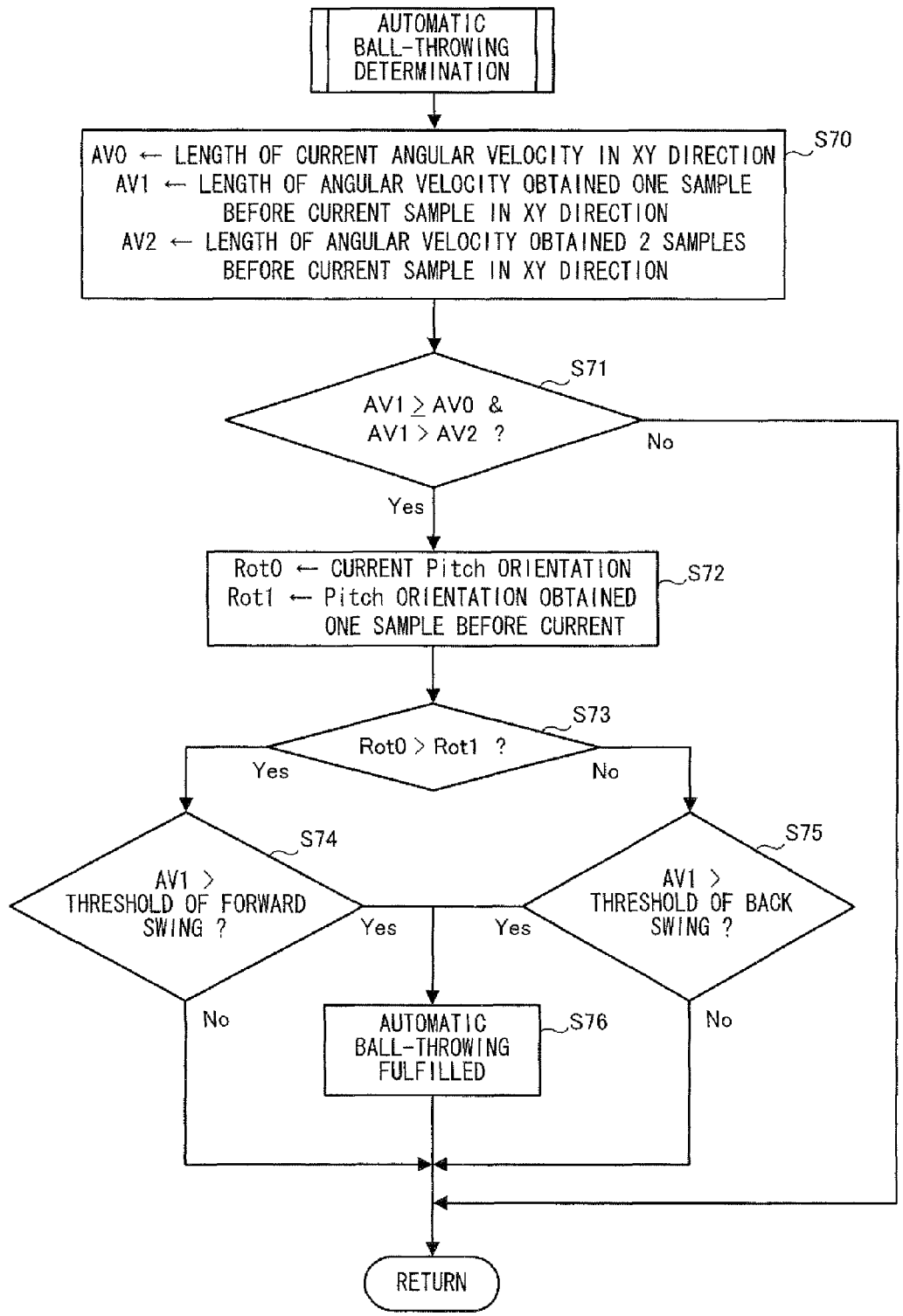
FIG. 23 is a flowchart showing, in detail, an automatic ball-throwing determination process (step S62)

In step S62, the CPU 10 executes a process of the automatic ball-throwing determination. In step S62, in the case where the speed (intensity) of swinging the input device 8 reaches its local maximum value, if the local maximum value is greater than a predetermined threshold, the CPU 10 determines that the player has thrown a ball. When the player performs motions as shown in FIGS. 10 to 12, the angular velocities detected by the gyro-sensors 55 and 56 change. The process performed in step S62 is to determine whether or not a ball has been thrown in accordance with such changing angular velocities. The process of the automatic ball-throwing determination in step S62 will be described in detail with reference to FIG. 23. FIG. 23 is a flowchart showing, in detail, the automatic ball-throwing determination process (step S62).

Firstly, in step S70, the CPU 10 calculates the length of angular velocities around the X-axis and the Y-axis of the current sample, the length of angular velocities around the X-axis and the Y-axis one sample before the current sample, and the length of angular velocities around the X-axis and the Y-axis two samples before the current sample, respectively, and set the respective lengths as variables AV0, AV1, and AV2. Specifically, the CPU 10 refers to the angular velocity data 63 in the main memory, and obtains a most recent angular velocity around the X-axis and a most recent angular velocity around the Y-axis, and calculates the length of an angular velocity in the XY-direction (the magnitude of the angular velocity vector defined by the angular velocity around the X-axis and the angular velocity around the Y-axis). The calculated length of the angular velocity in the XY-direction is stored in the main memory as the variable AV0. In a similar manner, the CPU 10 refers to the angular velocity data 63 in the main memory, and obtains the angular velocity in the X-axis and the angular velocity in the Y-axis of a second most recent sample, and stores the length of an angular velocity in the XY-direction of the second most recent sample in the main memory as the variable AV1. In a further similar manner, the CPU 10 stores the length of an angular velocity in the XY-direction of a third most recent sample in the main memory as the variable AV2. Next, the CPU 10 executes the process of step 71.

In step S71, the CPU 10 determines whether or not $AV1 \geq AV0$ and $AV1 > AV2$ are satisfied. In step S71, whether or not the length of the angular velocity in the XY-direction of the second most recent sample has a maximum value is determined. That is, whether or not the speed (intensity) of swinging the input device 8 is its local maximum value is determined. It is assumed that the player swings the input device 8 as if the player applies some force to a ball at a moment when the player throws the ball, and accordingly it is estimated that the length of the angular velocity in the XY-direction reaches its local maximum value at that moment. When the result of the determination is Yes, the CPU 10 may determine that the ball has been thrown, and thus executes a process of step S72 subsequently. On the other hand, when the result of the determination is No, the CPU 10 ends the automatic ball-throwing determination process, and returns the process to the currently-throwing state process shown in FIG. 22. Note that whether or not the length of the angular velocity is its local maximum value may be determined based on any method.

In step S72, the CPU 10 sets the current orientation in the pitch direction to variable Rot0, and the orientation in the pitch direction of a sample before the current sample to variable Rot1. Specifically, the CPU 10 refers to the pitch orientation data 71 in the main memory, obtains a most recent orientation in the pitch direction calculated in step S51, and stores the most recent orientation as the variable Rot0 in the main memory. In a similar manner, the CPU 10 refers to the pitch orientation data 71 in the main memory, obtains the orientation in the pitch direction of a sample before the current sample, and stores the orientation as the variable Rot1 in the main memory Next, the CPU 10 executes a process of step 73.

In step S73, the CPU 10 determines whether or not $Rot0 > Rot1$ is satisfied. In step S73, whether or not the current orientation in pitch direction is greater than the orientation in the pitch direction one sample before the current sample is determined. In the process, whether a back-swing motion or a forward-swing motion is performed currently is determined. When the player performs the back-swing motion shown in FIG. 10, the orientation in the pitch direction (see FIGS. 28 and 29) is considered to decrease gradually. On the other hand, when the player performs the forward-swing motion shown in FIG. 11, the orientation in the pitch direction is considered to increase gradually. Therefore, when the result of the determination is Yes, the CPU 10 determines that the orientation in the pitch direction is gradually increasing, and executes a process of step S74 subsequently. On the other hand, when the result of the determination is No, the CPU 10 determines that the orientation in the pitch direction is gradually decreasing, and executes a process of step S75 subsequently.

In step S74, the CPU 10 determines whether or not AV1 is greater than a threshold of the forward-swing motion. In step S74, whether or not the length of an angular velocity in the XY-direction indicates its local maximum value, and whether or not the length of the angular velocity in the XY-direction in that moment is greater than the threshold of the forward-swing motion are determined. Even in the case where the length of the angular velocity in the XY-direction indicates its local maximum value, if the length of the angular velocity in the XY-direction at that moment is equal to or less than a predetermined threshold, the CPU 10 does not determine that a ball has been thrown. That is, even in the case where the length of the angular velocity in the XY-direction indicates its local maximum value, if the player is swinging the input device 8 no faster than a predetermined speed, the CPU 10 does not determine that the ball has been thrown. When the result of the determination is Yes, the CPU 10 executes a process of step S76 subsequently. When the result of the determination is No, the CPU 10 ends the automatic ball-throwing determination process, and returns the process to the ball-throwing state process shown in FIG. 22.

On the other hand, in step S73, when the result of the determination is No, the CPU 10 determines that the player is performing the back-swing motion, and executes the process of step S75. In step S75, the CPU 10 determines whether or not AV1 is greater than the threshold of the back-swing motion. In step S75, in the same manner as the process in step S74, whether or not the length of the angular velocity in the XY-direction indicates its local maximum value, and whether or not the length of the angular velocity in the XY-direction at that moment is greater than a threshold of the back-swing motion are determined. When the result of the determination is Yes, the CPU 10 executes the process of step S76 subsequently. When the result of the determination is No, the CPU 10 ends the automatic ball-throwing determination process, and returns the process to the ball-throwing state process shown in FIG. 22. Note that the threshold of the back-swing motion is set greater than the threshold of the forward-swing motion in step S74. This is to prevent a ball from flying in a direction opposite to the throwing direction when the automatic ball-throwing determination is made during the back-swing motion. Note that in another embodiment, ball-throwing determination may be made during the forward-swing motion only, so that the ball-throwing determination is not made during the back-swing motion.

In step S76, the CPU 10 determines that the ball-throwing has been fulfilled, and stores a value indicative of the fulfillment of a ball-throwing determination in the main memory. In above step S74, when the result of the determination is Yes, the ball rotates in the throwing direction in the subsequent process. On the other hand, in above step S75, when the result of the determination is Yes, the ball rotates in a direction opposite to the throwing direction in the subsequent process. Therefore, in step S76, the value indicative of the fulfillment of the ball-throwing determination is stored in the main memory such that it is possible to identify which of the process of step S74 or that of step S75 is performed immediately prior to the fulfillment. Thereafter, the CPU 10 ends the automatic ball-throwing determination process, and returns the process to the ball-throwing state process shown in FIG. 22.

With reference back to FIG. 22, in step S63, the CPU 10 determines whether or not automatic ball-throwing is fulfilled. Specifically, the CPU 10 refers to the main memory, and determines whether or not the value (a value stored in step S76) indicating that the ball-throwing determination is fulfilled is stored therein. When the result of the determination is Yes, the CPU 10 executes a process of step S64 subsequently. When the result of the determination is No, the CPU 10 ends the ball-throwing state process, and returns the process to the ball-throwing process shown in FIG. 18.

In step S64, the CPU 10 calculates the "intensity of swing", based on acceleration data of past samples. Specifically, the CPU 10 refers to the acceleration data 64 in the main memory, and calculates the magnitude of the respective pieces of acceleration vector (vectors composed of the respective acceleration values along the three axes) of a predetermined number of past samples (e.g., past 24 samples), and calculates the maximum value. The CPU 10 stores the maximum value in the main memory as the intensity of swing. Next, the CPU 10 executes a process of step 65.

In step S65, the CPU 10 calculates an ejection vector in the vertical direction. Specifically, the CPU 10 calculates an ejection angle in the vertical direction in a virtual game space, in accordance with the orientation in the pitch direction. For example, the CPU 10 calculates the ejection angle, while referring to a table which indicates a previously determined relation between the orientation in the pitch direction and the ejection angle. The CPU 10 then calculates the ejection vector (0, sin (ejection angle), cos (ejection angle)) in the virtual game space, based on the calculated ejection angle, and stores the ejection vector in the main memory. Next, the CPU 10 executes a process of step 66.

In step S66, the CPU 10 performs a process to apply a force to a ball. Specifically, the CPU 10 multiplies the ejection vector calculated in step S65 by the intensity of swing calculated in step S64, thereby calculating a force in the throwing direction (direction toward pins) and in the vertical direction in the virtual game space. Then, the CPU 10 performs a process to apply the calculated force to a ball. Next, the CPU 10 executes a process of step 67.

In step S67, the CPU 10 stores the intensity of swing calculated in step S64 in the main memory as the "force applied to a ball". Next, the CPU 10 executes a process of step 68.

In step S68, the CPU 10 performs a process to apply a force to a ball laterally. Here performed is a process to apply a force to a ball laterally in the virtual game space in accordance with the orientation in the yaw direction (the rotation amount around the y-axis). In other words, when the player swings the input device 8 obliquely relative to a forward/backward direction (the z-axis direction), instead of horizontally, the input device 8 rotates from the reference orientation around the y-axis. Accordingly, the CPU 10 applies a force to a ball laterally in accordance with the rotation in the yaw direction. Specifically, the CPU 10 refers to the rotation matrix data 67 in the main memory, and calculates a "force in the lateral direction" by subtracting an element Zx of a second most recent rotation matrix M from an element Zx of a most recent rotation matrix M. Then, the CPU 10 performs a process to apply the calculated force in the lateral direction to a ball. Next, the CPU 10 ends the currently-throwing state process, and returns the process to the ball-throwing process shown in FIG. 18.

With reference back to FIG. 18, in step S18, the CPU 10 determines whether or not the automatic ball-throwing has beer performed. Specifically, the CPU 10 refers to the main memory, and determines whether or not a value (the value stored in step S76) indicating that the ball-throwing determination is fulfilled is stored. When the result of the determination is Yes, the CPU 10 executes the process of step S19 subsequently. When the result of the determination is No, the CPU 10 ends the ball-throwing process.

In step S19, the CPU 10 sets the post-throwing state as the current state. Specifically, the CPU 10 stores a value (e.g., 3) indicative of the post-throwing state in the state variables which are stored in the main memory. Next, the CPU 10 ends the ball-throwing process shown in FIG. 18.

Figure 24:
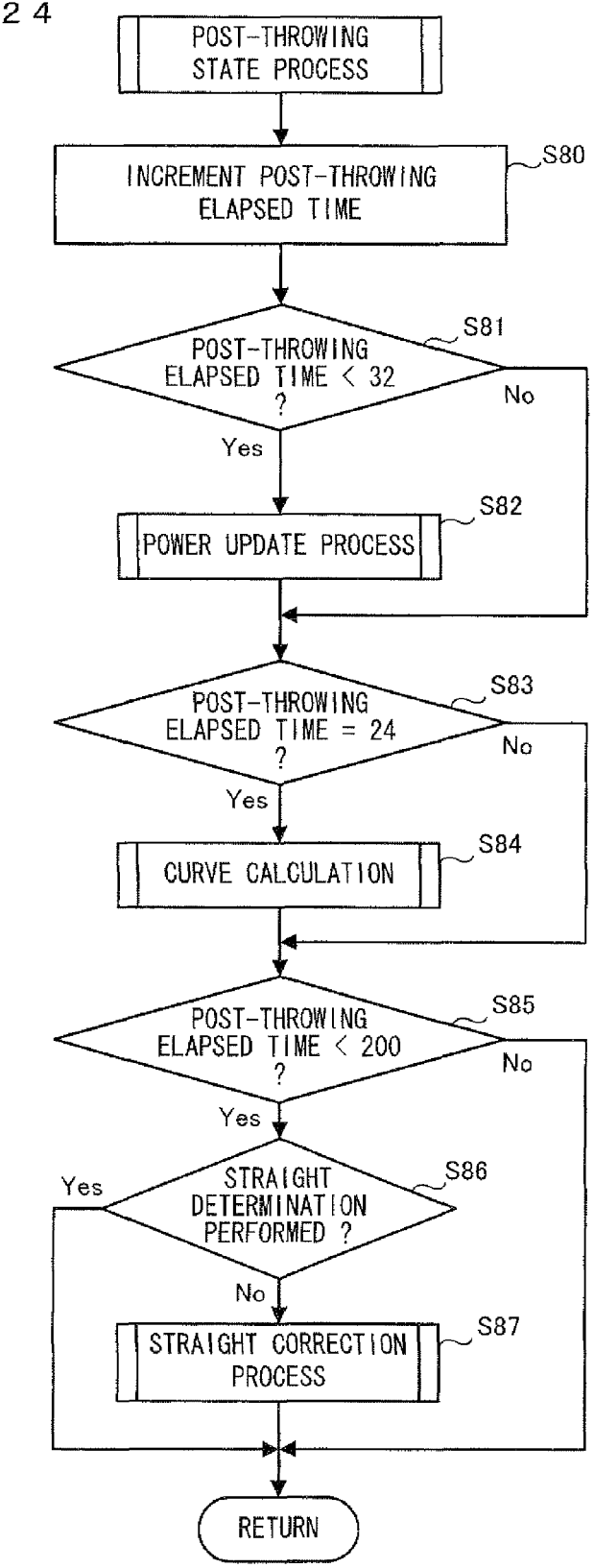
FIG. 24 is a flowchart showing, in detail, a post-throwing process (step S20)

On the other hand, in step S16, when the result of determination is No, that is, when the current state is not the currently-throwing state, then the current state is neither the pre-throwing state nor the post-throwing state. Thus, the CPU 10 performs the process of step S20 subsequently. In step S20, the CPU 10 corrects the path, the speed, and the like of a ball in accordance with the angular velocities and/or the acceleration detected after the ball is thrown. The process of the post-throwing state in step S20 will be described in detail with reference to FIG. 24. FIG. 24 is a flowchart showing, in detail, the process of the post-throwing state (step S20).

Figure 25:
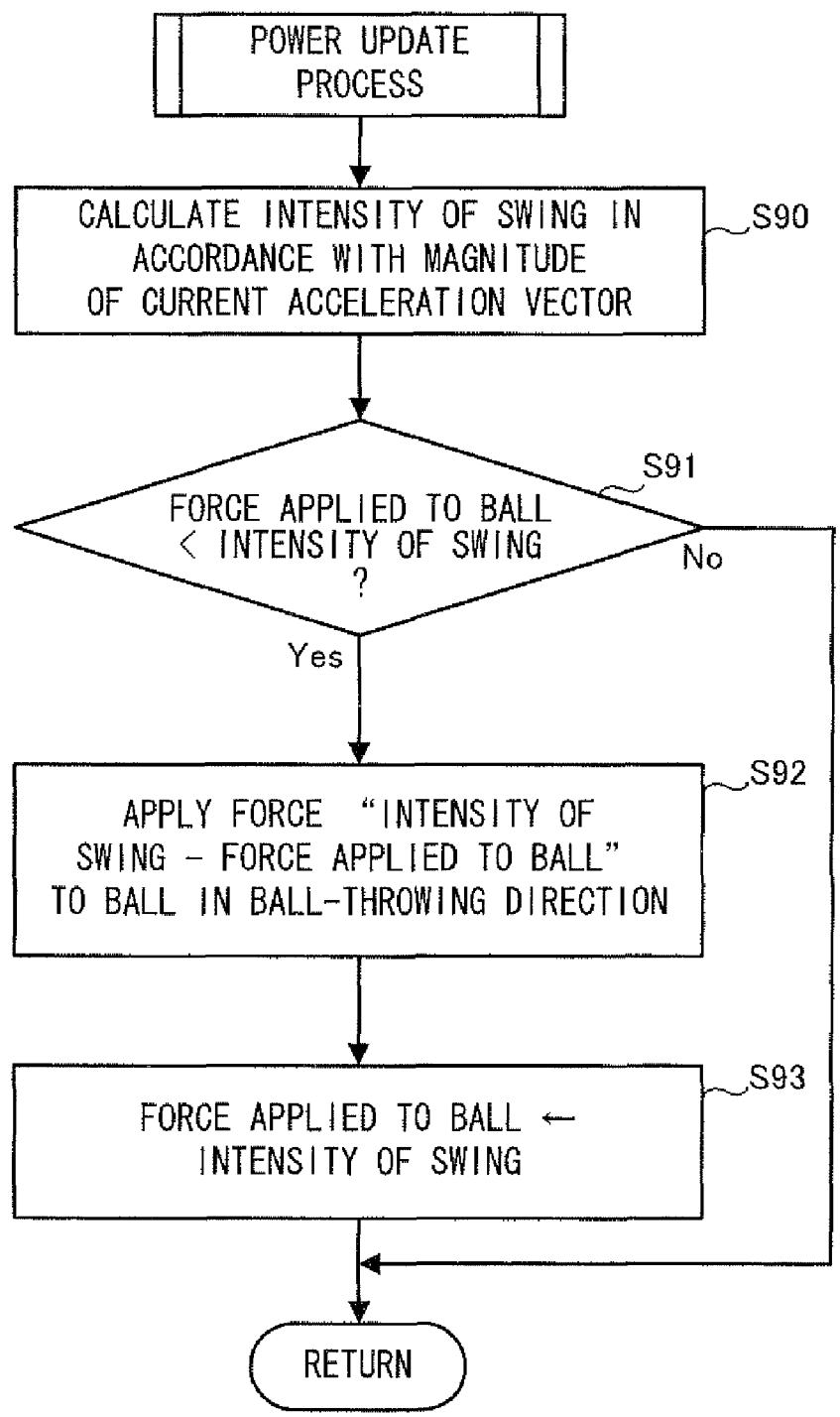
FIG. 25 is a flowchart showing, in detail, a power update process (step S82)

Firstly, in step S80, the CPU 10 increments the post-throwing elapsed time. Next, the CPU 10 determines, in step S81, whether or not the post-throwing elapsed time is lower than 32. When the result of the determination is Yes, the CPU 10 executes a process of step S82 subsequently. When the result of the determination is No, the CPU 10 executes a process of step S83 subsequently.

in step S82, the CPU 10 executes a power update process. Here, performed is a process to correct the "force applied to a ball" in accordance with the magnitude of the acceleration detected by the acceleration sensor 37 during a predetermined period of time after ball-throwing. The power update process in step S82 will be described in detail with reference to FIG. 25. FIG. 25 is a flowchart showing, in detail, the power update process (step S82).

In step S90, the CPU 10 calculates the "intensity of swing" in accordance with the magnitude of the current acceleration vector. Specifically, the CPU 10 refers to the acceleration data 64 in the main memory, calculates the magnitude of the most recent acceleration vector so as to be stored in the main memory as the current intensity of swing. Next, the CPU 10 executes a process of step 91.

In step S91, the CPU 10 determines whether or not the force applied to a ball is lower than the intensity of swing. Here, performed is a process to determine whether or not the force currently applied to the ball is lower than the magnitude of the acceleration vector currently detected by the acceleration sensor 37. Specifically, the CPU 10 refers the to the main memory to determine whether or not the "force applied to the ball" is lower than the current "intensity of swing" calculated in step S90. When the result of the determination is Yes, the CPU 10 executes a process of step S92 subsequently. When the result of the determination is No, the CPU 10 ends the power update process.

In step S92, the CPU 10 applies, to a ball, a force obtained by subtracting the "force applied to the ball" from the "intensity of swing" calculated in step S90. In the step, when the "intensity of swing" is greater than the "force applied to the ball", the difference therebetween is applies to the ball additionally. Next, in step S93, the CPU 10 stores the "intensity of swing" which is calculated in step S90, in the main memory, as the "force applied to the ball", and ends the power update process.

In this manner, after the ball is thrown, the power update process is performed, whereby it is possible to additionally apply a force to a ball in accordance with the acceleration detected by the acceleration sensor 37 during a predetermined period of time after the ball is thrown.

With reference back to FIG. 24, in step S83, the CPU 10 determines whether or not the post-throwing elapsed time is equal to 24. When the result of the determination is Yes, the CPU 10 executes a process of step S84 subsequently. When the result of the determination is No, the CPU 10 executes a process of step S85 subsequently.

Figure 26:
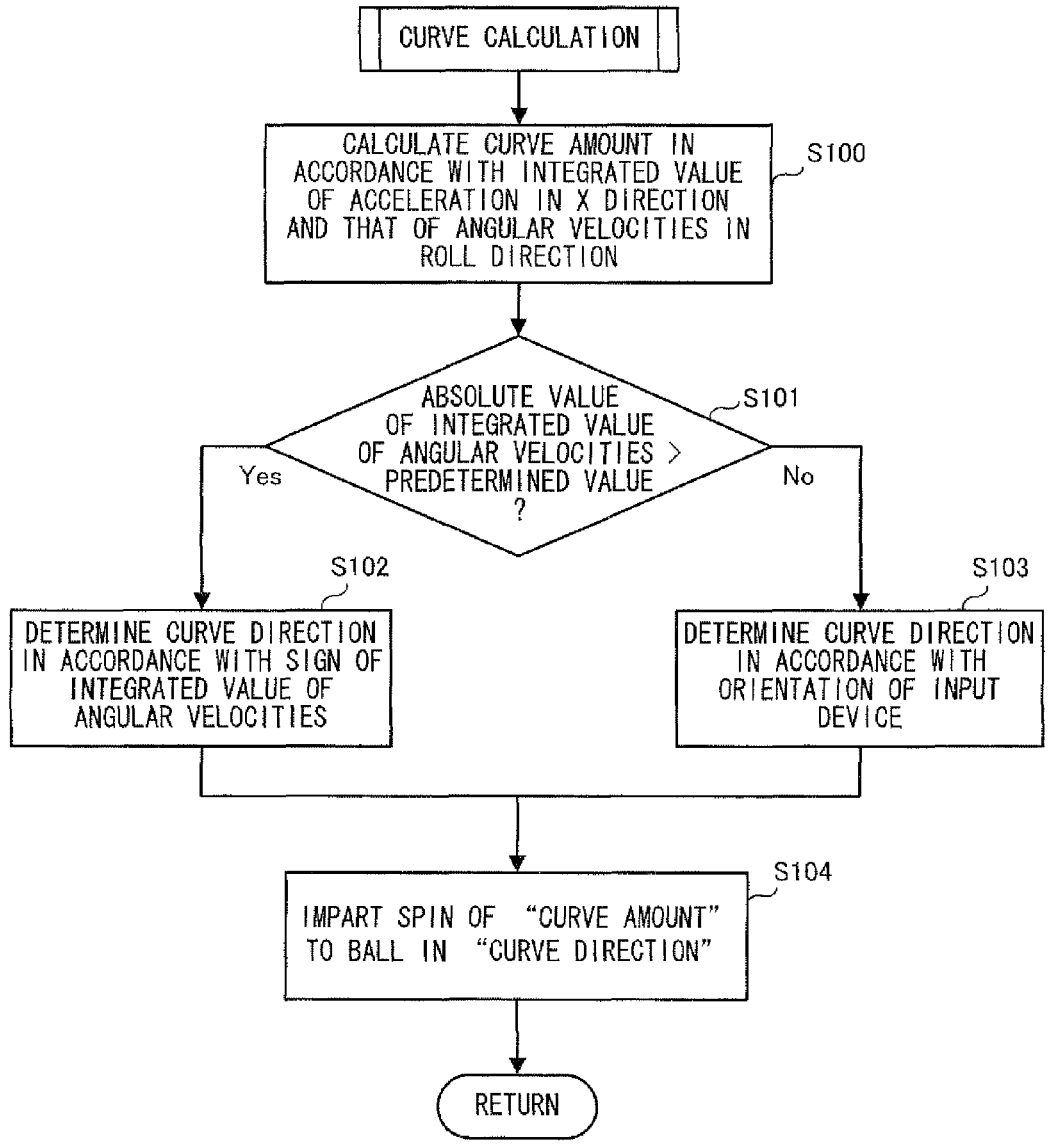
FIG. 26 is a flowchart showing, in detail, a curve calculation process (step S84)

In step S84, the CPU 10 performs a curve calculation. Performed here is a process to change the path of the ball by imparting a spin to a ball. The curve calculation process in step S84 will be described in detail with reference to FIG. 26. FIG. 26 is a flowchart showing, in detail, the curve calculation process (step S84).

Firstly, in step S100, the CPU 10 calculates an amount of curve in accordance with the integrated value of the acceleration in the X-axis direction and the integrated value of the angular velocity in the roll direction. Specifically, the CPU 10 refers to the acceleration data 64 and the angular velocity data 63 in the main memory, and obtains data on the acceleration in the X-axis direction and data on the angular velocity around the Z-axis (roll direction) of a predetermined number of past samples (e.g., past 48 samples). Next, the CPU 10 adds up absolute values of the obtained acceleration in the X-axis direction, and obtains the resultant value as the integrated value of the acceleration. In a similar manner, the CPU 10 adds up the obtained angular velocity around the Z-axis, and obtains the resultant value as the integrated value of the angular velocity. The CPU 10 then calculates the amount of curve based on the following formula (10).

$$\text{Curve amount} = \text{integrated value of acceleration} \times \alpha + \text{absolute value of integrated value of angular velocities} \times \beta \quad (10)$$

Wherein, $\alpha$ and $\beta$ represent predetermined coefficients. Next, the CPU 10 executes a process of step 101.

In step S101, the CPU 10 determines whether or not the absolute value of the integrated value of the angular velocity is greater than a predetermined value. Here, performed is a process to determine whether or not the player has rotated the input device 8 around the Z-axis in the predetermined number of past samples. In other words, when the absolute value of the integrated value of the angular velocity around the Z-axis is greater than the predetermined value, it is considered that the player has intentionally rotated (performed a motion twisting) the input device 8 around the Z-axis. On the other hand, when the absolute value of the integrated value of the angular velocities around the Z-axis is equal to or lower than the predetermined value, it is considered that the player does not intentionally rotate (performed a motion twisting) the input device 8 around the Z-axis. When the result of the determination is Yes, the CPU 10 executes a process of step S102 subsequently. When the result of the determination is No, the CPU 10 executes a process of step S103 subsequently.

In step S102, the CPU 10 determines a curve direction in accordance with a sign (negative or positive) of the integrated value of the angular velocities. The curve direction is a direction in which a ball is curving relative to its throwing direction (direction toward pins). Specifically, the CPU 10 determines the curve direction in accordance with the sign of the integrated value of the angular velocities calculated in step S100. For example, when the sign of the integrated value of the angular velocities is a negative, the curve direction is set to the negative direction. Accordingly, the curve direction is set to the same direction as that obtained when the player rotates the input device 8 around the Z-axis. Next, the CPU 10 executes a process of step 104.

On the other hand, in step S103, the CPU 10 determines the curve direction in accordance with the orientation of the input device 8. In step S102 prior to step S103, it is determined that the player does not intentionally rotate the input device 8 around the Z-axis, and thus in step S103, the CPU 10 does not determine the curve direction in accordance with the angular velocity around the Z-axis, but calculates the curve direction in accordance with the orientation of the input device 8 at that moment. In other words, in an actual ball-throwing motion, there may be a case where a curve is imparted to a ball not by a motion of spinning the ball, but by a direction of the player's palm at the time of releasing the ball. For example, to impart a curve to a ball toward the left direction actually, the player, who throws a ball with his/her right hand, tends to throw a ball while directing his/her palm toward such a direction that is perpendicular to a direction toward pins (left direction relative to the direction toward pins), immediately before and after releasing the ball, instead of directing the palm toward the pins direction. Therefore, in this game as well, when the upper surface (bottom surface) of the input device 8 is directed toward the left direction relative to the throwing direction at the time of the post-throwing, the CPU 10 then determines that the player intends to impart a curve to the ball in the left direction, and sets the left direction as a curve direction. Specifically, in step S103, the CPU 10 refers to the main memory, and determines the curve direction in accordance with the sign of the element Xy of the current rotation matrix M. Accordingly, a direction toward which the upper surface of the input device 8 is directed is set as the curve direction, and as a result, the ball curves in the direction toward which the upper surface of the input device 8 is directed. Next, the CPU 10 executes a process of step 104.

In step S104, the CPU 10 performs a process to spin the ball in accordance with the curve amount calculated in step S100, and in accordance with the curve direction set in step S102 or step S103. That is, the CPU 10 performs a process to apply, to a ball, a spin in the "curve direction" having the "curve amount". The CPU 10 then ends the curve calculation process.

With reference back to FIG. 24, in step S85, the CPU 10 determines whether or not the post-throwing elapsed time is lower than 200. When the result of the determination is Yes, the CPU 10 executes a process of step S86 subsequently. When the result of the determination is No, the CPU 10 ends the post-throwing state process.

In step S86, the CPU 10 determines whether or not a straight determination is made. In step S86, performed is a process to determine whether or not determination of straight fulfillment or straight unfulfillment is performed, after a straight correction process in step S87, which is described later. Specifically, the CPU 10 refers to the main memory, and determines whether a value indicative of a result of the straight determination is a value (e.g., 1) indicative of the straight fulfillment, or a value (e.g., −1) indicative of the straight nonfulfillment. When the result of the determination is negative, the CPU 10 executes a process of step S87 subsequently. When the result of the determination is positive, the CPU 10 ends the post-throwing state process.

Figure 27:
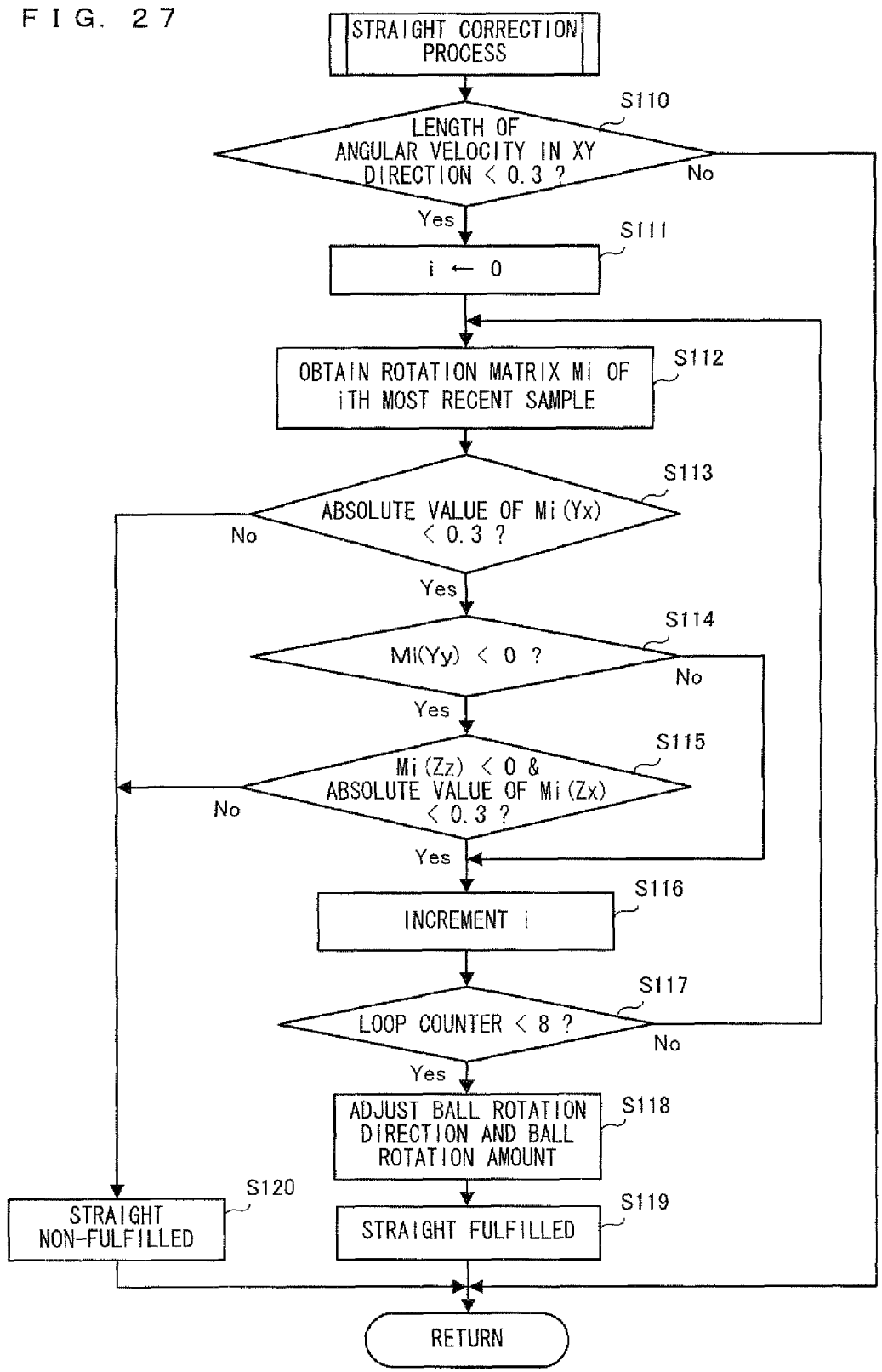
FIG. 27 is a flowchart showing, in detail, a straight correction process (step S87)

In step S87, the CPU 10 performs a straight correction process. Here, performed is a process to correct a direction in which the ball is rotating such that the ball rotates straight in accordance with the orientation of the input device 8 at a point of time (at the time of the finish motion state) when a motion of swinging the input device 8 is considered to end. The straight correction process in step S87 will be described in detail with reference to FIG. 27. FIG. 27 is a flowchart showing, in detail, the straight correction process (step S87).

Firstly, in step S110, the CPU 10 determines whether or not a length of the current angular velocity in the XY-direction is lower than 0.3. Here, performed is a process to determine whether or not the input device 8 is being swung currently. At a point of time when the player ends the throwing motion as shown in FIG. 13, the input device 8 is substantially in a static state (the angular velocities in the XYZ-axis direction are substantially 0). In step S110, the CPU 10 determines whether or not the input device 8 is in a static state to determine whether or not the player has finished swinging the input device 8. Specifically, the CPU 10 refers to the angular velocity data 63 in the main memory, and obtains the most recent angular velocity around the X-axis, and the most recent angular velocity around the Y-axis. Then the CPU 10 determines whether or not the magnitude of an angular velocity vector, which is composed of the obtained angular velocity around the X-axis and the angular velocity around the Y-axis, is lower than a predetermined value (e.g., 0.3). When the result of determination is Yes, the CPU 10 determines that the player has finished swinging the input device 8, and performs a process of step S111 subsequently. When the result of determination is No, the CPU 10 determines that the player is yet to finish swinging the input device 8, and ends the straight correction process. When the result of determination is No, the value indicative of the result of the straight determination is set to a value (e.g., 0) other than the value indicative of the straight fulfillment (e.g., 1) and the value indicative of the straight nonfulfillment (e.g., −1).

In step S111, the CPU 10 sets a value of a loop counter i to 0. Next, the processes of steps 112 to 117 are executed. In step S112 to step S117, whether or not the following two conditions are satisfied during a period elapsed between a point of time when the player has finished swinging the input device 8 and 8 samples before the point of time. When the following two conditions are satisfied during the period, the CPU 10 corrects the rotation direction and/or the rotation amount of the ball in step S118. The first condition is that the input device 8 has not been rotated in the roll direction during the period between the point of time when the player has finished swinging the input device 8 and 8 samples before the point of time. The second condition is that, during the period elapsed between the point of time when the player has finished swinging the input device 8 and 8 samples before the point of time, the Z-axis positive direction of the input device 8 is directed to a direction immediately behind the player while the upper surface (bottom surface) of the input device 8 is directed to the ground surface. When either of the above first condition and the second condition is not satisfied, the CPU 10 does not correct the rotation direction and/or the rotation amount of the ball.

Firstly, in step S112, the CPU 10 refers to the rotation matrix data 67 in the main memory, and obtains a rotation matrix Mi of an ith most recent sample. Next, the CPU 10 executes a process of step 113.

In step S113, the CPU 10 determines whether or not the absolute value of an element Yx of the rotation matrix Mi is lower than a predetermined value (e.g., 0.3). The process in step S113 is to determine whether or not the above first condition is satisfied. When the input device 8 is rotated in the roll direction, the value of the element Yx of the rotation matrix Mi is not 0. Therefore, when the absolute value of the element Yx is equal to or greater than the predetermined threshold, the input device 8 rotates in the roll direction at a degree of a predetermined value or more, and the rotation direction and/or the rotation amount of a ball is not corrected. In step S113, when the result of the determination is Yes, the CPU 10 executes a process of step S114 subsequently. When the result of the determination is No, the CPU 10 executes a process of step S120 subsequently.

In subsequent step S114 and step S115 whether or not the above second condition is satisfied is determined. Firstly, in step S114, the CPU 10 determines whether or not an element Yy of the rotation matrix Mi is lower than 0. In step S114, a process is performed to determine whether or not the upper surface of the input device 8 is directed to the ground direction, in relation to the above second condition. The case where the upper surface of the input device 8 is directed toward the ground direction is a case where a straight line extending along a direction perpendicular to the upper surface of the input device 8 (the Y-axis positive direction) intersects the ground surface (see FIG. 15A). When the element Yy is lower than 0, the orientation of the input device 8 is as shown in FIG. 15A. In step S114, when the result of the determination is Yes, the CPU 10 executes a process of step S115 subsequently. When the result of the determination is No, the CPU 10 executes a process of step S116 subsequently.

In step S115, the CPU 10 determines whether or not an element Zz of the rotation matrix Mi is lower than 0, and whether or not the absolute value of an element Zx of the rotation matrix Mi is lower than 0.3. In step S115 a process is performed to determine whether or not the Z-axis positive direction of the input device 8 is directed to a direction immediately behind the player, in relation to the above second condition. The case where the Z-axis positive direction of the input device 8 is not directed to the direction immediately behind the player is a case where the Z-axis of the input device 8 tilts, at a predetermined angle, toward the x-axis direction relative to the z-axis in the xyz-coordinate system while the upper surface of the input device 8 is directed toward the ground direction (see FIG. 15B). When the absolute value of the element Zx is greater than the predetermined value, the Z-axis of the input device 8 tilts toward the x-axis positive or negative direction at a predetermined angle. In step S115, when the result of the determination is Yes, the CPU 10 executes the process of step S116 subsequently. When the result of the determination is No, the CPU 10 executes the process of step S120 subsequently.

In step S116, the CPU 10 increments the value of the loop counter i. Next, the CPU 10 determines, in step S117, whether or not the value of the Loop counter i is lower than 8. When the result of the determination is Yes, the CPU 10 executes a process of step S118 subsequently. When the result of the determination is No, the CPU 10 executes the process of step S112 again.

When the processes of the above step S112 to step S117 have been executed, and then the process of step S118 has been executed, the above first condition and the second condition are satisfied during the period between the point of time when the player has finished swinging the input device 8 and 8 samples before the point of time. In this case, it is considered that the player is throwing a straight ball, and thus, in step S119, the CPU 10 corrects the rotation direction and/or the rotation amount of the ball so that the ball is thrown straight.

Specifically, in step S118, the CPU 10 performs a process of directing the rotation direction of the ball toward the pins direction, and/or a process of reducing the rotation amount of the hall. For example, when the ball is rotating while curving to the left, the CPU 10 corrects the rotation of the ball so as not to curve to the left, but so as to be directed toward the pins direction. When the correction is made as above, the ball rotates straight toward the pins without curving Next, the CPU 10 executes a process of step 119.

In step S119, the CPU 10 sets the value indicative of the straight fulfillment (e.g., 1) as the value indicative of the result of the straight determination, and stores the value in the main memory. The CPU 10 then ends the straight correction process shown in FIG. 27, and ends the post-throwing state process shown in FIG. 24 (also ends the ball-throwing process shown in FIG. 18, and returns to the process shown in FIG. 17).

On the other hand, when the result of determination in step S113 or step S115 is No, the CPU 10 determines that the player is not throwing a straight ball, and does not correct the rotation direction and/or the rotation amount of the ball (the process of step S118). In step S113 or in step S115, when the result of the determination is No, the CPU 10 executes the process of step S120. In step S120, the CPU 10 sets the value indicative of the straight nonfulfillment (e.g., −1) as a value indicative of the result of the straight determination, and stores the value in the main memory. The CPU 10 then ends the straight correction process shown in FIG. 27, and ends the post-throwing state process shown in FIG. 24 (also ends the ball-throwing process shown in FIG. 18, and returns to the process shown in FIG. 17).

The thresholds used for various determinations in the straight correction process shown in FIG. 27 (e.g., in steps S110, S113 to S115) are not limited to the above values, but may be any values.

Further, the above power update process (step S82 in FIG. 24), the curve calculation process (step S84), and the straight correction process (step S87) may be executed at any time during the post-throwing state. For example, the above power update process may be executed a predetermined period of time after the ball-throwing fulfillment, and the above curve calculation process may be executed during a predetermined period of time before/after the ball-throwing fulfillment.

With reference back to FIG. 17, in a sensor sample loop, after the processes of step S3 and step S4 are performed a predetermined number of times, the process of step S5 is executed. In step S5, the CPU 10 performs the game process. Specifically, in accordance with a motion of the player character and the position of the player character's hand set in step S3, the CPU 10 causes the player character to display on the screen, or in accordance with the force imparted to the ball and the direction applied to the ball, which are calculated in step S3, the CPU 10 causes the ball to move in the game space and causes the moved ball on the screen.

Although not shown in FIG. 17, the above main loop ends at the time when the game ends. The game ends when the player performs any operation to terminate the game, or when the player turns off the game. When the process of the main loop ends, the CPU 10 ends the game process shown in FIG. 17. This is the end of the description of the game process.

As above described, in the present embodiment, the ball-throwing determination is performed (step S62) in accordance with the angular velocities detected by the gyro-sensors 55 and 56, and the force imparted to a ball (i.e., a moving ball speed) is calculated (step S64) in accordance with the acceleration detected by the acceleration sensor 37. In addition, the force imparted to the ball is corrected (step S82) in accordance with the acceleration detected after ball-throwing fulfillment. Further, the curve amount and the curve direction of the ball is calculated (step S84) in accordance with the acceleration and the angular velocity detected before/after the ball-throwing fulfillment. Still further, the straight correction is performed (step S87) in accordance with the orientation of the input device 8 after the ball-throwing fulfillment. In this manner, the orientation and the swinging speed of the input device 8 are calculated based on the angular velocity, whereby the motion of swinging the input device 8 performed by the player can be determined with excellent accuracy. Accordingly, the player's motion of swinging the input device 8 can be reflected in the ball throwing speed and the ball throwing direction. Therefore, the player can play a game based on an intuitive motion as if the player actually performs.

In the present embodiment, when the angular velocity in the XY-direction reaches its local maximum value, and the value is greater than a predetermined threshold, the CPU 10 determines that ball-throwing has been fulfilled, and executes the process of causing the ball to move based on the acceleration. In another embodiment, a process of causing a given object to move in accordance with the acceleration may be performed when the angular velocities detected by the gyro-sensors satisfies a predetermined condition. For example, whether or not the motion of swinging the input device 8 is started may be determined based on the angular velocities detected by the gyro-sensors 55 and 56, and the intensity of swing may be determined based on the acceleration detected during the swinging motion by the acceleration sensor 37. In accordance with the start of the motion of swinging the input device 8, a game object may be caused to move. Still further, an amount and a speed of the movement, and a change amount of the moving direction may be set based on the acceleration.

Further, in the present embodiment, when the angular velocity detected by the gyro-sensors 55 and 56 of the input device 8 satisfy a predetermined condition (i.e., the angular velocity is its local maximum value, and is greater than a predetermined threshold), the movement of the ball is started (the bail is thrown) based on the acceleration detected by the acceleration sensor 37. In another embodiment, when the angular velocity of the input device 8 satisfies a predetermined value, a moving object may be accelerated or decelerated, or the moving direction (path) of the moving object may be changed, in accordance with the acceleration of the input device 8. For example, to decelerate an object moving in a game space, in accordance with a predetermined motion of swinging the input device 8, the predetermined motion of swinging the input device 8 is detected based on the angular velocity of the input device 8, and a degree of deceleration of the object may be determined in accordance with the magnitude of the acceleration of the input device 8 detected before/after the detection of the swinging motion.

Further, in the present embodiment, in accordance with the integrated value of the angular velocity in the roll direction, and the integrated value of the acceleration in the X-axis, the curve amount is calculated, and a spin is imparted to a ball. (step S100). In another embodiment, the curve amount may be calculated based on the angular velocity in a predetermined one-axis direction and the acceleration in a predetermined one-axis direction, or the curve amount may be calculated based on the angular velocities in predetermined two two-axis (or three-axis) directions, and the acceleration in the predetermined two-axis (or three-axis) directions.

Further, in the present embodiment, when the angular velocity of the input device 8 satisfies a predetermined condition, the curve amount is determined based on the integrated value of the angular velocity and the integrated value of the acceleration, and the curve direction is calculated based on a sign of the integrated value of the angular velocity or based on the orientation of the input device 8, whereby a spin is imparted to a ball (step S84). In other words, when the angular velocity of the input device 8 satisfies a predetermined condition, the change amount of the moving direction of the object is calculated based on the angular velocity and the acceleration of the input device 8, and the direction to which the moving direction of the object is to be changed is calculated based on the angular velocity of the input device 8. In another embodiment, the direction to which the moving direction of the object is to be changed may be calculated based on the acceleration of the input device 8. In this case, it is preferable to calculate the acceleration applied to the input device 8, while subtracting the acceleration component along the direction of gravity therefrom, and calculate, based on the calculated acceleration, the direction to which the moving direction of the object is to be changed. Further, in another embodiment, when the angular velocity of the input device 8 satisfies a predetermined value, the changing amount of the moving direction and direction to which the moving direction of the object is to be changed may be calculated based on the acceleration of the input device 8 only.

Further, in the present embodiment, in the above straight correction process, when the magnitude of the angular velocity in the XY-direction is lower than a predetermined threshold (step S110), the CPU 10 determines that the player's swing motion has ended, and performs the straight correction. In another embodiment, the straight correction may be performed when the magnitude of the acceleration detected by the acceleration sensor 37 stays within a predetermined range. The acceleration detected by the acceleration sensor 37 includes the acceleration caused by the gravity, and the acceleration caused by the player's swing motion. When the player swings the input device 8, the magnitude of the acceleration to be detected will become greater or lower than the gravity depending on the player's swing motion. Therefore, when the magnitude of the detected acceleration is substantially the same as that of the gravity, it is determined that the player's swing motion has ended.

Further, the timing when the above straight correction process is performed is not limited to when the motion of swinging the input device 8 is considered to end (in the case of Yes in step S110). Instead, the straight correction process may be performed at any timing. For example, when the above first condition (step S114) and the second condition (step S115) relating to the orientation are satisfied, during a predetermined period of time starting at previously defined time after the automatic ball-throwing determination, a straight motion is considered to be fulfilled, and then the straight correction (step S118) may be performed.

Further, in the present embodiment, a bowling game has been described as an example. However, the present invention may be applicable to any game. For example, the present invention may be applied to various games such as a ball-throwing motion in a baseball game, a shooting motion in a golf game, javelin throwing motion (a javelin throwing of an field event), and the like. That is, the present invention can be widely applied to any game in which an object in a game world is moved and controlled in accordance with the player's swinging the input device 8.

Further, in the present embodiment, the acceleration components along the three-axis directions are detected by the acceleration sensor 37, and the angular velocities in the three-axis directions are detected by the gyro-sensors 55 and 56, however, the present invention may be realized by detecting the acceleration component or the angular velocity in a one-axis direction or two-axis directions.

Further, in the present embodiment, the controller 5 and the game apparatus 3 are connected to each other via wireless communication, however, the controller 5 and the game apparatus 3 may be electrically connected to each other via a cable.

Further, a game program according to one embodiment is not necessarily provided to the game apparatus 3 in a form of an external storage medium such as an optical disc 4 or the like. Instead, the game program may be provided to the game apparatus 3 via a wired or wireless communication line. Further, the game program may be stored in a nonvolatile storage apparatus mounted in the game apparatus 3 in advance. As information storage medium (a computer readable storage medium) having stored therein a game program, nonvolatile semiconductor memory may be used as well as a CD-ROM, a DVD, and any other optical disc-shaped storage medium.

Further, in the present embodiment, the CPU 10 of the game apparatus 3 executes a game program, whereby the processes in the above flowchart are performed. In another embodiment, some or all of the above processes may be performed by a dedicated circuit provided to the game apparatus 3.

As above described, the game apparatus and the game program according to one embodiment is capable of performing processes to cause a virtual object or the like to move in accordance with a motion swinging an input device, when the input device including an acceleration sensor and gyro-sensors is used for performing input operations.

While the example embodiments presented herein have been described in detail, the foregoing description is in all aspects illustrative and not restrictive. It is understood that numerous other modifications and variations can be devised without departing from the scope of the embodiments.

What is claimed is:

1. A game apparatus which obtains operation data including angular velocity data and acceleration data from an input device equipped with an angular velocity sensor and an acceleration sensor, and which performs a game process based on the operation data, the game apparatus comprising:
   a determination unit configured to determine whether or not the angular velocity data satisfies a predetermined condition;
   a movement control unit configured to control a moving speed of a predetermined object in a game space by applying a force to the predetermined object in accordance with the acceleration data obtained in a predetermined period of time prior to a point of time at which the angular velocity data satisfies the predetermined condition; and
   a display control unit configured to display, on a screen, the predetermined object, whose movement is controlled by the movement control unit.

2. The game apparatus according to claim 1, wherein the movement control unit controls the moving speed of the object by applying a force to the object in accordance with the magnitude of an acceleration indicated by the acceleration data.

3. The game apparatus according to claim 1, wherein the movement control unit further controls a moving direction of the object in accordance with the acceleration data.

4. The game apparatus according to claim 1, further comprising
   acceleration storage locations configured to sequentially store the acceleration data, wherein
   the movement control unit controls the moving speed of the object in accordance with acceleration data stored in the acceleration storage locations during a predetermined period of time which elapses between a determination time, at which the determination unit has determined that the angular velocity data satisfies the predetermined condition, and a predetermined length of period before the determination time.

5. The game apparatus according to claim 4, wherein the movement control unit controls the moving speed of the object in accordance with a maximum value of acceleration in the acceleration data during the predetermined period of time.

6. The game apparatus according to claim 5, wherein the movement control unit further controls the moving speed of the object in accordance with an orientation of the input device at the determination time, the orientation being calculated based on the angular velocity data.

7. The game apparatus according to claim 5, wherein the movement control unit further changes the moving speed of the object in accordance with the acceleration data obtained at and after the determination time.

8. The game apparatus according to claim 7, wherein when the magnitude of an acceleration indicated by the acceleration data obtained at and after the determination time is greater than the maximum value of acceleration during the predetermined period of time, the movement control unit further changes the moving speed of the object in accordance with the magnitude of the acceleration indicated by the acceleration data obtained at and after the determination time.

9. The game apparatus according to claim 1, further comprising
   a position determination unit configured to determine a position of the object, in accordance with the angular velocity data, during a period of time until the determination unit determines that the angular velocity data satisfies the predetermined condition, wherein
   the movement control unit causes the object to start moving from a position determined by the position determination unit toward a predetermined direction when the determination unit determines that the angular velocity data satisfies the predetermined condition.

10. The game apparatus according to claim 1, further comprising
    angular velocity storage locations configured to sequentially store the angular velocity data, wherein
    the determination unit determines that the angular velocity data satisfies the predetermined condition in accordance with the angular velocity data stored in the angular velocity storage locations when the magnitude of an angular velocity indicated by the angular velocity data represents a local maximum value, and the magnitude of the angular velocity is greater than a predetermined threshold.

11. The game apparatus according to claim 1, wherein the movement control unit causes the object in the game space to be ejected in a predetermined direction when the angular velocity data satisfies the predetermined condition, and determines a moving speed of the object immediately after the ejection in accordance with acceleration data obtained at or before the ejection of the object, and corrects the moving speed of the object immediately after the ejection in accordance with acceleration data newly obtained over a predetermined period of time immediately after the ejection of the object.

12. A non-transitory computer readable storage medium having stored thereon a game program executed by a computer of a game apparatus which obtains operation data including angular velocity data and acceleration data from an input device equipped with an angular velocity sensor and an acceleration sensor, and which performs a game process in accordance with the operation data, the computer being caused to function as:
    a determination unit configured to determine whether or not the angular velocity data satisfies a predetermined condition;
    a movement control unit configured to control a moving speed of a predetermined object in a game space by applying a force to the predetermined object in accordance with the acceleration data obtained in a predetermined period of time prior to a point of time at which the angular velocity data satisfies the predetermined condition; and a display control unit configured to display, on a screen, the predetermined object, whose movement is controlled by the movement control unit.

13. The non-transitory computer-readable storage medium having stored thereon the game program, according to claim 12, wherein the movement control unit controls the moving speed of the object by applying a force to the object in accordance with the magnitude of an acceleration indicated by the acceleration data.

14. The non-transitory computer-readable storage medium having stored thereon the game program, according to claim 12, wherein the movement control unit further controls a moving direction of the object in accordance with the acceleration data.

15. The non-transitory computer-readable storage medium having stored thereon the game program, according to claim 12, further causing the computer to function as acceleration storage locations configured to sequentially store the acceleration data, wherein the movement control unit controls the moving speed of the object in accordance with acceleration data stored in the acceleration storage locations during a predetermined period of time which elapses between a determination time, at which the determination unit has determined that the angular velocity data satisfies the predetermined condition, and a predetermined length of period before the determination time.

16. The non-transitory computer-readable storage medium having stored thereon the game program, according to claim 15, wherein the movement control unit controls the moving speed of the object in accordance with a maximum value of acceleration in the acceleration data during the predetermined period of time.

17. The non-transitory computer-readable storage medium having stored thereon the game program, according to claim 16, wherein the movement control unit further controls the moving speed of the object in accordance with an orientation of the input device at the determination time, the orientation being calculated based on the angular velocity data.

18. The non-transitory computer-readable storage medium having stored thereon the game program, according to claim 16, wherein the movement control unit further changes the moving speed of the object in accordance with the acceleration data obtained at and after the determination time.

19. The non-transitory computer-readable storage medium having stored thereon the game program, according to claim 18, wherein when the magnitude of an acceleration indicated by the acceleration data obtained at and after the determination time is greater than the maximum value of acceleration during the predetermined period of time, the movement control unit further changes the moving speed of the object in accordance with the magnitude of the acceleration indicated by the acceleration data obtained at and after the determination time.

20. The non-transitory computer-readable storage medium having stored thereon the game program, according to claim 12, further causing the computer to function as a position determination unit configured to determine a position of the object, in accordance with the angular velocity data, during a period of time until the determination unit determines that the angular velocity data satisfies the predetermined condition, wherein the movement control unit causes the object to start moving from a position determined by the position determination unit toward a predetermined direction when the determination unit determines that the angular velocity data satisfies the predetermined condition.

21. The non-transitory computer-readable storage medium having stored thereon the game program, according to claim 12, further causing the computer to function as angular velocity storage locations configured to sequentially store the angular velocity data, wherein the determination unit determines that the angular velocity data satisfies the predetermined condition in accordance with the angular velocity data stored in the angular velocity storage locations when the magnitude of an angular velocity indicated by the angular velocity data represents a local maximum value, and the magnitude of the angular velocity is greater than a predetermined threshold.

22. The non-transitory computer-readable storage medium having stored thereon the game program, according to claim 12, wherein the movement control unit causes the object in the game space to be ejected in a predetermined direction when the angular velocity data satisfies the predetermined condition, and determines a moving speed of the object immediately after the ejection in accordance with acceleration data obtained at or before the ejection of the object, and corrects the moving speed of the object immediately after the ejection in accordance with acceleration data newly obtained over a predetermined period of time immediately after the ejection of the object.

23. A method for performing a game process according to a game program executed by a computer of a game apparatus in accordance with operation data including angular velocity data and acceleration data from an input device equipped with an angular velocity sensor and an acceleration sensor, the method comprising:

determining whether or not the angular velocity data satisfies a predetermined condition;

controlling, via one or more computer processing devices, a moving speed of a predetermined object in a game space by applying a force to the predetermined object in accordance with the acceleration data obtained in a predetermined period of time prior to a point of time at which the angular velocity data satisfies the predetermined condition; and displaying, on a screen, the predetermined object, whose movement is controlled in accordance with said acceleration data.

* * * * *